US012810361B2

(12) United States Patent
La Placa

(10) Patent No.: US 12,810,361 B2
(45) Date of Patent: Nov. 24, 2026

(54) SYSTEM AND METHOD FOR A DIGITAL ADVISOR USING SPECIALIZED LANGUAGE MODELS AND ADAPTIVE AVATARS

(71) Applicant: Intellectus Partners, LLC, San Francisco, CA (US)

(72) Inventor: David La Placa, San Francisco, CA (US)

(73) Assignee: INTELLECTUS PARTNERS, LLC, San Francisco, CA (US)

( * ) Notice: Subject to any disclaimer, the term of this patent is extended or adjusted under 35 U.S.C. 154(b) by 31 days.

(21) Appl. No.: 19/006,533

(22) Filed: Dec. 31, 2024

(65) Prior Publication Data

US 2025/0225587 A1 Jul. 10, 2025

Related U.S. Application Data

(63) Continuation-in-part of application No. 18/407,415, filed on Jan. 8, 2024, now Pat. No. 12,450,570.

(51) Int. Cl.
*G06Q 40/06* (2012.01)
*H04L 67/306* (2022.01)

(52) U.S. Cl.
CPC .......... *G06Q 40/06* (2013.01); *H04L 67/306* (2013.01)

(58) Field of Classification Search
CPC ........ G06Q 10/10; G06Q 40/06; G06Q 40/02; H04L 67/306
See application file for complete search history.

(56) References Cited

U.S. PATENT DOCUMENTS

2023/0077130 A1* 3/2023 Matsuoka ........ G06Q 10/06313
2025/0045336 A1* 2/2025 Gonsalves ............ G06F 40/166
2025/0190712 A1* 6/2025 Gholami ............ G06F 16/3329

* cited by examiner

*Primary Examiner* — Hao Fu
(74) *Attorney, Agent, or Firm* — GALVIN PATENT LAW LLC; Brian R. Galvin

(57) ABSTRACT

A system and method for providing a digital financial advisor using fine-tuned large language models is disclosed. The system includes a data advisor application, data fusion suite advisor engine, human advising engine, a knowledge base and large language model (LLM) fine-tuning engine to create specialized language models (SLMs) that mimic specific human financial advisors. Multiple digital avatars embodying the appearance and communication style of human advisors are generated. The system processes user and client profile data, along with advisor-specific information, to provide personalized financial advice. It handles client queries, escalating complex issues to human advisors when necessary. The digital advisor system communicates with profile datastores, user devices, and external data sources for comprehensive financial analysis. Continuous learning capabilities allow the system to improve its performance based on interactions and feedback, combining AI efficiency with personalized human-like advisory.

19 Claims, 38 Drawing Sheets

SYSTEM AND METHOD FOR A DIGITAL ADVISOR USING SPECIALIZED LANGUAGE MODELS AND ADAPTIVE AVATARS

CROSS-REFERENCE TO RELATED APPLICATIONS

Priority is claimed in the application data sheet to the following patents or patent applications, each of which is expressly incorporated herein by reference in its entirety:

Ser. No. 18/407,415

BACKGROUND OF THE INVENTION

Field of the Invention

The disclosure relates to the field of artificial intelligence in financial services, and more particularly to the field of digital financial advisory systems using specialized language models (SLMs) derived from large language models (LLMs). Specifically, the disclosure pertains to a system and method for creating and operating a digital advisor that mimics human financial experts, providing personalized financial guidance through an AI-driven avatar interfaces while maintaining the capability for human oversight and intervention.

The financial advisory industry, particularly Registered Investment Advisors (RIAs), faces significant challenges in scaling their services while maintaining personalized, expert-level advice across various financial domains. These challenges include scalability limitations, expertise silios, consistency in advice, 24/7 availability, personalization at scale, regulatory compliance and knowledge management. Current solutions often rely on static knowledge bases, rule-based systems, or general-purpose AI that lacks the nuanced understanding of specific financial domains and firm-specific expertise. These approaches fall short in providing the level of personalized, expert advice that clients expect from top-tier RIAs.

Furthermore, existing digital advisory systems often lack the personal touch and expertise of human advisors, leading to a disconnect between the convenience of digital tools and the trust and personalization of human interaction. This gap in the market creates a need for a solution that can combine the efficiency and scalability of AI-driven systems with the personalized approach of human financial advisors across multiple areas of financial expertise.

There is, therefore, a need for an advanced AI-driven system that can emulate the expertise of multiple financial specialists, provide personalized advice at scale, ensure regulatory compliance, and seamlessly integrate human oversight to maintain the high standards expected in professional financial advisory services.

Discussion of the State of the Art

The average Family Office client is frustrated by an inability to have accurate foresight into the ongoing and upcoming activities in their financial life; they have multiple advisors, and constituents that have differing agendas, motivations and knowledge bases. This leads to incredibly complicated and misaligned incentives to coordinate activities and information that is primarily aligned to the customer's benefit and NOT the advisor or third-party provider's benefit. In the end it becomes a task of herding cats, where it is nearly impossible to track and manage both the things that are happening, and the things that are missing but should be happening.

Today it is difficult for a financial advisor to organize all of a client's relevant and timely events and activities that relate to their finances in one easy to use, living application that needs little to no input or effort on the user's part that captures all of the important dates, projects and to-do's. Current solutions often require significant manual input, lack integration across various financial aspects, and fail to provide a comprehensive, real-time view of a client's financial activities and upcoming events.

Furthermore, existing digital advisory systems often lack the personal touch and expertise of human advisors, leading to a disconnect between the convenience of digital tools and the trust and personalization of human interaction. This gap in the market creates a need for a solution that can combine the efficiency and scalability of AI-driven systems with the personalized approach of human financial advisors.

SUMMARY OF THE INVENTION

Embodiments can include a system providing a digital advisor comprising an electronic computation device, wherein the electronic computation device comprises a processor, a memory coupled to the processor, and a communication interface coupled to the processor; a user profile datastore; a client profile datastore; a user device; a digital advisor application comprising at least a first plurality of programming instructions stored in the memory of, and operating on the processor of, the electronic computation device, wherein the first plurality of programming instructions; a data fusion suite comprising at least a second plurality of programming instructions stored in the memory of, and operating on at least one processor of, the computer system; a large language model (LLM) fine-tuning engine comprising at least a third plurality of programming instructions stored in the memory of, and operating on at least one processor of, the electronic computation device; a knowledge base comprising historical advice, strategies, and expertise specific to a financial advisory firm; multiple specialized language models (SLMs) each trained for a specific area of financial expertise, including at least portfolio management, financial planning, tax strategy, and corporate advisory, comprising at least a fourth plurality of programming instructions stored in the memory of, and operating on the processor of, the electronic computation device; a collaboration middleware for facilitating communication between the SLMs; an advisor review interface for human advisors to review and provide feedback on AI-generated responses; wherein the first plurality of programming instructions, when operating on the processor, cause the electronic computation device to: obtain user profile data from the user profile datastore; obtain client profile data from the client profile datastore; provide user profile data, client profile data, and financial advisor data to the data fusion suite; wherein the second plurality of programming instructions, when operating on the processor, cause the electronic computation device to: ingest the user profile data, client profile data, and financial advisor data; provide processed training data to the LLM fine-tuning engine; wherein the third plurality of programming instructions, when operating on the processor, cause the electronic computation device to: perform a hyperparameter optimization; perform an architecture modification analysis; perform iterative training on domain-specific data; perform validation checks; create a fine-tuned SLM model based on the iterative training and validation checks; wherein the fourth plurality of programming instructions, when operating on the processor, cause the electronic computation device to: receive a client query through a user interface on the user device; analyze the query to determine which SLMs are required to address it; activate and coordinate responses from relevant SLMs from complex queries spanning multiple areas of expertise; generate a response to the query using the relevant SLMs; generate multiple specialized digital avatars, each mimicking a specific human advisor's appearance and communication style for a particular area of financial expertise; present the response to the client through one or more digital avatars on the user device, representing the relevant areas of expertise; record the interaction for continuous learning and improvement of the SLMs.

Additional embodiments can include a method for providing a digital financial advisor, obtaining user profile data from a user profile datastore; obtaining client profile data from a client profile datastore; obtaining financial advisor data; processing the user profile data, client profile data, and financial advisor data to create processed training data; providing the processed training data to a LLM fine-tuning engine; performing hyperparameter optimization; perform an architecture modification analysis; performing validation checks; creating multiple fine-tuned SLM models, each specialized in a specific area of financial expertise; generating a digital avatar that mimics a specific human financial advisor's expertise and communication style; receiving a client query through a user interface on a user device; analyzing the query to determine its nature and complexity; determining if the query's complexity exceeds a predetermined threshold; if the threshold is exceeded, escalating the query to the human financial advisor; generating responses using the relevant specialized SLMs; presenting the response through one or more digital avatars representing the relevant areas of expertise; recording the interaction for continuous learning and improvement of the SLM.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION OF THE INVENTION

Figure 1:
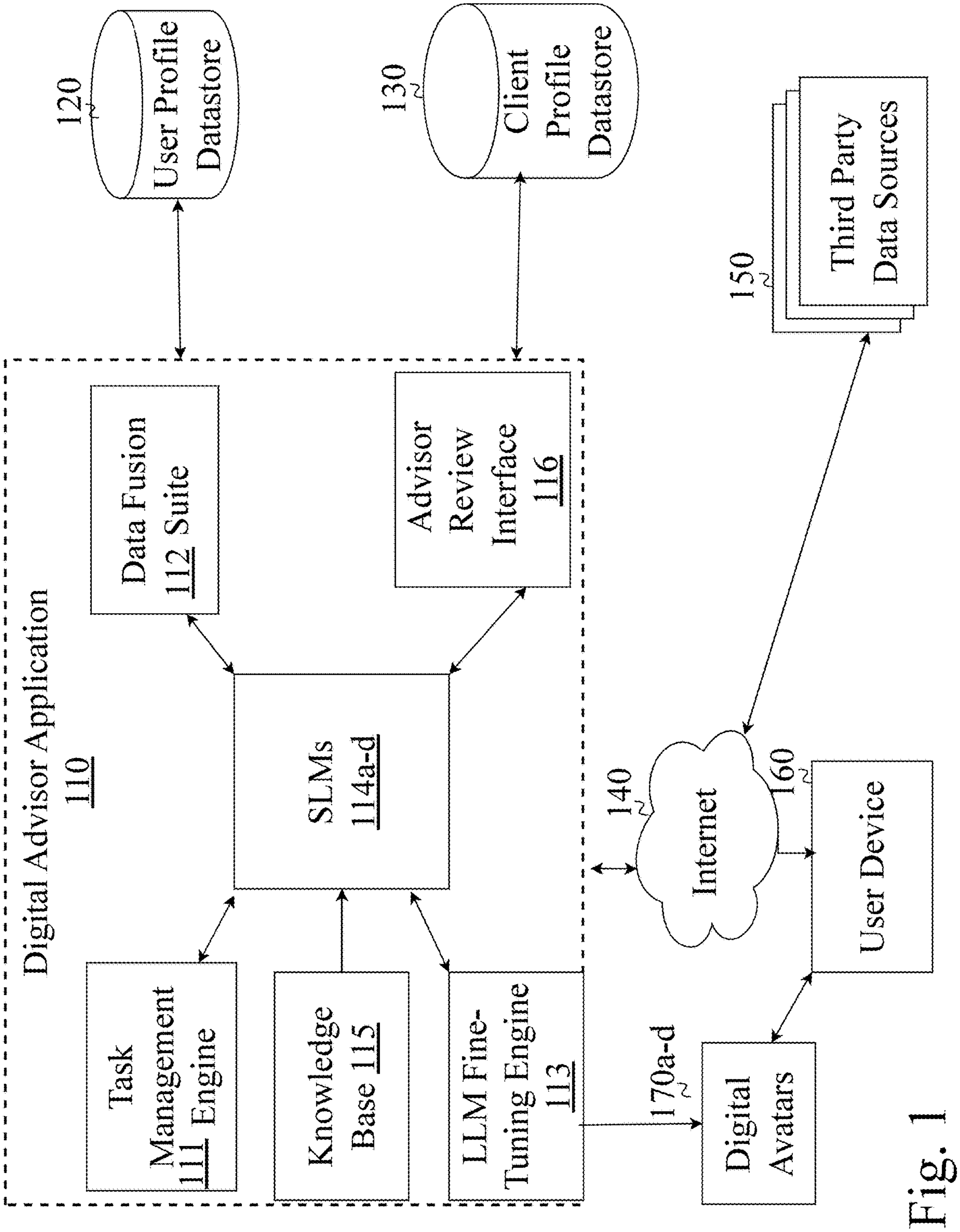
FIG. 1 is a block diagram illustrating an exemplary system architecture for a digital advisor system, according to one aspect.

The inventor has conceived, and reduced to practice, a system and method for providing a digital advisor using specialized language models and adaptive avatars for personalized financial guidance.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself. For example, the specialized language model (SLM) and avatar generation capabilities described herein may be implemented in various configurations of hardware and software, not limited to a single device or system.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Client" is used herein to refer to the clients of a firm, individual, or organization that operates the system described herein. For example, the client may be a client of a financial firm that employs the financial firm as an advisor or manager, the financial firm being the actual primary operator of the system disclosed.

"User" is used herein to refer to any individual or organization who may use or have cause to use the system described herein, which includes financial firms, businesses, and employees of businesses who may use the system, but may also include their clients if the application is used or extended to provide scheduling services or share scheduling and alert data with a non-employee user. In this way, the term "user" may be thought of as a superset that may contain the same entities referred to as "clients", as well as others not referred to as "clients".

"Artificial intelligence" or "AI" as used herein means a computer system or component that has been programmed in such a way that it mimics some aspect or aspects of cognitive functions that humans associate with human intelligence, such as learning, problem solving, and decision-making. Examples of current AI technologies include understanding human speech, competing successfully in strategic games such as chess and Go, autonomous operation of vehicles, complex simulations, and interpretation of complex data such as images and video.

"Machine learning" as used herein is an aspect of artificial intelligence in which the computer system or component can modify its behavior or understanding without being explicitly programmed to do so. Machine learning algorithms develop models of behavior or understanding based on information fed to them as training sets, and can modify those models based on new incoming information. An example of a machine learning algorithm is AlphaGo, the first computer program to defeat a human world champion in the game of Go. AlphaGo was not explicitly programmed to play Go. It was fed millions of games of Go, and developed its own model of the game and strategies of play.

"Neural network" as used herein means a computational model, architecture, or system made up of a number of simple, highly interconnected processing elements which process information by their dynamic state response to external inputs, and is thus able to "learn" information by recognizing patterns or trends. Neural networks, also sometimes known as "artificial neural networks" are based on our understanding of the structure and functions of biological neural networks, such as the brains of mammals. A neural network is a framework for application of machine learning algorithms.

"Digital Advisor" as used herein refers to an AI-driven system that mimics a human financial advisor, providing personalized financial advice and guidance through a digital interface. It combines specialized language models, avatar technology, and financial expertise to interact with clients in a human-like manner.

"Specialized Language Model" (SLM) as used herein refers to a large language model that has been fine-tuned on domain-specific data, in this case financial advisory information and communication styles of specific human advisors. The SLM is capable of generating responses that mimic the expertise and communication style of a particular human financial advisor.

"Avatar" as used herein to a digital representation of a financial advisor, which may include visual and/or auditory components. The avatar is designed to mimic the appearance, voice, and mannerisms of a specific human advisor, providing a personalized interface for client interactions.

"Fine-tuning" as used herein refers to the process of adapting a pre-trained large language model to a specific task or domain by training it on a smaller, specialized dataset. In the context of this invention, fine-tuning involves adapting a general LLM to become a specialized financial advisory SLM.

"Human-in-the-loop" as used herein refers to a process that combines AI automation with human oversight and intervention. In this system, it describes the ability to escalate complex queries or situations to human advisors when the AI system's capabilities are exceeded.

Conceptual Architecture

FIG. 1 is a block diagram illustrating an exemplary system architecture for a digital advisor system, according to one aspect. A digital advisor 110 exists that comprises at least a task management engine 111, data fusion suite 112, a large language model (LLM) fine-tuning engine 113, and multiple specialized language models (SLM) 114*a-d*, with connections to a user profile datastore 120, client profile datastore 130, and through the internet 140 it also may connect with third-party data sources 150 and at least one user device 160, where the user device may be any common end-user device for computing or task tracking or communications, including fitness trackers, digital assistants, laptops, desktops, mobile phones including smartphones, tablets, or other common computing devices. The digital advisor application 110 also includes a proprietary Knowledge base 115 and an Advisor Review Interface 116. A digital advisor application may exist on a server or in a cloud architecture in a serverless or elastic configuration, and may maintain connections to separate or external datastores 120, 130, or may have such datastores as internal parts of the server or cloud configuration, or the application's configuration, depending on the implementation and architectural choices made when implementing the invention. It will be obvious to anyone skilled in the art that implementing an internet-capable application has many possible varieties that are currently common, including a browser-based application, a locally executed desktop application, or a mobile phone application, and therefore none of these possible implementations should be considered limiting or novel over the disclosed invention.

A third-party data source 150 may be a financial institution such as a bank, stock brokerage, trading platform, credit union or loaning service, data subscription service or feed, news service or publication, or some other third-party or external data provider for which any useful scheduling, financial, regulatory, or business-related data, may be acquired. Such a third-party data source 150 may be sent requests for up-to-date data from the digital advisor application 110 or may be configured to send data updates or livestreaming data to the digital advisor application 110, depending on the data source and configuration.

The SLMs 114*a-d* are core components of the digital advisor application 110, each specialized in a specific area of financial expertise: Portfolio Management, Financial Planning, Tax Strategy, and Corporate Advisory. Each SLM processes queries and generates responses through its corresponding Digital Avatar 170*a-d* mimicking a specific human financial advisor's expertise and communication style. The LLM fine-tuning engine 113 is used to create and update the SLMs 114*a-d*, optimizing them for their respective financial advisory tasks. The task management engine 111 works in tandem with the SLMs 114-*d* and the data fusion suite 112 to manage schedules, tasks, and events relevant to financial planning and investment strategies. The SLMs 114*a-d* may be continuously updated based on new data interactions, feedback, and input from the proprietary Knowledge base 115, improving their ability to provide personalized financial advice.

A client profile datastore 130 is used for holding profile data including preferences, settings, financial goals, and more, about a client using the digital advisor application 110. For instance, a client's risk tolerance, investment preferences, or long-term financial objectives may be stored in their profile in the datastore 130. Similarly, a user profile datastore 120 stores profile data about financial advisors or institutions using the digital advisor application 110 delivering advice for a client. Data stored in profiles may include communication styles, areas of expertise, and historical performance, which are used by the SLMs 114*a-d* to personalize their responses and mimic specific human advisors.

The proprietary knowledge base 115, contains historical advice, strategies, and expertise unique to the financial advisory firm. This knowledge base is continuously updated and serves as a crucial input for training and fine-tuning the SLMs 114*a-d*, ensuring that the AI-generated advice aligns with the firm's specific approach and expertise. The advisor review interface 116 allows human advisors to review and monitor interactions between clients and the AI avatars. Through this interface, advisors can provide feedback, make adjustments, and ensure that the AI-generated responses align with the firm's operational standards and advisory principles.

The digital advisor application 110 includes a cross-expertise collaboration mechanism that allows the SLMs 114*a-d* to work together on complex, multi-faceted queries. When a client's question spans multiple areas of expertise, the system activates the relevant SLMs and facilitates communication between them to generate a comprehensive, integrated response.

The digital avatars 170*a-d* serve as the visual and interactive representation of each specialized AI advisor. These avatars are designed to mimic the appearance, communication style, and mannerisms of specific human advisors, providing a personalized and engaging interface for client interactions.

The digital advisor system employs a comprehensive suite of performance metrics and benchmarking techniques to rigorously evaluate its effectiveness and ensure continuous improvement. At the core of this evaluation framework is a set of quantitative metrics designed to assess various aspects of the system's performance. These include accuracy rates for financial predictions, measured by comparing the system's forecasts against actual market outcomes over different time horizons. The system also tracks the success rate of its investment recommendations, calculating the percentage of advice that results in positive returns for clients. Response time is another crucial metric, measuring the system's ability to provide timely advice in rapidly changing market conditions. To evaluate the quality of personalization, the system employs a customization index that quantifies how well the advice aligns with the individual client profiles and preferences. Risk assessment accuracy is measured by comparing the system's risk evaluations with actual market volatility and investment outcomes. Additionally, the system utilizes the natural language processing techniques to analyze client feedback, generating sentiment scores that reflect user satisfaction and the perceived helpfulness of the advice provided.

To benchmark its performance against human advisors, the digital advisor system engages in regular comparative analyzes. These involve parallel advisory scenarios where both the AI system and a panel of experienced human financial advisors are presented with identical client profiles and market conditions. The advice generated by both is then evaluated based on factors such as comprehensiveness, innovation in strategy, risk-adjusted returns, and alignment with client goals. The system also undergoes periodic Turing-style tests, where a panel of financial experts evaluates anonymized advice from both the AI and human advisors, assessing whether they can distinguish between the two sources. To ensure real-world applicability, the system participates in simulated portfolio management exercises, competing against human-managed portfolios over extended periods. These simulations incorporate various market conditions and economic scenarios to test the system's adaptability and long-term performance. Furthermore, the digital advisor system is subjected to stress tests that evaluate its performance under extreme market conditions, comparing its resilience and decision-making capabilities to those of human advisors in crisis situations.

The benchmarking process also includes an innovation index, measuring the system's ability to generate novel financial strategies compared to traditional human-devised approaches. This is particularly important in rapidly evolving areas such as cryptocurrency investments or sustainable finance. Compliance accuracy is another critical benchmark, where the system's adherence to the financial regulations and its ability to navigate complex legal requirements is compared against the performance of human compliance officers. All these metrics and benchmarking results are continuously monitored and analyzed, with the findings used to refine and enhance the system's algorithms and knowledge base. This rigorous evaluation and benchmarking framework ensures that the digital advisor system not only matches but often exceeds the performance of human advisors, while continuously evolving to meet the dynamic challenges of the financial advisory landscape.

Figure 2:
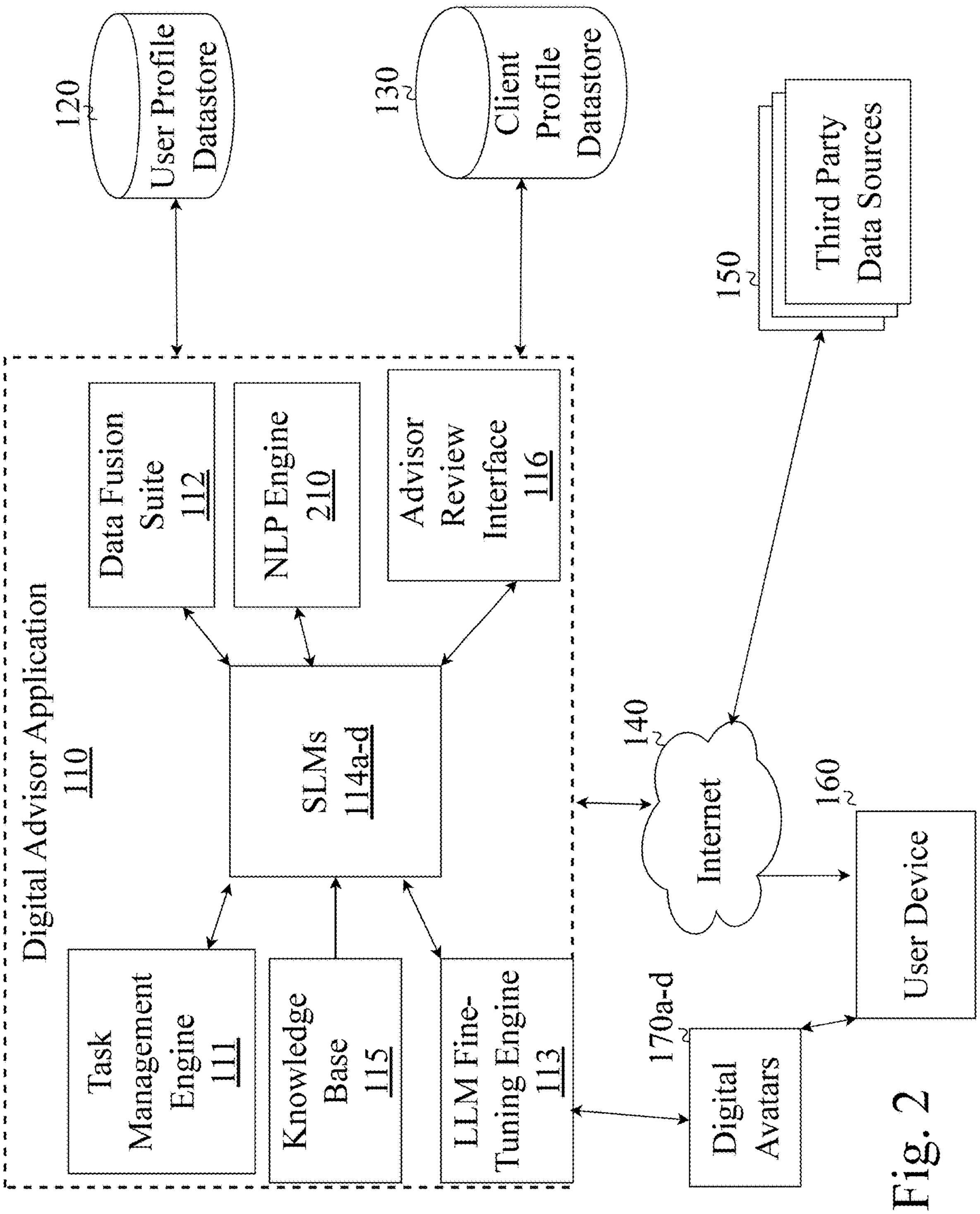
FIG. 2 is a block diagram illustrating an exemplary system architecture for system and method for the digital advisor system, utilizing a natural language processing capabilities integrated with the SLM, according to one aspect.

FIG. 2 is a block diagram illustrating an exemplary system architecture for system and method for the digital advisor system, utilizing a natural language processing capabilities integrated with multiple Specialized Language Models SLMs, according to one aspect. A digital advisor application 110 exists that comprises at least a task management engine 111, data fusion suite 112, LLM Fusion Engine 113, SLMs 114*a-d*, and a Natural Language Processing Engine 210, a Knowledge Base 115, and an Advisor Review Interface 116. The application has connections to a user profile datastore 120, client profile datastore 130, and through the internet 140 it also may connect with third-party data sources 150 and at least one user device 160, where the user device may be any common end-user device for computing or task tracking or communications, including digital assistants, laptops, desktops, mobile phones including smartphones, tablets, or other common computing devices. A digital advisor application 110 may exist on a server or in a cloud architecture in a serverless or elastic configuration, and may maintain connections to separate or external datastores 120, 130, or may have such datastores as internal parts of the server or cloud configuration, or the application's configuration, depending on the implementation and architectural choices made when implementing the invention. It will be obvious to anyone skilled in the art that implementing an internet-capable application has many possible varieties that are currently common, including a browser-based application, a locally executed desktop application, or a mobile phone application, and therefore none of these possible implementations should be considered limiting or novel over the disclosed invention.

The SLMs 114*a-d* process the analyzed queries to generate financial advice in their respective areas of expertise. They are connected to the LLM Fine-tuning Engine 113, which continuously updates the SLMs based on new data and interactions, and input from the Proprietary Knowledge Base 215, enhancing their financial expertise. The Data Fusion Suite 112 feeds into both the NLP Engine 210 and the SLMs 114*a-d*, providing a constant stream of up-to-date financial data, market trends, and regulatory information. This ensures that the advice generated is based on the latest available information. The Task Management Engine 111 is interfaces with both the NLP Engine 210 and SLMs 114*a-d*, translating natural language inputs into actionable financial tasks and schedules across various domains. The Digital Avatar Generator 170, is linked to the Digital Advisor Application 110, generating visual and interactive representations of a financial advisors, for each area of expertise, mimicking human-like interactions based on the processed language and personalized responses.

A third-party data source 150 may be a financial institution such as a bank, stock brokerage, trading platform, credit union or loaning service, data subscription service or feed, news service or publication, or some other third-party or external data provider for which any useful scheduling, financial, world-event, or business-related data, may be acquired from. Such a third-party data source 150 may be sent requests for up-to-date data from the scheduling application 110, or may be configured to send data updates or livestreaming data to the smart scheduling application 110, depending on the data source and configuration.

A task management engine 111 is a component of a digital advisor application 110 that manages the actual placement of individual tasks or events or similar, into a set schedule, that is viewable or readable by a user. These tasks may represent meeting dates, earnings dates for businesses, market holidays, tax loss harvesting dates, or any other date relevant to the planning and execution of an investment strategy or financial management strategy for a client or on behalf of a client. A client and user may be the same entity, or separate entities. An LLM-fine tuning engine 113 is used in tandem with the task management engine 111 and the data fusion suite 112 to handle training of models on a general and per-user and per-client basis, to optimize automated task scheduling, adjusting, and updating, as new data or information is received or released that may be relevant to schedule a new event or task for. The tasks managed by the task management engine 111 may be manually altered, deleted, or added to, and such manual alterations or any user profile preferences for what kinds of tasks or information to pay attention to, are sent to the LLM Fine-tuning engine 113 to update how to handle similar information or tasks that may be received and potentially planned for a user. Such changes may be saved in the user or client profiles, or both, in their respective datastores 120, 130.

A client profile datastore 130 is used for holding profile data including preferences, settings, financial goals, and more, about a client using the digital advisor application 110. For instance, a client's risk tolerance, investment preferences, or long-term financial objectives may be stored in their profile in the datastore 130. Similarly, a user profile datastore 120 stores profile data about a user of the smart scheduling application 110, such as a financial advisors or institutions using the digital advisor application 110. Data stored in profiles may include communication styles, areas of expertise, and historical performance, which are used by the SLM 114 to personalize its responses and mimic specific human advisors.

According to an embodiment, a natural language processor 210 such as an advanced language model for responding to human-language queries or sentences, may be provided as part of a digital advisor application 110. The natural language processor may take the place of a traditional user interface for calendaring or scheduling applications that may normally have a visual interface, and instead allow users or clients to communicate with the scheduling and task management by sending text or speech-to-text communications to the system, including but not limited to Short Message Service ("SMS") messages, email, chat messages from a web or application interface, social media messages over a social network, voicemail or phone calls, or other methods of transmitting human-language queries. The digital advisor application may generate personalized financial advice, make adjustments to investment strategies, or report on financial performance based on the communications received and processed by the natural language processing engine 210, providing responses through the digital avatar 170*a-d* or other user interfaces as requested.

The Knowledge Base 215 contains historical advice, strategies, and expertise unique to the financial advisory firm. This knowledge base is continuously updated and serves as a crucial input for training and fine-tuning the SLMs 114*a-d*, ensuring that the AI-generated advice aligns with the firm's specific approach and expertise across all areas of financial advisory. The Advisor Review Interface 216 allows human advisors to review and monitor interactions between clients and the AI avatars for each area of expertise. Through this interface, advisors can provide feedback, make adjustments, and ensure that the AI-generated responses align with the firm's operational standards and advisory principles across all domains of financial advice.

The digital advisor application 110 includes a cross-expertise collaboration mechanism that allows the SLMs 114*a-d* to work together on complex, multi-faceted queries. When a client's question spans multiple areas of expertise (e.g., involving both tax strategy and portfolio management), the system activates the relevant SLMs and facilitates communication between them to generate a comprehensive, integrated response, mimicking the collaborative approach of a team of human financial experts.

The digital advisor system employs sophisticated conflict resolution mechanism to address instances where Specializes Language Models (SLMs) provide conflicting advice on complex financial queries. This process begins with advanced conflict detection methods. The system utilizes natural language processing for semantic analysis to identify inconsistencies in the advice generated by different SLMs. For quantitative recommendations, it employs numerical discrepancy detection to flag significant asset allocation percentages. Additionally, the system compares risk assessments from different SLMs to identify conflicting risk evaluations. Once conflicts are detected, the system applies a series of resolution algorithms. A weighted voting mechanism assigns importance to each SLM's advice based on factors such as the SLM's relevance to the specific query domain, its historical performance in similar scenarios, and the confidence score of its current recommendation. The system then aggregates these weighted votes to determine the final advice. In parallel, a Bayesian inference model is employed to capture the interdependencies between various aspects of financial advice. This model updates its beliefs based on input from each SLM and infers the most probable correct advice. For conflicts involving numerical recommendations, the system utilizes multi-objective optimization techniques, formulating a problem that aims to maximize returns, minimize risk, and adhere to client preferences simultaneously. It employs methods like Pareto optimization to find a balanced solution. Furthermore, the system constructs a decision tree that incorporates advice from all SLMs, evaluating different paths based on expected outcomes and client goals. The path with the highest expected utility is ultimately chosen for the final recommendation. In cases where these automated resolution methods fail to produce a satisfactory solution, an escalation protocol is triggered. The system flags the conflict for human advisor review, providing a detailed breakdown of the conflicting advice and the attempted resolution methods. This allows the human advisor to make a final decision or provide additional input for the system to re-evaluate. Importantly, the conflict resolution process is designed as a continuous learning system. It records the outcomes of all resolutions and uses reinforcement learning to improve its strategies over time. Successful resolutions are fed back into the training data for all SLMs, which helps to reduce the likelihood of future conflicts. Transparency is a key feature of this conflict resolution process. Whenever conflicts occur and are resolved, the system generates a clear explanation of the resolution process. This explanation is made available to both humans advisors and clients, ensuring full transparency in the decision-making process. By implementing this comprehensive conflict resolution mechanism, the digital advisor system demonstrates its ability to handle complex, multi-faceted financial queries and provide coherent, well-reasoned advice even when initial recommendations from different specialized models are in conflict.

Figure 3:
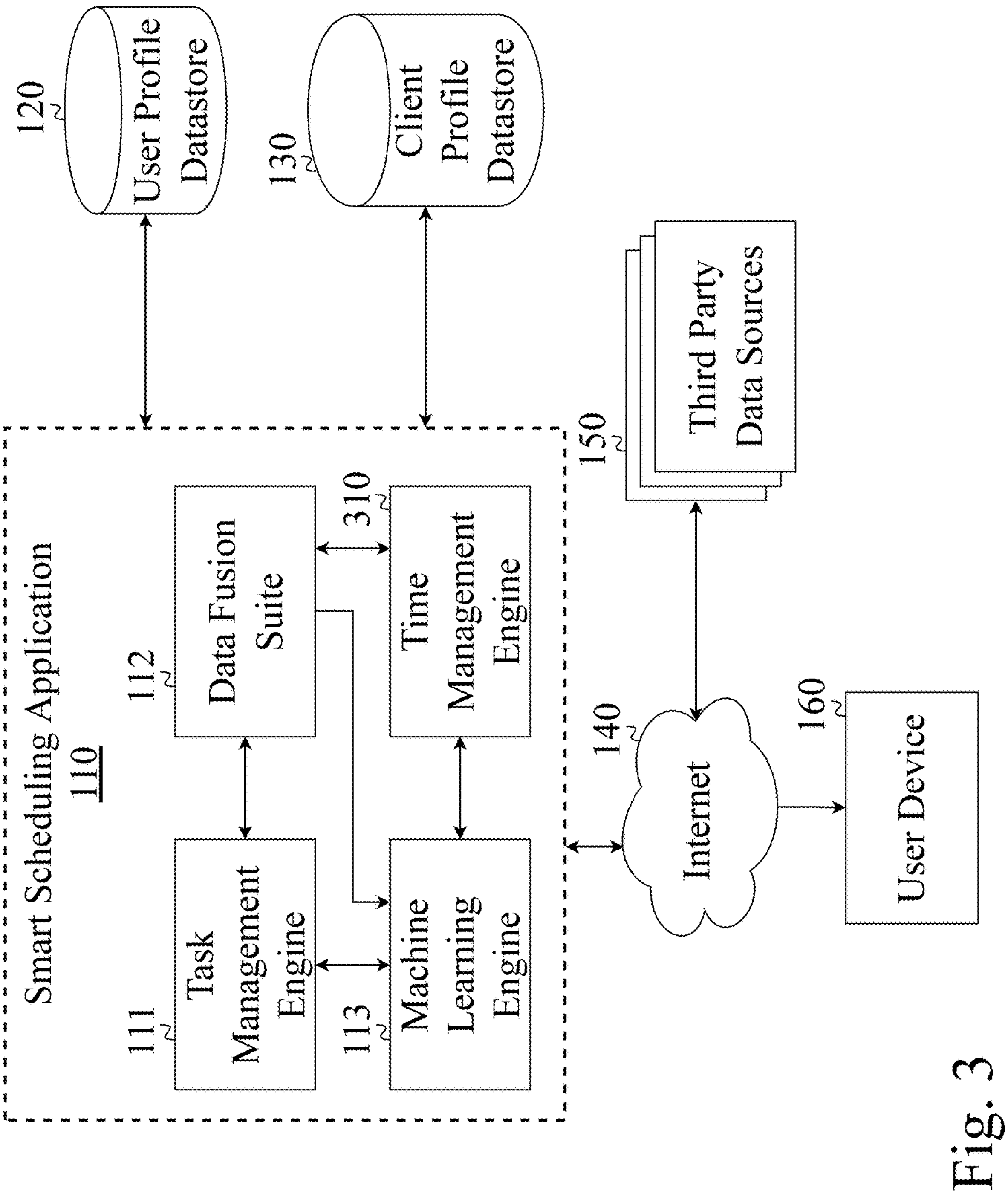
FIG. 3 is a block diagram illustrating an exemplary system architecture for system and method for task scheduling and financial planning, utilizing a time management engine, according to one aspect.

FIG. 3 is a block diagram illustrating an exemplary system architecture for system and method for task scheduling and financial planning, utilizing a time management engine, according to one aspect. A smart scheduling application 110 exists that comprises at least a task management engine 111, data fusion suite 112, and machine learning engine 113, with connections to a user profile datastore 120, client profile datastore 130, and through the internet 140 it also may connect with third-party data sources 150 and at least one user device 160, where the user device may be any common end-user device for computing or task tracking or communications, including fitness trackers, digital assistants, laptops, desktops, mobile phones including smartphones, tablets, or other common computing devices. A smart scheduling application 110 may exist on a server or in a cloud architecture in a serverless or elastic configuration, and may maintain connections to separate or external datastores 120, 130, or may have such datastores as internal parts of the server or cloud configuration, or the application's configuration, depending on the implementation and architectural choices made when implementing the invention. It will be obvious to anyone skilled in the art that implementing an internet-capable application has many possible varieties that are currently common, including a browser-based application, a locally executed desktop application, or a mobile phone application, and therefore none of these possible implementations should be considered limiting or novel over the disclosed invention.

A third-party data source 150 may be a financial institution such as a bank, stock brokerage, trading platform, credit union or loaning service, data subscription service or feed, news service or publication, or some other third-party or external data provider for which any useful scheduling, financial, world-event, or business-related data, may be acquired from. Such a third-party data source 150 may be sent requests for up-to-date data from the scheduling application 110, or may be configured to send data updates or livestreaming data to the smart scheduling application 110, depending on the data source and configuration.

A task management engine 111 is a component of a smart scheduling application 110 that manages the actual placement of individual tasks or events or similar, into a set schedule, that is viewable or readable by a user. These tasks may represent meeting dates, earnings dates for businesses, market holidays, tax loss harvesting dates, or any other date relevant to the planning and execution of an investment strategy or financial management strategy for a client or on behalf of a client. A client and user may be the same entity, or separate entities. A machine learning engine 113 is used in tandem with the task management engine 111 and the data fusion suite 112 to handle training of models on a general and per-user and per-client basis, to optimize automated task scheduling, adjusting, and updating, as new data or information is received or released that may be relevant to schedule a new event or task for. The tasks managed by the task management engine 111 may be manually altered, deleted, or added to, and such manual alterations or any user profile preferences for what kinds of tasks or information to pay attention to, are sent to the machine learning engine 113 to update how to handle similar information or tasks that may be received and potentially planned for a user (either for the user as a whole, or for that user when managing a specific client). Such changes may be saved in the user or client profiles, or both, in their respective datastores 120, 130.

A client profile datastore 130 is used for holding profile data including preferences, settings, financial goals, and more, about a client of an entity using or operation the smart scheduling application 110. For instance, a client's preferences for Environmental, Social, and Governance (ESG) stocks for their investment portfolio, stocks or companies in certain industries, or certain kinds of financial assets or real property in specific locations, may be stored in their profile in the datastore 130. Similarly, a user profile datastore 120 stores profile data about a user of the smart scheduling application 110, such as a financial advisor, family office advisor, investment advisor, broker, or business planner operating on behalf of or delivering advice for a client. Data stored in profiles may include data relevant to the operation of a machine learning model by the machine learning engine 113, such as adjustments made to a client's portfolio or a user's schedule that may indicate certain information or tasks should be planned differently when automated planning takes place with the task management engine 111.

According to an embodiment, a time management engine 310 exists as another component of a smart scheduling application 110, which is specifically designed for allowing for custom time budgeting for tasks or categories of tasks, and working with a machine learning engine 113 to optimize the task management and scheduling of tasks to conform to time budgeting rules established by the time management engine 310. For instance, a user may have a rule applied that they may only allocate 10 minutes for catching up with an earnings report and rebalance of a portfolio as a result, which may change the scheduling of tasks within the task management engine 111 when it is forced to allocate a 10-minute window for that event, instead of either a larger or smaller time than it may have originally allocated. In this way, rules and optimizations for time budgeting for users may be applied, for fine-tuning of the automated process of task management and scheduling.

Figure 4:
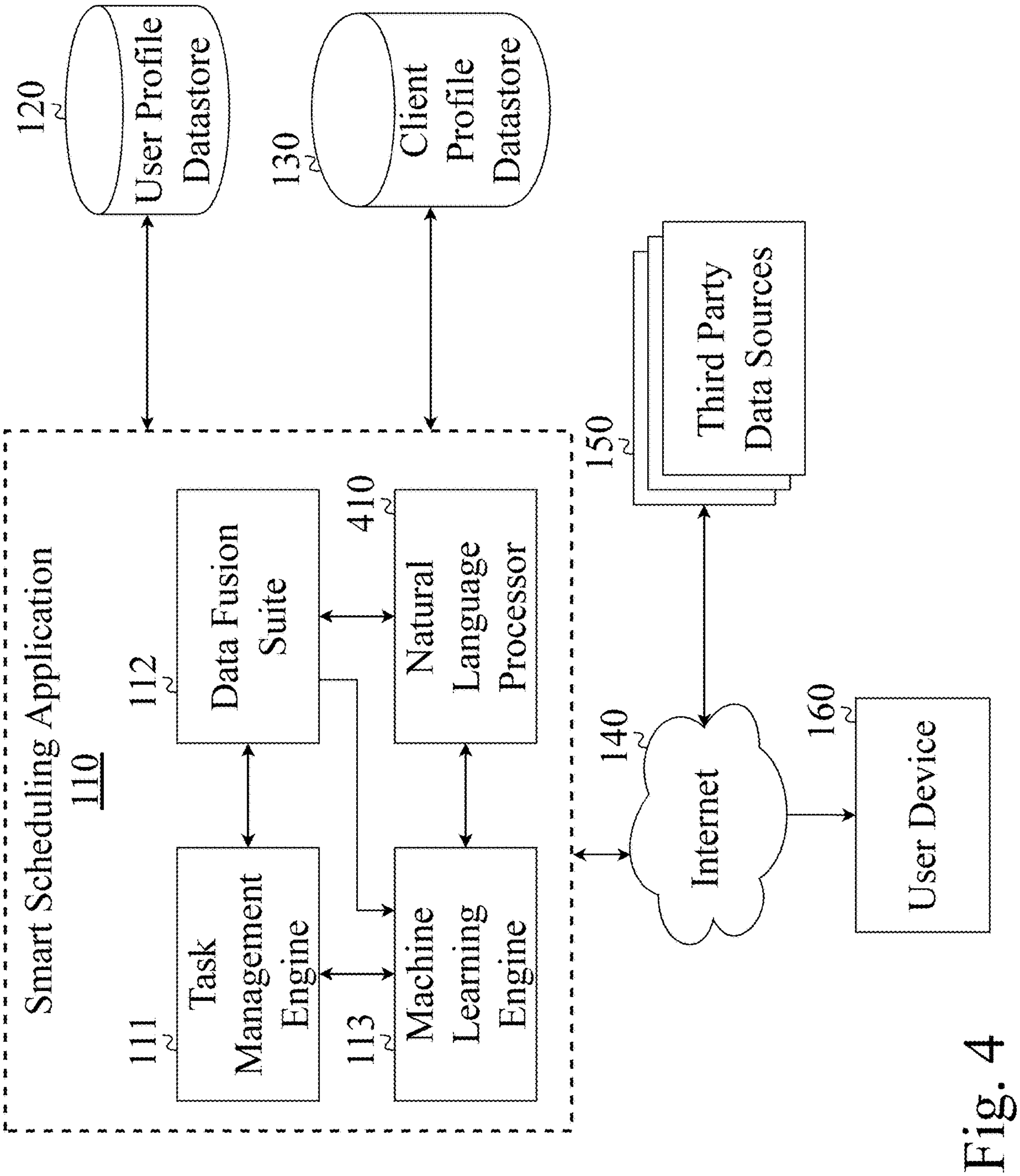
FIG. 4 is a block diagram illustrating an exemplary system architecture for system and method for task scheduling and financial planning, utilizing a natural language processing engine, according to one aspect.

FIG. 4 is a block diagram illustrating an exemplary system architecture for system and method for task scheduling and financial planning, utilizing a natural language processing engine, according to one aspect. A smart scheduling application 110 exists that comprises at least a task management engine 111, data fusion suite 112, and machine learning engine 113, with connections to a user profile datastore 120, client profile datastore 130, and through the internet 140 it also may connect with third-party data sources 150 and at least one user device 160, where the user device may be any common end-user device for computing or task tracking or communications, including fitness trackers, digital assistants, laptops, desktops, mobile phones including smartphones, tablets, or other common computing devices. A smart scheduling application 110 may exist on a server or in a cloud architecture in a serverless or elastic configuration, and may maintain connections to separate or external datastores 120, 130, or may have such datastores as internal parts of the server or cloud configuration, or the application's configuration, depending on the implementation and architectural choices made when implementing the invention. It will be obvious to anyone skilled in the art that implementing an internet-capable application has many possible varieties that are currently common, including a browser-based application, a locally executed desktop application, or a mobile phone application, and therefore none of these possible implementations should be considered limiting or novel over the disclosed invention.

A third-party data source 150 may be a financial institution such as a bank, stock brokerage, trading platform, credit union or loaning service, data subscription service or feed, news service or publication, or some other third-party or external data provider for which any useful scheduling, financial, world-event, or business-related data, may be acquired from. Such a third-party data source 150 may be sent requests for up-to-date data from the scheduling application 110, or may be configured to send data updates or livestreaming data to the smart scheduling application 110, depending on the data source and configuration.

A task management engine 111 is a component of a smart scheduling application 110 that manages the actual placement of individual tasks or events or similar, into a set schedule, that is viewable or readable by a user. These tasks may represent meeting dates, earnings dates for businesses, market holidays, tax loss harvesting dates, or any other date relevant to the planning and execution of an investment strategy or financial management strategy for a client or on behalf of a client. A client and user may be the same entity, or separate entities. A machine learning engine 113 is used in tandem with the task management engine 111 and the data fusion suite 112 to handle training of models on a general and per-user and per-client basis, to optimize automated task scheduling, adjusting, and updating, as new data or information is received or released that may be relevant to schedule a new event or task for. The tasks managed by the task management engine 111 may be manually altered, deleted, or added to, and such manual alterations or any user profile preferences for what kinds of tasks or information to pay attention to, are sent to the machine learning engine 113 to update how to handle similar information or tasks that may be received and potentially planned for a user (either for the user as a whole, or for that user when managing a specific client). Such changes may be saved in the user or client profiles, or both, in their respective datastores 120, 130.

A client profile datastore 130 is used for holding profile data including preferences, settings, financial goals, and more, about a client of an entity using or operation the smart scheduling application 110. For instance, a client's preferences for Environmental, Social, and Governance (ESG) stocks for their investment portfolio, stocks or companies in certain industries, or certain kinds of financial assets or real property in specific locations, may be stored in their profile in the datastore 130. Similarly, a user profile datastore 120 stores profile data about a user of the smart scheduling application 110, such as a financial advisor, family office advisor, investment advisor, broker, or business planner operating on behalf of or delivering advice for a client. Data stored in profiles may include data relevant to the operation of a machine learning model by the machine learning engine 113, such as adjustments made to a client's portfolio or a user's schedule that may indicate certain information or tasks should be planned differently when automated planning takes place with the task management engine 111.

According to an embodiment, a natural language processor 410 such as an advanced language model for responding to human-language queries or sentences, may be provided as part of a smart scheduling application 110. The natural language processor may take the place of a traditional user interface for calendaring or scheduling applications that may normally have a visual interface, and instead allow users or clients to communicate with the scheduling and task management by sending text or speech-to-text communications to the system, including but not limited to Short Message Service ("SMS") messages, email, chat messages from a web or application interface, social media messages over a social network, voicemail or phone calls, or other methods of transmitting human-language queries. The scheduling application may make alterations or adjustments to the schedule of a user based on the communications received from the natural language processor 410, and report upcoming tasks or events, or report back an entire section of the schedule, to a user, if requested.

Detailed Description of Exemplary Aspects

Figure 5:
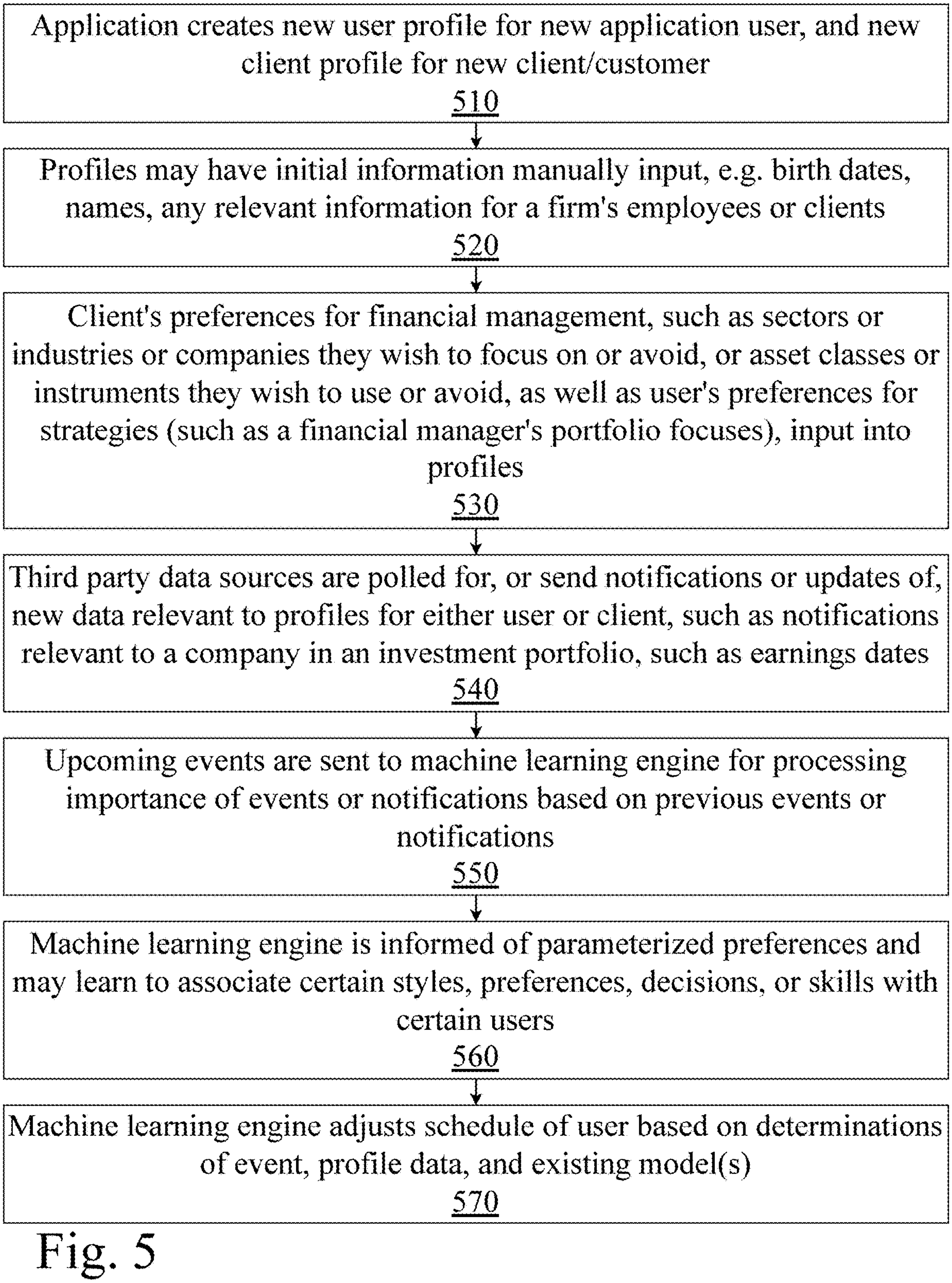
FIG. 5 is a flow diagram illustrating an exemplary method for system architecture for system and method for task scheduling and financial planning, specifically the process of fusing multiple data sources and any existing profile or schedule data to alert users of financial events or information, according to one aspect.

FIG. 5 is a flow diagram illustrating an exemplary method for system architecture for system and method for task scheduling and financial planning, specifically the process of fusing multiple data sources and any existing profile or schedule data to alert users of financial events or information, according to one aspect.

First, the smart scheduling application may create a new user profile for a new application user, and if applicable, a new client profile as well, for a new client or customer 510. Either profile may forego being created if they already exist for a given user or client, and instead, they may simply be marked as being paired in their respective profiles, rather than being created together. This pairing or corresponding of profiles (such as a financial manager as the user of the application, and a client whose funds or investments they manage) may be part of a subsequent step of having new profiles enter their relevant information, such as birth dates, names, business information, investment or financial data that may be relevant for the usage of the application, and more 520.

A client's preferences for financial management, if any, such as sectors or industries or companies they wish to focus on or avoid, asset classes or instruments they wish to use or avoid, as well as user's preferences for strategies (such as a financial manager's portfolio focuses), or any other information such as financial or investment goals or even ESG requirements they personally adhere to, may be input into a new client profile 530, as part of setting up the necessary data to allow for the scheduling application to automatically schedule tasks or deadlines or similar that may be relevant to a client.

Third-party data sources may then be polled for, or proactively send notifications or updates of, new data relevant to the client or user based on their profiles, such as notifications relevant to a company in an investment portfolio including earnings dates 540. Other scheduling data may be received or even locally calculated or planned for, such as important dates for tax loss harvesting or for capital gains tax rules to be applied before being able to sell certain assets, as the case may be for an individual client's financial situation.

When data or possible upcoming events are received or detected, any new information and events are sent to a machine learning engine for processing of the importance (or even the likelihood of occurrence) of events or notifications based on previous events or notifications 550. For instance, if a user has chosen before to ignore notifications of earnings statements for some reason from a given company, but not from others, then those announcements or dates may be filtered out by the machine learning engine in the future and not scheduled for the user to pay attention to.

The machine learning engine may also be informed of parameterized preferences for a user or client, and may learn to associate certain styles, preferences, decisions, or skills with certain users 560, such as some users having a preference or keen ability for short duration derivatives trading, pairs trading, or other strategies and financial management techniques. Data relevant to such formats of financial management may then be given higher priority for scheduling events or notifying users of data or changes that the system is made aware of, including market fluctuations or market events, or news events that may match certain keywords in news feeds that may be polled. The machine learning engine then may adjust the schedule of a user based on these determinations of events and event-related data, the user and client profile data, and existing machine learning models, if any 570, to provide for partially automated and optimized scheduling for financial management entities and their clients.

Figure 6:
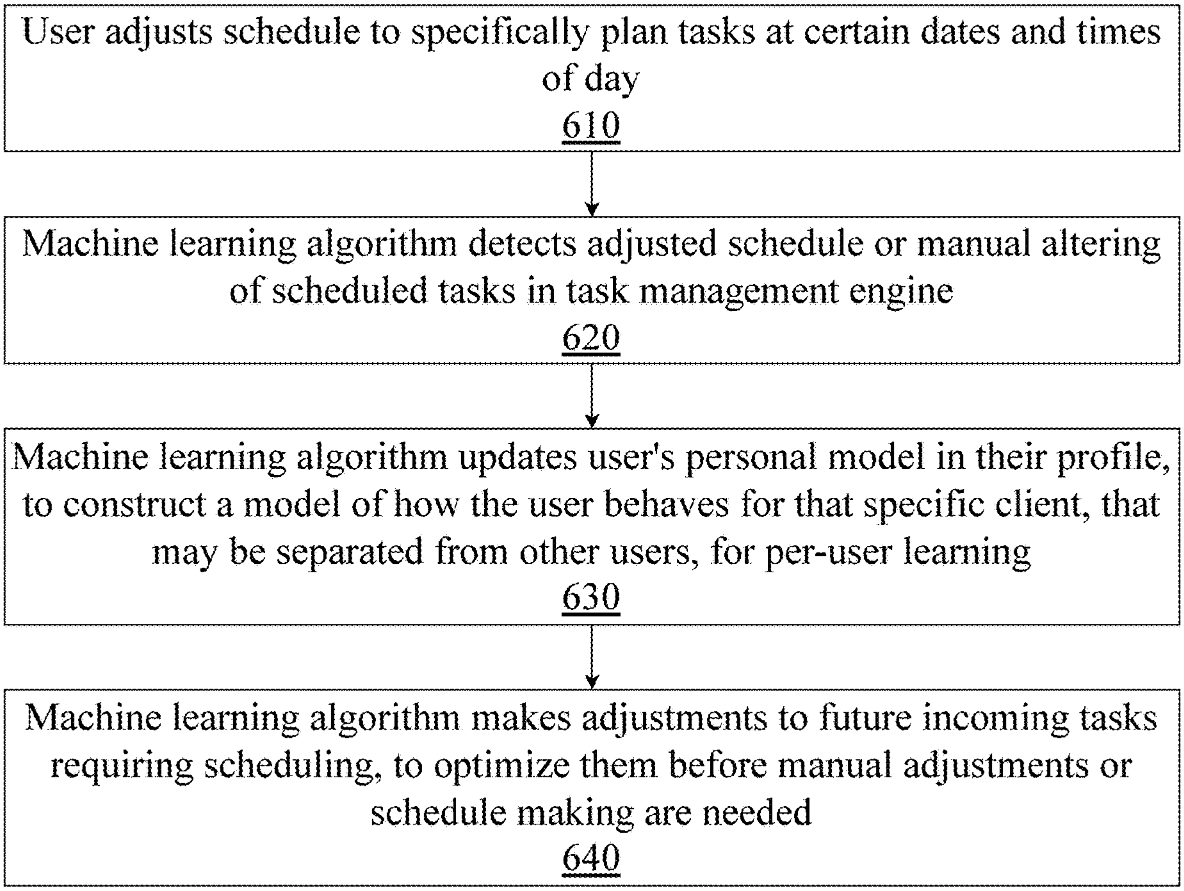
FIG. 6 is a flow diagram illustrating an exemplary method for system architecture for system and method for task scheduling and financial planning, specifically the process of using a task management engine to prioritize user tasks and scheduling using a machine learning engine and profile data in tandem with other scheduled tasks or events, according to one aspect.

FIG. 6 is a flow diagram illustrating an exemplary method for system architecture for system and method for task scheduling and financial planning, specifically the process of using a task management engine to prioritize user tasks and scheduling using a machine learning engine and profile data in tandem with other scheduled tasks or events, according to one aspect.

A user may adjust an already created or optimized schedule to specifically plan tasks at certain dates and times of day 610, such as moving tasks around, deleting some, or adding others. It is not truly possible to provide a completely optimized and perfect schedule based on automated rules even with machine learning algorithms, so users may choose to alter their schedule as they see fit to cope with real world conditions, which may not even be market related (for instance, an illness or personal crisis that takes them away from the office for an extended period of time).

If and when alterations are made to a schedule or user profile, the machine learning engine is informed of these adjustments to the schedule or manual altering of scheduled tasks in a task management engine 620, and the machine learning engine may then update the user's personal model or data related to the execution of a ML model in their profile, to construct or refine a model of how the user behaves both in general and for a specific client, that may be separated from other users, for per-user learning 630.

When adjustments are made and new data is saved to the user profile, the machine learning engine then may make adjustments to future incoming tasks requiring scheduling, to optimize them before manual adjustments or schedule making are needed 640, such as already filtering out unwanted tasks or information that a user continues to remove from their schedule whenever it's scheduled by the system.

Figure 7:
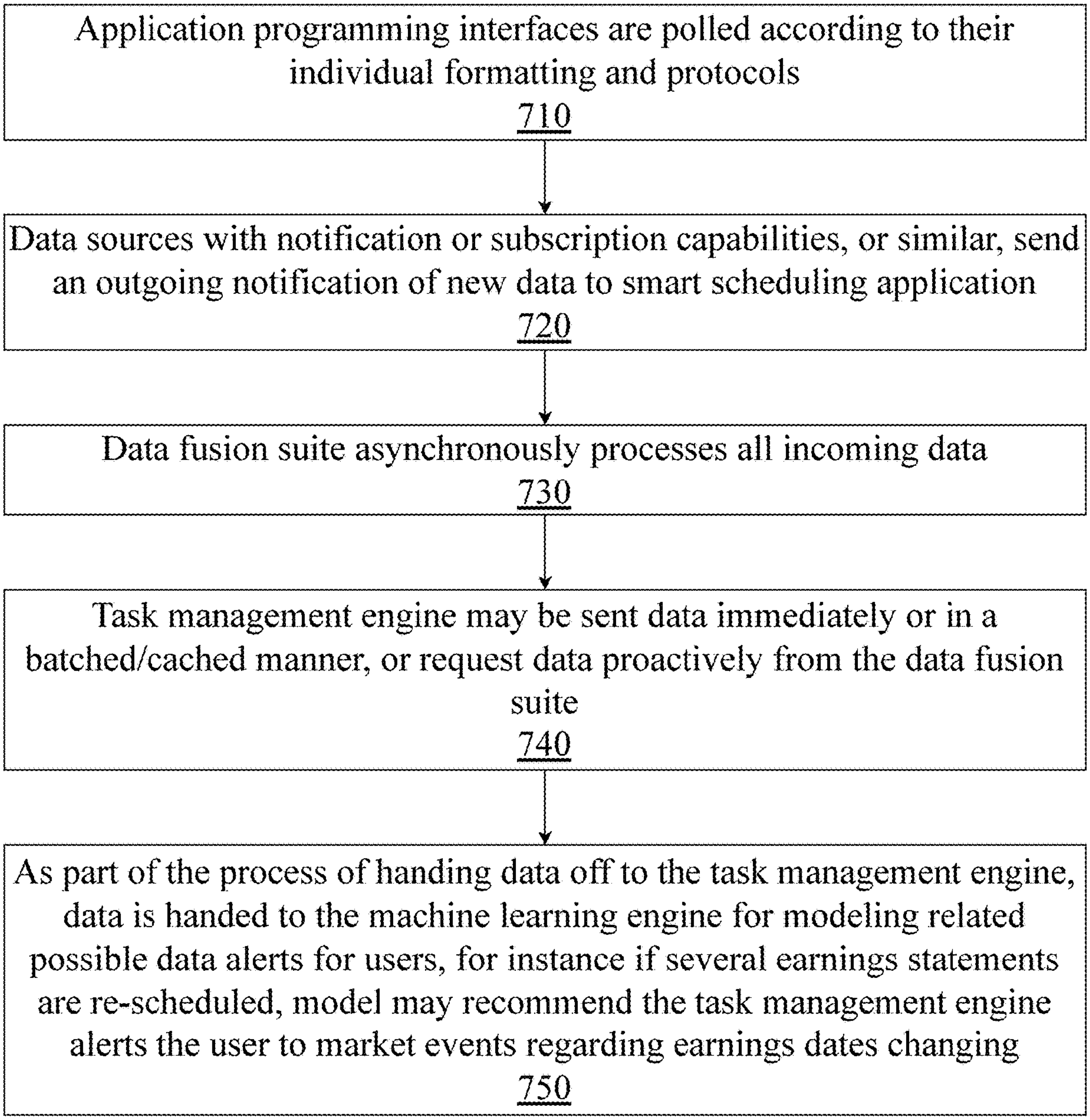
FIG. 7 is a flow diagram illustrating an exemplary method for system architecture for system and method for task scheduling and financial planning, specifically the process of heterogeneous data collection from multiple application programming interfaces and datastores being fused or synthesized into a machine learning engine and task management engine, according to one aspect.

FIG. 7 is a flow diagram illustrating an exemplary method for system architecture for system and method for task scheduling and financial planning, specifically the process of heterogeneous data collection from multiple application programming interfaces and datastores being fused or synthesized into a machine learning engine and task management engine, according to one aspect.

Any application programming interfaces ("API") that are known and integrated with the smart scheduling application are polled according to their individual formatting and protocols 710. For instance, many trading brokerages have their own API for communicating with the brokerage on a software level, allowing for the access of account information, placing, editing, or canceling orders and trades, movement of funds, acquisition of market data, and more, and these APIs frequently are formatted or designed independently of one another and have their own specifications. Many such APIs may have client libraries written for the smart scheduling application to "plug in" to a possible multitude of different data sources from which to gather data. This manner of utilizing web clients and APIs in software is well known in the art and may be handled in numerous fashions such as interfaces and polymorphic objects in some programming languages.

Any data sources with notification or subscription capabilities, or similar, such as newsfeeds or market data feeds that may communicate over continuous socket-level communications, may send outgoing data to the smart scheduling application 720 rather than being polled for data or having a new request for data be sent from the application to the data source. Examples of this include RSS feeds or, on a more basic level, even emails sent to a web server, in this case the recipient being the smart scheduling application (or some connected mail server).

A data fusion suite asynchronously processes all incoming data 730, which may include multithreading to handle numerous data streams at once, but may also simply involve asynchronous programming whereby, in some software paradigms, the software is treated as a state machine that simply continues to gather or ingest data as fast as possible until some computation that requires or requests the data is performed, allowing for "asynchronous" programming. Numerous methods for speedily handling the ingestion of data from multiple sources without blocking other operations exist, including the use of specialized data streaming frameworks and platforms such as APACHE KAFKA™.

A task management engine may then be sent data immediately or in a batched/cached manner from the data fusion suite, or the task management engine may request data itself from the data fusion suite 740, depending on the state of the software and the method of handling the data streams. As part of the process of handing data off to the task management engine, data is handed to the machine learning engine for modeling related possible data alerts for users, for instance if several earnings statements have been re-scheduled according to incoming data streams, the model may recommend the task management engine alerts the user to market events regarding earnings dates changing 750. Similarly, the machine learning engine may at this point filter out or remove from the task management engine, any tasks that the user may not actually be interested in, due to previously removing them or marking them as unimportant or undesired in the schedule.

Figure 8:
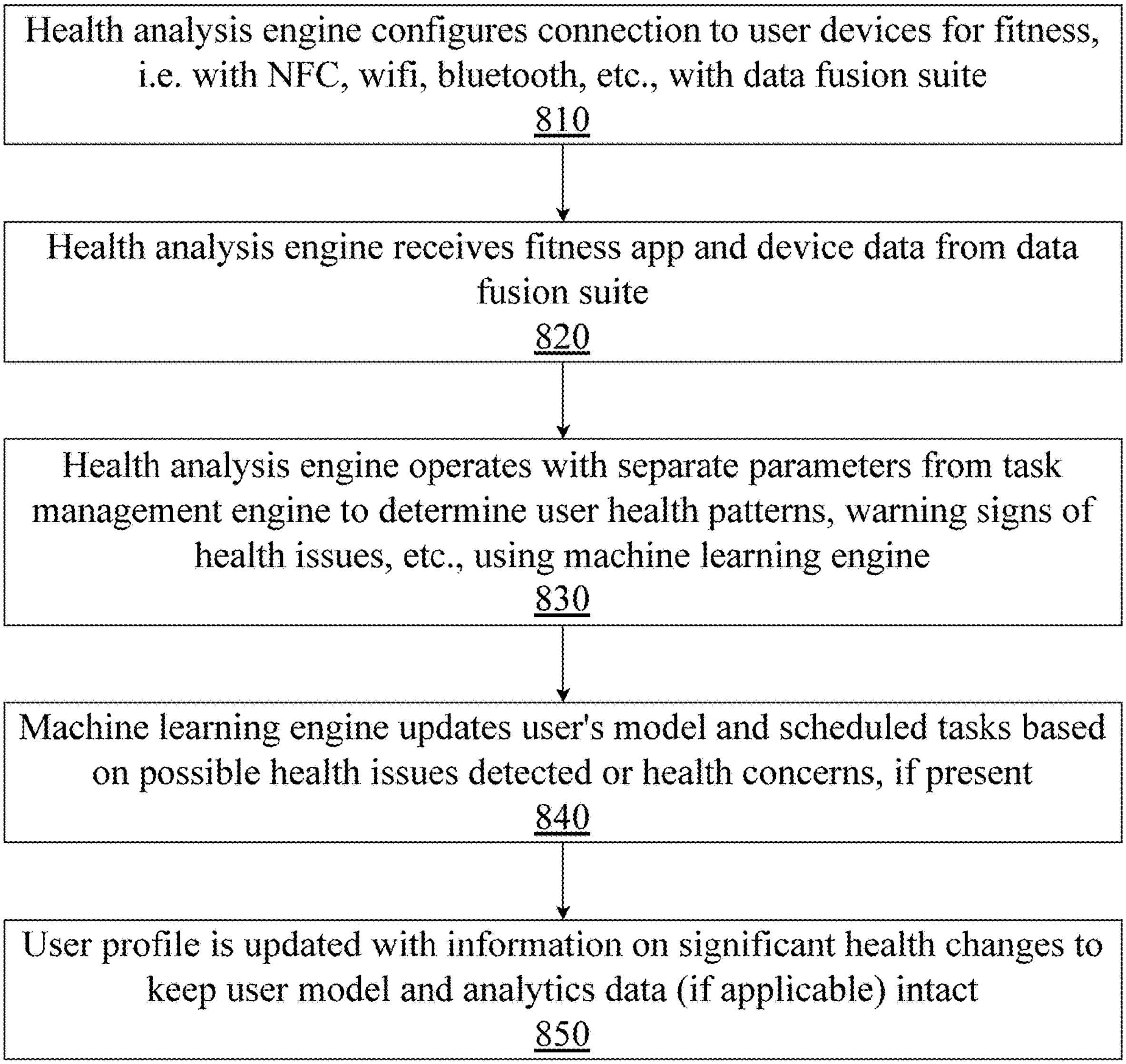
FIG. 8 is a flow diagram illustrating an exemplary method for system architecture for system and method for task scheduling and financial planning with the addition of a health analysis engine, according to one aspect.

FIG. 8 is a flow diagram illustrating an exemplary method for system architecture for system and method for task scheduling and financial planning with the addition of a health analysis engine, according to one aspect.

A health analysis engine may configure and maintain a connection to a plurality of user devices for fitness and health tracking or monitoring such as FITBIT™ or APPLE WATCH™ devices, with Near-Field Communications ("NFC"), WIFI™, BLUETOOTH™, or over a direct internet connection without any local connectivity required, with a data fusion suite 810. Such connections are well established with fitness and health monitoring devices, and the connections may be implemented and configured individually for each type or model of device, depending on the implementation of the software of such devices, similar to building multiple different API clients to connect to several different (but ultimately similar) stock brokerages.

A health analysis engine may then receive fitness or health monitoring app and device data from the data fusion suite 820 once the connection(s) are configured and set up.

The health analysis engine then operates with separate parameters from the task management engine to determine user health patterns, warning signs of health issues, etc., using a machine learning engine 830. For instance, the health analysis engine may be pre-programmed or hard-coded with numerous criteria for health warning signs including high heart rates or blood pressure, or it may learn from a user's health data what to watch out for using a machine learning engine, at which point if health issues or health concerns are detected, the machine learning engine may modify the task management engine's scheduling to accommodate a change necessary to improve user health 840. For example, attending too many meetings in a day, or having too many hours of tasks and things to pay attention to without any breaks, which may be correlated by the machine learning engine with increased blood pressure and heart rate, or worsening sleep patterns that may impact user performance.

The user's profile is then updated with information on any significant health changes they have, and the adjustments made in light of the health information, to keep the user's ML model and any analytics data (if applicable) intact 850 and usable for optimizing their task scheduling with regards to their health and long-term performance.

Figure 9:
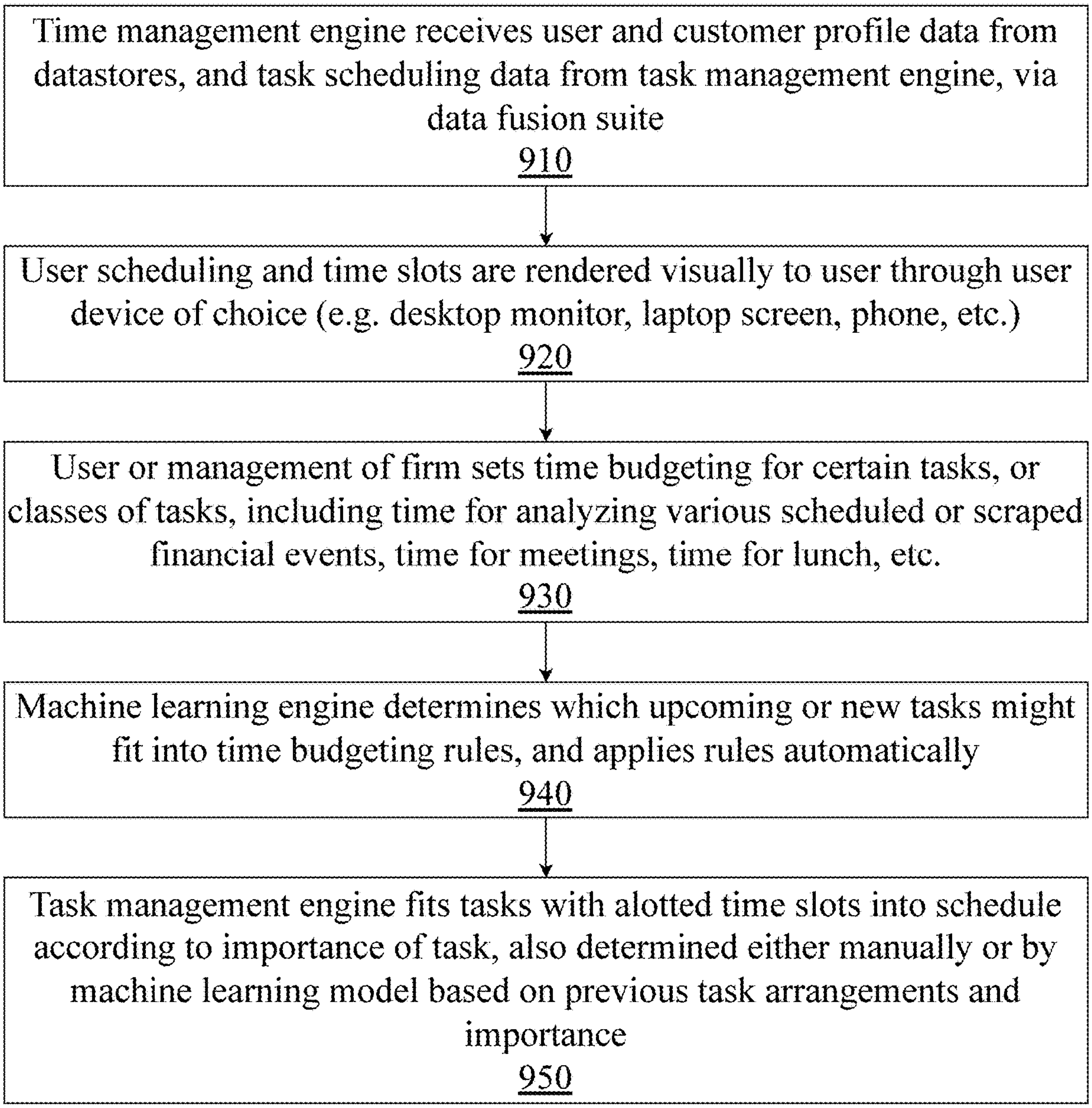
FIG. 9 is a flow diagram illustrating an exemplary method for system architecture for system and method for task scheduling and financial planning with the addition of a time management engine for fine-tuned user time management for a firm, according to one aspect.

FIG. 9 is a flow diagram illustrating an exemplary method for system architecture for system and method for task scheduling and financial planning with the addition of a time management engine for fine-tuned user time management for a firm, according to one aspect.

A time management engine may receive user and customer profile data from a datastore or multiple datastores, and task scheduling data from a task management engine, via a data fusion suite 910. This data may be requested manually by the time management engine, or automatically fed into the time management engine by the smart scheduling application.

A user's scheduling and available time slots may be rendered visually or textually to the user through a user device of choice (e.g. desktop monitor, laptop screen, phone, etc.) 920. This is common in the art for any number of scheduling or calendar apps, in various formats and designs.

A user or their possible manager or employer, may set time budgeting constraints for certain tasks, or classes of tasks, including a budget for time spent analyzing various scheduled or scraped financial events, time budgeted for meetings, time budgeted for lunch or breaks, etc. 930, allowing human-specified time budgeting and rules to influence the task scheduling.

A machine learning engine then may determine which upcoming or new tasks might fit into a user's schedule while obeying any time budgeting rules, and apply the rules automatically 940 as data for task planning feeds into the machine learning engine and task management engine.

A task management engine then fits tasks with time budgeting constraints into the schedule according to the importance of each task, as determined either manually from user preferences, or by the machine learning model based on previous task arrangements and importance 950. For example, if a user consistently bumps up or spends more time on tax planning meetings for a client, those may be given priority for a competitive timeslot in their schedule that might be desired for multiple tasks.

Figure 10:
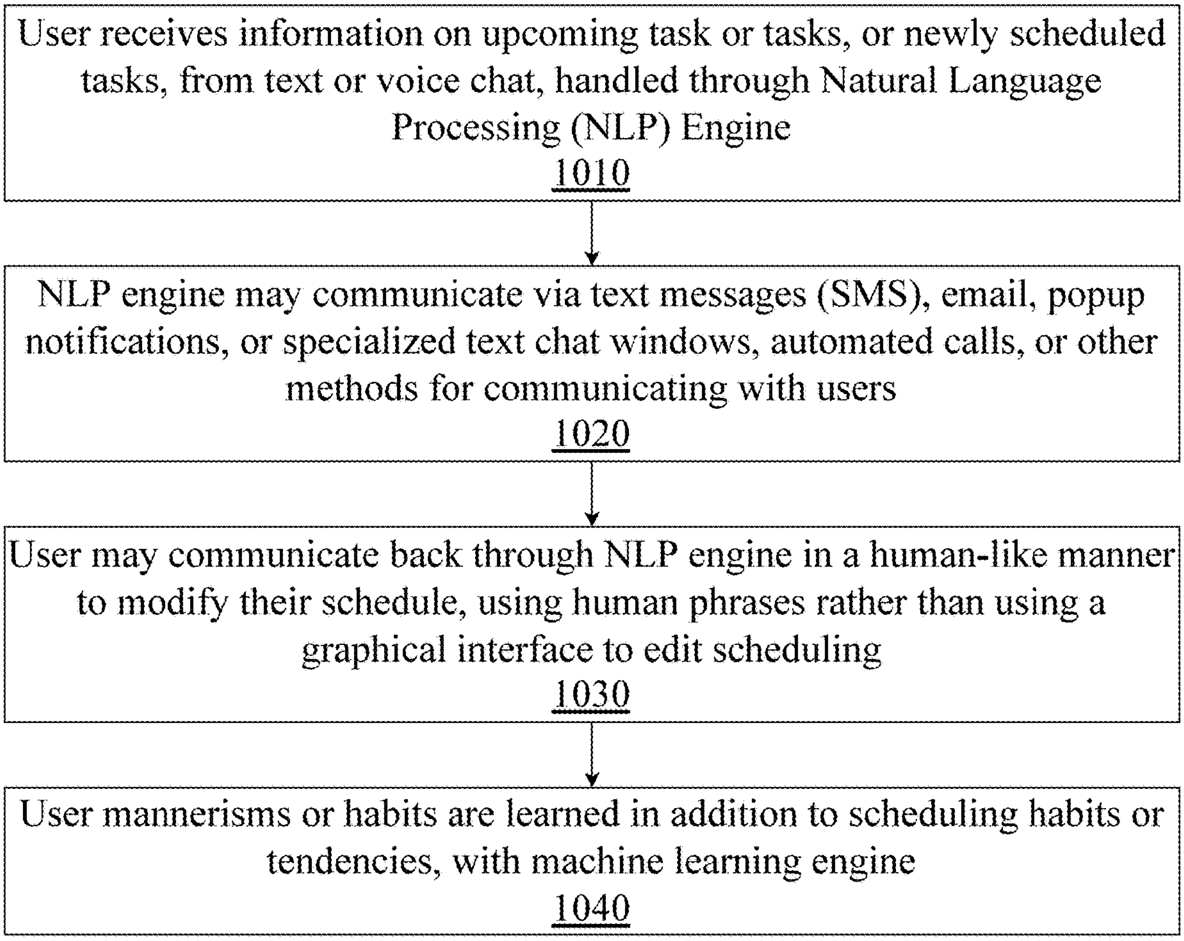
FIG. 10 is a flow diagram illustrating an exemplary method for system architecture for system and method for task scheduling and financial planning with the addition of a natural language processing engine to allow users to interact with the system in a human-like manner, according to one aspect.

FIG. 10 is a flow diagram illustrating an exemplary method for system architecture for system and method for task scheduling and financial planning with the addition of a natural language processing engine to allow users to interact with the system in a human-like manner, according to one aspect.

A user may receive information on an upcoming task or tasks, or newly scheduled tasks, from text or voice chat, handled through Natural Language Processing ("NLP") Engine 1010. For example, a new task may be scheduled for them, and they receive a text message on their phone alerting them to the task, or a chatbox opens on the application to alert them and allow them to interact in a human readable manner further with the software 1020. Several possible manners to alert users to changes via text may be obvious including popup notifications, PUSH notifications, voicemails or emails, and more.

The user may communicate back to the system, possibly but not necessarily through the same medium, with the NLP engine in a human-readable manner to modify their schedule, using human phrases rather than using a graphical interface to edit scheduling 1030. For example, a user may receive a text message saying, "Hey John, you have an appointment scheduled in 30 minutes for analyzing the new 10-K filing from Company ABC", to which a user could respond, "Hey, move that back 30 minutes if possible, I can't make it at the scheduled time", at which point the system would attempt to reschedule the event according to the user's wishes. In these instances, as a user continues to use the NLP functionality of the software, their mannerisms or habits of speech are processed in the machine learning engine and learned by the system to improve communication and accuracy of results 1040.

Figure 11:
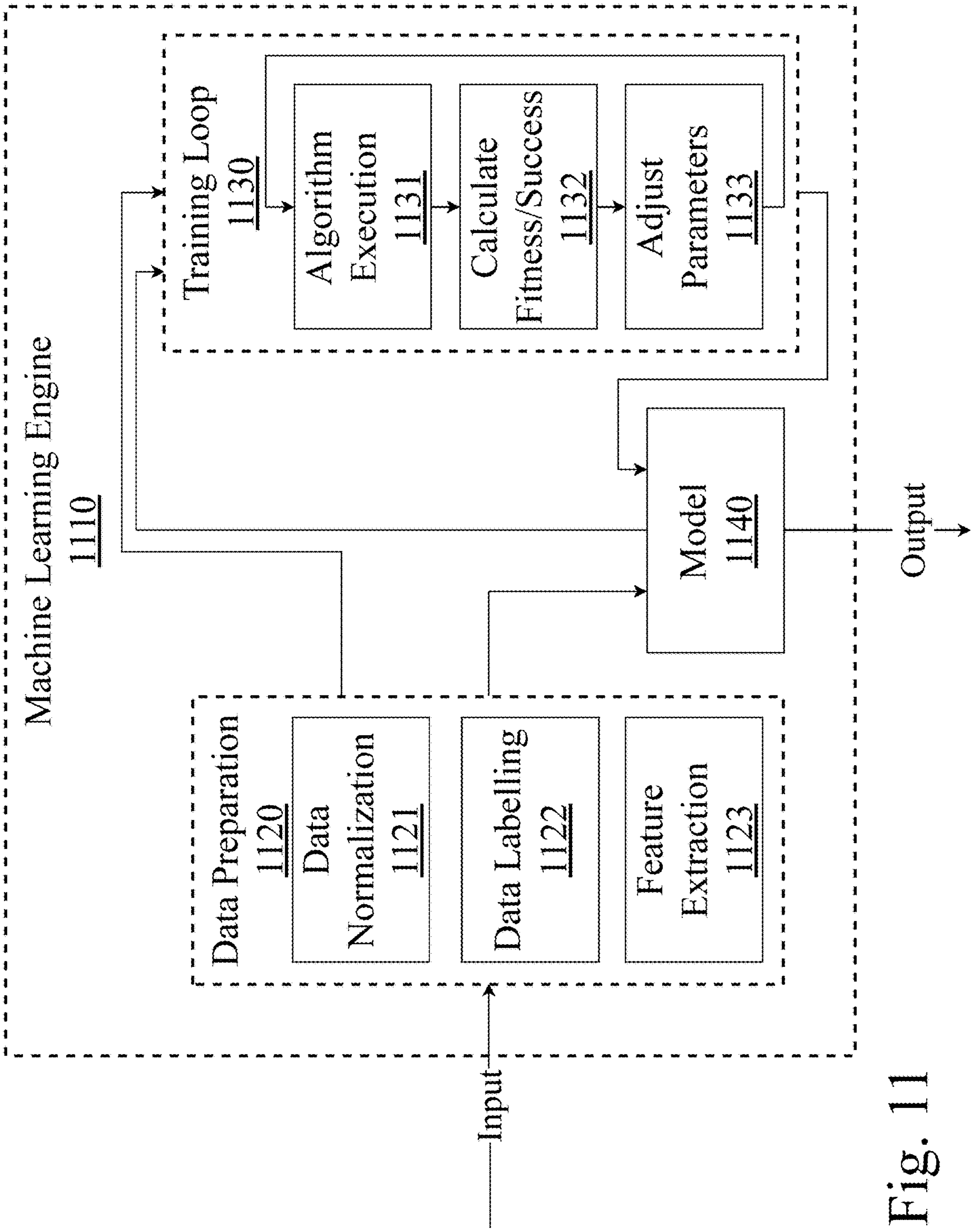
FIG. 11 is a system diagram illustrating an exemplary architecture of a machine learning engine.

FIG. 11 is a system diagram illustrating an exemplary architecture of a machine learning engine. A machine learning engine 1110 may be a software component, standalone software library, system on a chip, Application-Specific Integrated Circuit ("ASIC"), or some other form of digital computing device or system capable of interacting with and receiving data from other digital or software systems. It may be connected over a network, or connected within a system or computer, and may be utilized by software processes or communicate with them as a separate application or process instance. The basic components within a machine learning engine, broadly, are a data preparation 1120 loop or algorithm, which may contain some combination of steps, commonly including data normalization 1121, data labelling 1122, and feature extraction 1123, depending on the exact implementation or configuration of a machine learning engine 1110. A key feature of a machine learning engine 1110, is the existence of some form of a training loop 1130 in their software or chip design, a series of steps taken to take input data and learn how to process it and produce better output, at least in theory. A machine learning engine 1110 may be configured or implemented poorly merely as a matter of execution, and may have trouble learning efficiently or at all, or have difficulty learning usefully from certain knowledge areas or domains, but all machine learning systems contain a training loop of some kind, and they frequently contain the subcomponents or steps of having algorithm execution perform over the set of input data 1131, calculating the fitness or success states or success rate of the algorithm with a current model 1140, and adjusting the parameters of the model to attempt to output better or more useful data for a given input data.

A model 1140 is a software or mathematical representation of data that impacts how an algorithm operates. An algorithm may be any set of concrete steps taken to attempt to process data or arrive at some solution to a problem, such as a basic search algorithm which tries to find a specified value in apparently unsorted numeric data. A basic attempt at such a search algorithm might be to simply jump around randomly in the dataset and look for the value being searched for. If machine learning were applied to such an algorithm, there might be a model of parameters for the algorithm to operate with, such as how far from the current index being examined in the input dataset, to be capable of jumping. For instance, in a set of 1,000 numbers in no readily apparent ordering or sorting scheme, the algorithm to randomly pick numbers until it finds the desired number may have a parameter that specifies that if you are currently at index x in the dataset being searched, you may only jump to a value between x−50 and x+50. This algorithm may then be executed 1131 over a training dataset, and have its fitness calculated 1132, in this example, as the number of computing cycles required to find the number in question. The lower the number, the higher the fitness score.

Using one of many possible parameter adjustment 1133 techniques, including linear regression, genetic variation or evolutionary programming, simulated annealing or other metaheuristic methods, gradient descent, or other mathematical methods for changing parameters in a function to try and approach desired values for specified inputs. Machine learning training method, that is, the way they adjust parameters 1133, may be deterministic or stochastic, as in evolutionary or genetic programming, or metaheuristics in general. Examples of genetic programming include the concept of genetic variation, whereby several different models of an algorithm are run over the same input data, compared for fitness, and a selection function determines which models to use for "breeding" the next "generation" of the model population, at which point a crossover function is used to recombine the "genes" (the word used in genetic programming to refer to function or model parameters) into different arrangements for each new member of the next generation, lastly applying a mutation function to alter (either randomly or statistically) some selection of genes from some selection of the newly bred models, before the process is repeated with the hope of finding some combinations of parameters or "genes" that are better than others and produce successively better generations of models.

Several machine learning methodologies may be combined, as with NeuroEvolution of Augmenting Topologies ("NEAT"), whereby a genetic algorithm is used to breed and recombined various arrangements of neurons and hidden layers and the parameters of neurons, in a neural network, reducing the use of human judgement in the design or topology of a neural network (which otherwise often requires a fair amount of trial and error and human judgement). These situations may be thought of either as multiple different training loops 1130 occurring with multiple models 1140, or may be thought of as multiple machine learning engines 1110 entirely, operating together.

Figure 12:
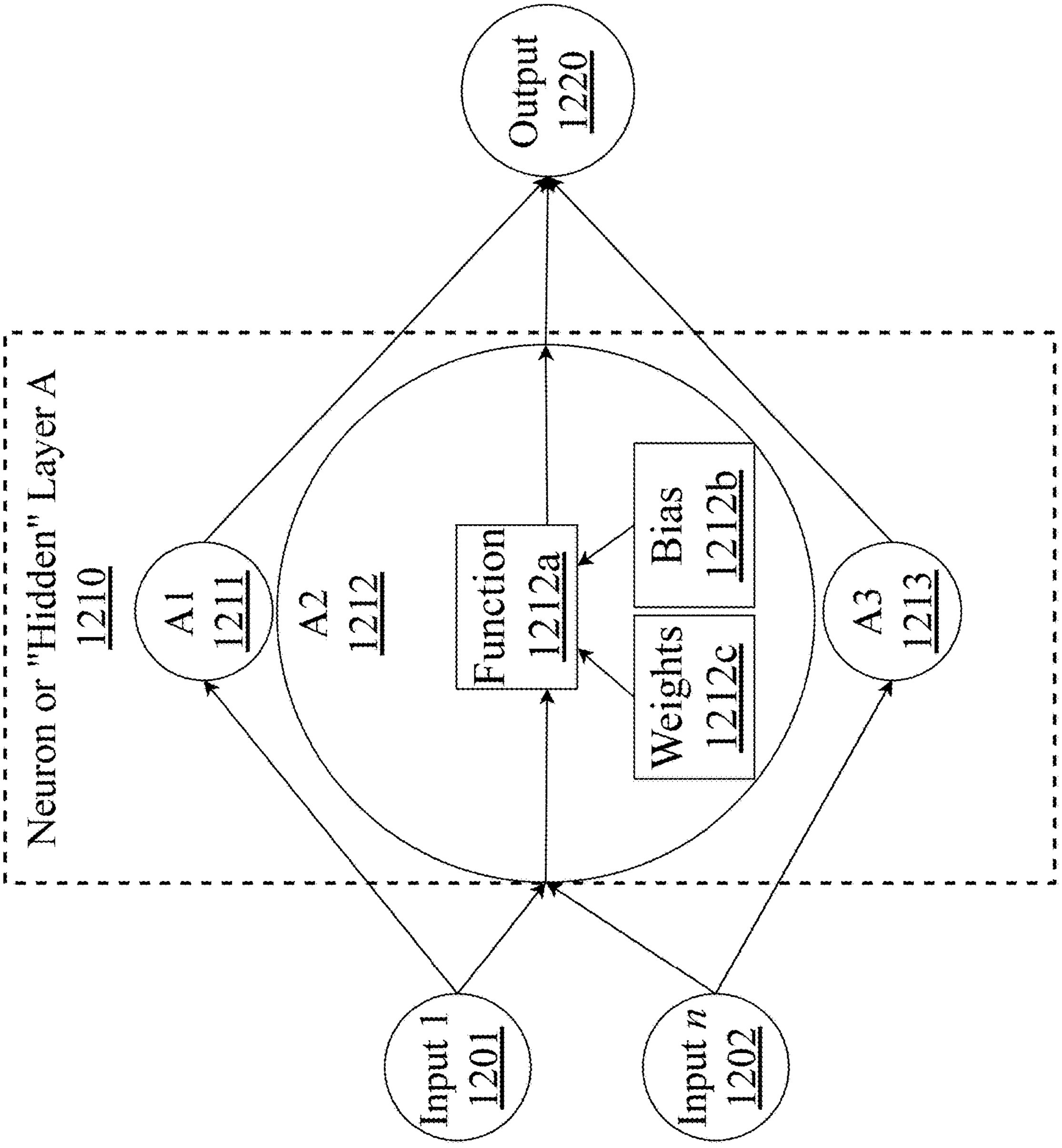
FIG. 12 is a diagram illustrating an exemplary architecture of a neural network.

FIG. 12 is a diagram illustrating an exemplary architecture of a neural network. A neural network is a software system that may be used to attempt to learn or improve an algorithm at a task or set of tasks, using mathematical models and approximations of biological neurons with artificial neurons. The kinds of tasks that may be used in combination with a neural network are potentially unlimited so long as the problem is deterministic, but common applications include classification problems, labeling problems, compression or algorithm parameter tuning problems, image or audio recognition, and natural language processing. Neural networks may be used as part of a machine learning engine, as the method by which training is done and a model is generated. A neural network contains at least one input, here labeled as input 1 1201, but may have multiple inputs, labeled input n 1202, that feed into a neuron layer or hidden layer 1210 which contains at least one artificial neuron, here shown with A1 1211, A2 1212, and A3 1213. Inside of each neuron are three components, an activation function **1212*a*, a bias 1212*b* value, and a weight for each input that feeds into the neuron 1212*c*. An activation function 1212*a* is the function that determines the output of the neuron, and frequently follows a sigmoidal distribution or pattern, but may be any mathematical function, including piecewise functions, identity, binary step, and many others. The activation function 1212*a* is influenced not only by the inputs into a neuron 1201, 1202, but the weight assigned to each input 1212*c*, which multiplies an input value by itself, and a bias 1212*b*, which is a flat value added to the input of the activation function 1212*a***. For instance, with a single input value of 17, a weight of 0.3, and a bias of 0.5, a neuron would run its activation function with an input of 5.6 (17*0.3+0.5). The actual output of the activation function **1212*a*, for each neuron, then may proceed to be output 1220** in some format, usually numeric, before being interpreted by the system utilizing the neural network. There may be multiple output values, representing confidence values in different predictions or classifications, or other multi-valued results.

Various forms and variations of neural networks exist which may be more or less applicable to certain knowledge domains or certain problem sets, including image recognition, data compression, or weather prediction. Some examples of different types of neural networks include recurrent neural networks, convolutional neural networks, deep learning networks, and feed forward neural networks, the last of which is regarded by many as the "standard" or most basic usable form of an artificial neural network.

Figure 13:
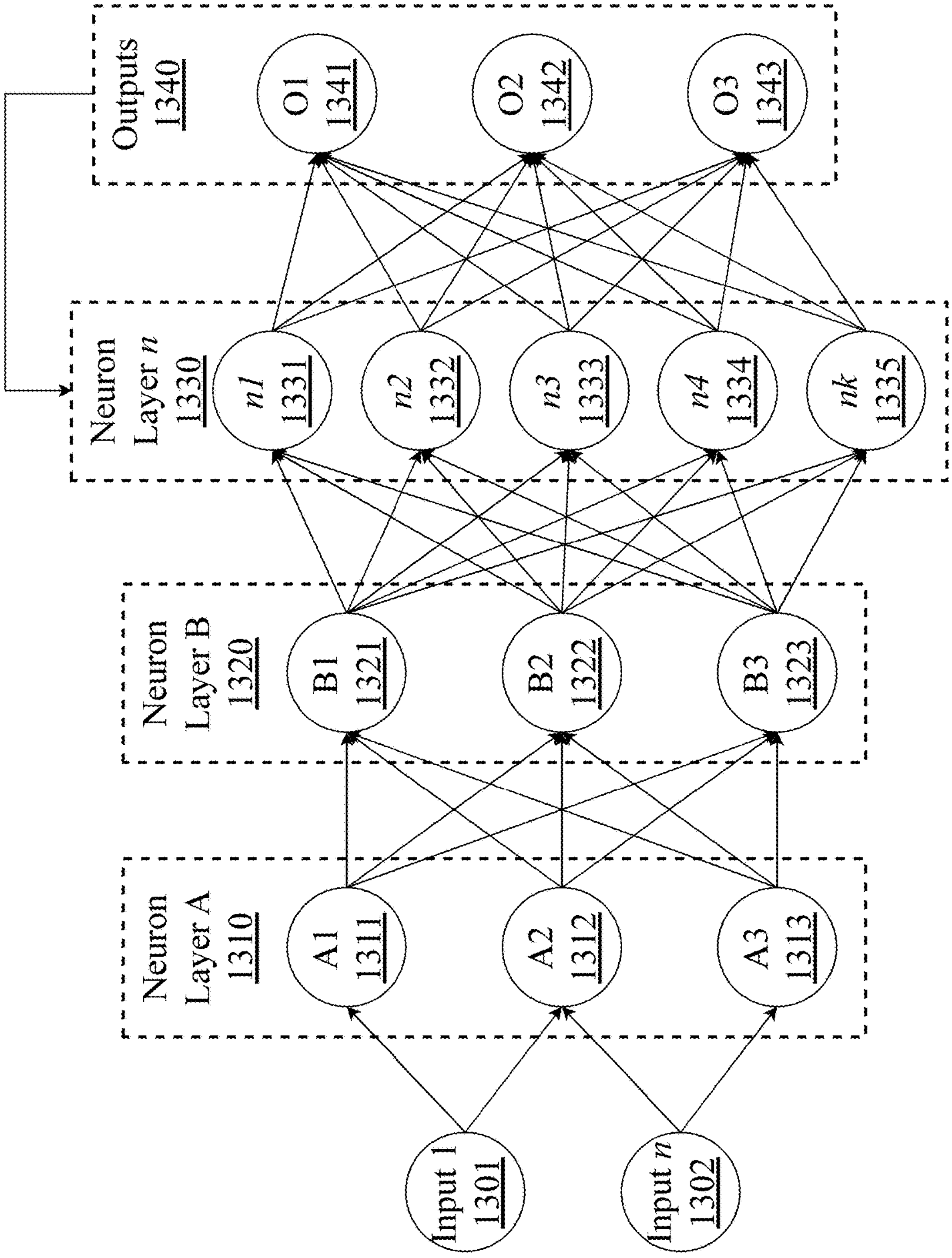
FIG. 13 is a diagram illustrating an exemplary architecture of a deep learning recurrent neural network.

FIG. 13 is a diagram illustrating an exemplary architecture of a deep learning recurrent neural network. An example of a neural network of two different forms, both recurrent and deep, it possesses at least one input 1301 but can potentially (or even usually) have multiple inputs n 1302, and multiple neuron or "hidden" layers, represented as neuron layer A 1310, B 1320, and n 1330, each containing their own neurons A1 1311, A2 1312, A3 1313 in neuron layer A 1310; neurons B1 1321, B2 1322, and B3 1323 in neuron layer B 1320; and neurons n1 1331, n2 1332, n3 1333, n4 1334, and n5 1335, in neuron layer n 1330, mapping to multiple outputs 1340 O1 1341, O2 1342, and O3 1343.

Like all neural networks, there is at least one layer of neurons containing at least one artificial neuron, at least one input, and at least one output, but what makes the network recurrent is that the outputs 1340 map partially or fully in some fashion to another layer or multiple layers 1310, 1320, 1330 of the neural network, allowing the output to be further processed and produce even different outputs both in training and in non-training use. This cycle, allowing output from some nodes to affect subsequent input to the same nodes, is the defining feature of a recurrent neural network ("RNN"), allowing an RNN to exhibit temporal dynamic behavior, that is, allowing the state of later portions of the network to influence previous layers of the network and subsequent outputs, potentially indefinitely as long as the network is operated due to the cyclical nature of the connection(s).

What makes the network "deep" or a deep learning neural network, is the fact that there are multiple layers of artificial neurons 1310, 1320, 1330, which can be engineered differently or uniquely from each other, or all engineered or configured in the same fashion, to fit a variety of tasks and knowledge domains. Deep learning is a frequently used phrase that literally refers to the use of multiple layers of artificial neurons, but more generally refers to a learning system that may be capable of learning a domain or task "deeply" or on multiple levels or in multiple stages. For example, an image recognition system employing deep learning may have its neural networks arranged and utilized in such a way that it is capable of learning to detect edges, and further, detect edges that seem to be faces or hands, separately or distinctly from other kinds of edges. It is not necessary that a neural network have only one label for the variant or type of neural network it is. For instance, almost any type of neural network can be "deep" by having multiple hidden layers, and a convolutional neural network may also have recurrence at some of its layers. Multiple neural networks may also be used in conjunction with, or beside each other, to achieve highly tailored and sometimes complex results, such as for self-driving vehicles and complex machine vision tasks.

Figure 14:
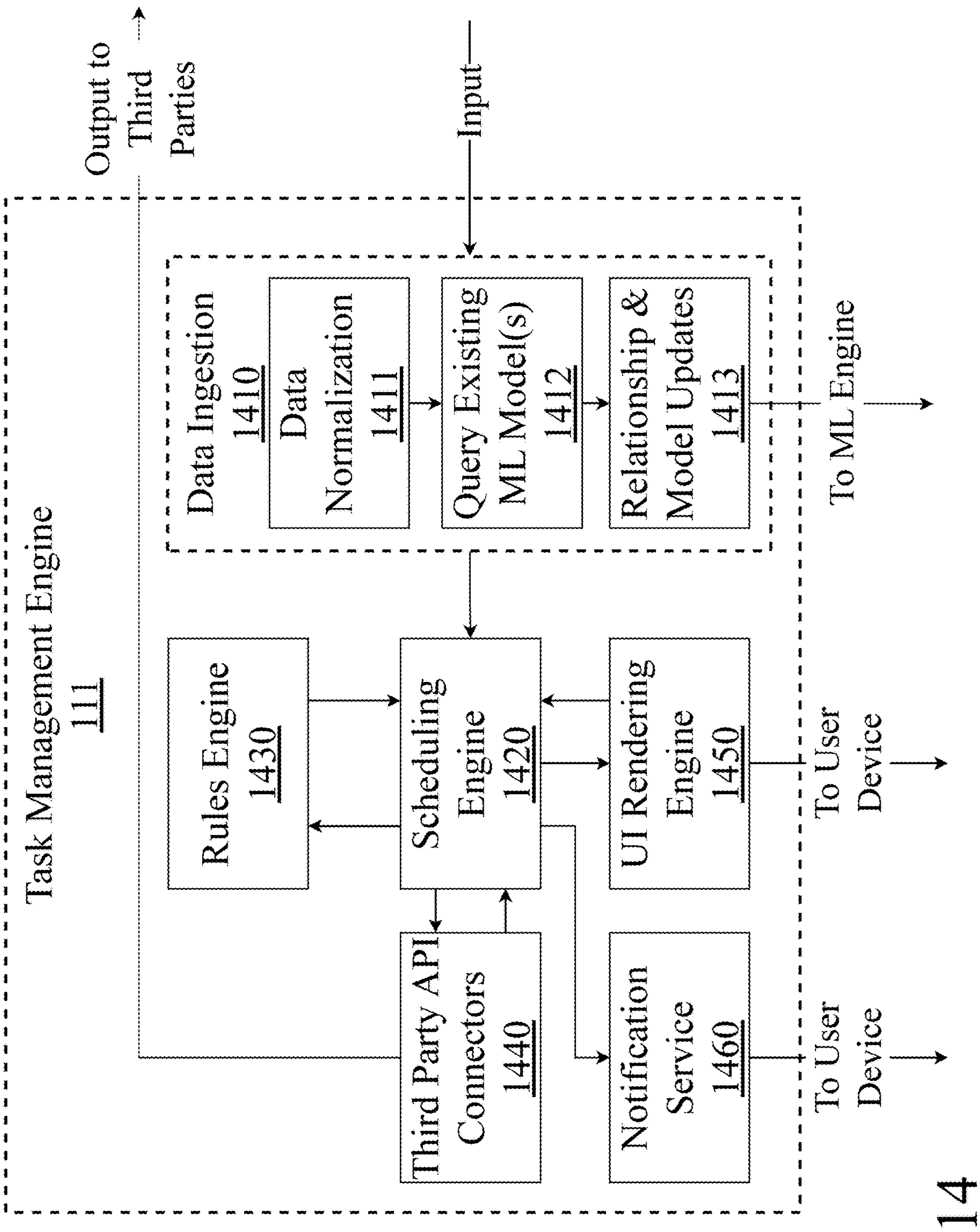
FIG. 14 is a system diagram illustrating the architecture of a task management system, according to an embodiment.

FIG. 14 is a system diagram illustrating the architecture of a task management system, according to an embodiment. A task management engine 111 is a software application, library, or computing system that operates software, for the purposes of managing schedules for users and clients of firms such as financial firms or educational institutions, while communicating with third parties, user devices, and a machine learning engine, to optimize and automate many tasks related to scheduling, task notifications, and task automation or completion. To accomplish this, a task management engine 111 contains components for data ingestion 1410, a scheduling engine 1420, a rules engine 1430, third-party API connectors 1440 and interfaces, a UI rendering engine 1450, and a notification service 1460.

Data ingestion 1410 comprises a series of steps when new input for a user's schedule, new tasks, new market or world events, or new machine learning models, are detected or input into the task management engine 111. The data ingestion engine handles data normalization 1411, which may comprise mathematical normalization or a more generic form of normalizing data (such as transforming one data object into another, or in other words, converting between internal formats of data or extracting key data and discarding irrelevant pieces of data); querying of existing machine learning models 1412, which may be held in memory by the task management engine 111 or its parent computing device, or may be queried directly from a machine learning engine; and updating relationships between and within data and models 1413, such as updating user profiles for new information such as an update to their age if they had a birthday recently, or that they have a new child which may present new scheduling challenges or new dates and deadlines to be aware of, and more.

Once data ingestion 1411 has been accomplished, the data is sent to the scheduling engine 1420, which handles the actual construction of and maintenance or altering of a user's schedule. The scheduling engine communicates with a rules engine 1430 that interprets and enforces any external requirements for scheduling, such as a user profile being flagged to not schedule any events for Saturday for religious observances, or for holidays that change for users of different regions. The scheduling engine may also use third-party API and data connections 1440, which may be filtered through a data fusion suite, to query any necessary data from connected third parties, such as banks, educational institutions, financial institutions and stock brokerages, markets, third-party businesses for employment or work records that might be relevant and shared with the software, government services or publicly accessible documents, or other third-party data sources.

Once all necessary data is acquired, a scheduling engine may fit deadlines, tasks, alerts, noteworthy events, or other things needing to be scheduled or brought to a user's attention, into a user's schedule, and render it to them using a UI rendering engine 1450. Such an engine may take the form of a progressive, single page, or multipage web application, viewed through a web browser or web front-end framework such as ELECTRON™, and the scheduling engine 1420 may also use a notification service 1460 to send users notifications via methods such as email, SMS texts, or push notifications, to alert them to upcoming deadlines, tasks, or events.

Figure 15:
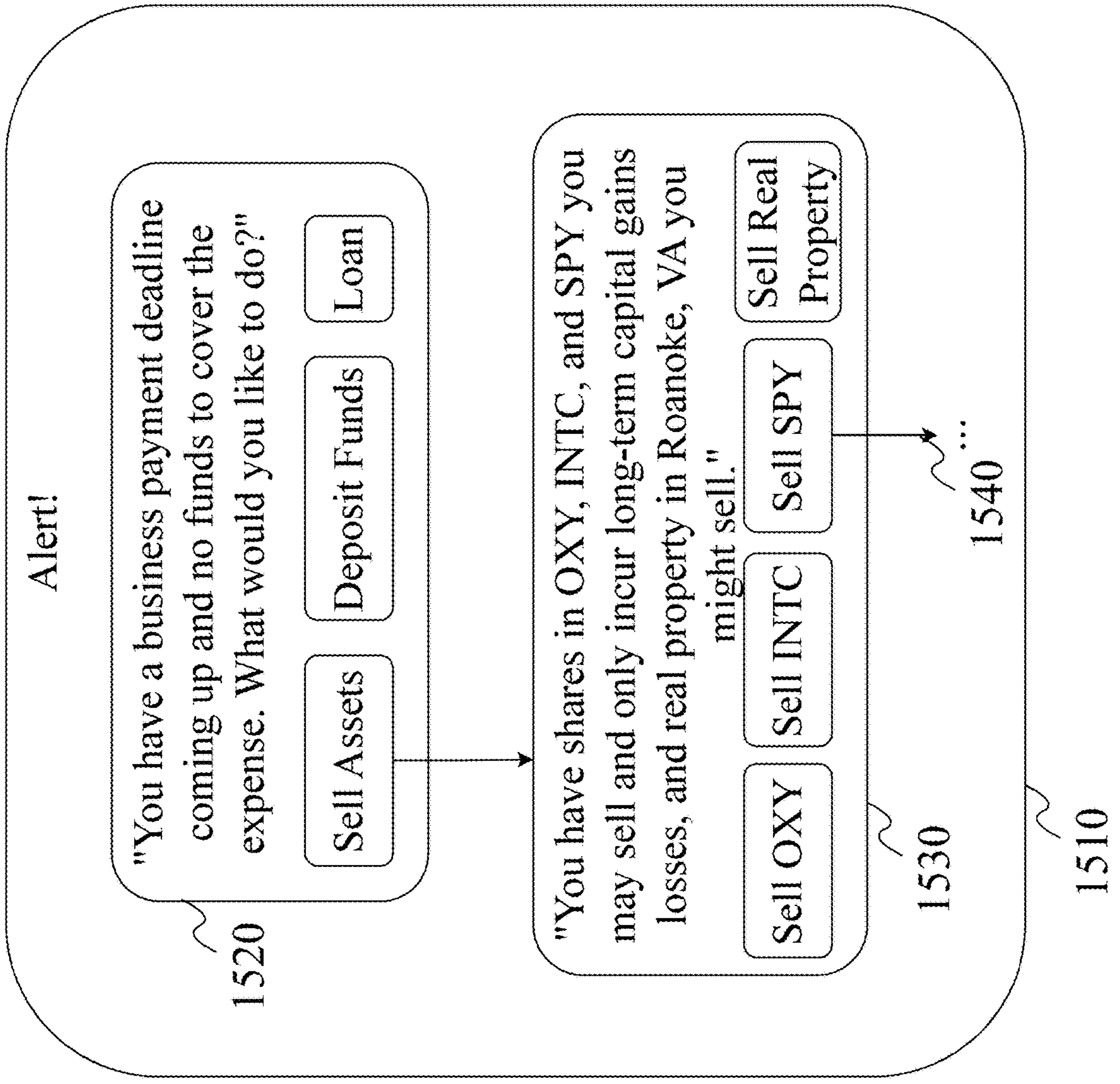
FIG. 15 is a diagram of a user interface for scheduling notification software, according to an embodiment.

FIG. 15 is a diagram of a user interface for scheduling notification software, according to an embodiment. This illustration of an example user interface interaction shows a layered, contextual approach to user interface design, showing an initial "Alert!" 1510 notification to a user, which may be displayed on a phone or other mobile device, a web browser, a native application on a desktop or laptop, within an email, or with some other digital notification and interaction method known in the art. In this example, the notification a user has received displays the text, "You have a business payment deadline coming up and no funds to cover the expense. What would you like to do?" 1520, which then may prompt a user to take one or more actions, or in some cases simply acknowledge the alert. In this case, shown is an example of a "sell asset" button being used to progress to the next contextual or modal dialog 1530 which then alerts a user to the status or result of their decision, in this case, "You have shares in OXY, INTC, and SPY you may sell and only incur long-term capital gains losses, and real property in Roanoke, VA you might sell." 1530, allowing the user to choose further options 1540 including selling specific assets, or even real property, which may cause the system to send a data to a third-party API to begin the process of placing their property up for sale using a digital real estate service.

It should be obvious to any with ordinary skill in the art that a variety of possible alerts, notifications, or interactive messages and prompts, may be possible, with a variety of action choices for users, to allow the system to help partially automate actions taken in response to deadlines or events that come up for a user, not merely the one example case shown here.

Figure 16:
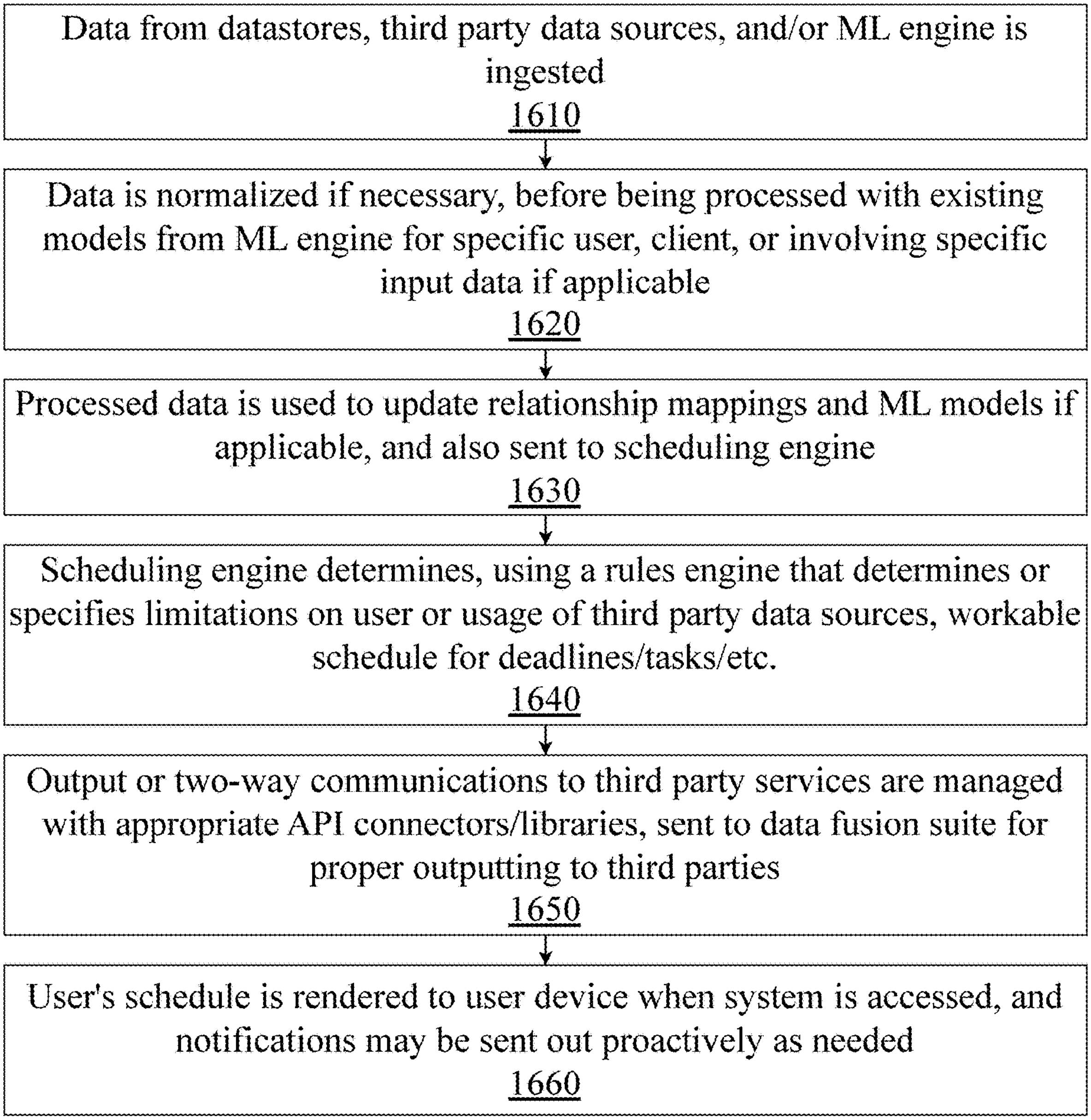
FIG. 16 is a method diagram illustrating the operation of a task management system, according to an embodiment.

FIG. 16 is a method diagram illustrating the operation of a task management system, according to an embodiment. First, data from datastores, third-party data sources, or a machine learning engine, or some combination thereof, is ingested 1610 into the task management engine. Data ingestion involves data normalization if necessary, before being processed with existing models from ML engine for specific user, client, or involving specific input data if applicable 1620. Data normalization may take the form of mathematically transforming data, converting data from one format to another, labeling data, or associating data with other data such as user profiles or other input data. Processed data may then be used to update relationship mappings and ML models if applicable, before sending the data and new model or relational mappings, if any, to a scheduling engine 1630. Updates to a machine learning model may be sent to and handled by a machine learning engine, while other updates such as marking a user as having a new relation to some entity (for instance a new bank account, or new stock ownership) may be stored both in a machine learning engine potentially, and also within a task management system, and potentially within a separate datastore such as a user profile datastore. A scheduling engine may determine, with the use of a rules engine that determines or specifies limitations on user or usage of third-party data sources, a workable schedule for deadlines, alerts, tasks, and similar, for the user 1640. An example of how a rules engine may limit the scheduling engine is if a user has specified that they will not sell their stocks until they have held them for a year, or if they specified that they won't pay for their child's university class if they don't get a certain minimum grade, which the scheduling engine may determine or check with third parties such as a university system, or by having a user manually enter or upload a transcript in such an example. The task management engine may manage unidirectional or bidirectional communications to third-party services, with the use of appropriate API connectors or libraries for each third-party, routing the communications through a data fusion suite 1650. User's may view, modify, or otherwise interact with their schedule in a rendered format, with a user device, when the system is accessed, such as through a web browser or native application, and notifications may be sent out proactively as needed 1660 such as SMS or push notifications, of dates or deadlines coming up that a user might need to be made aware of.

Figure 17:
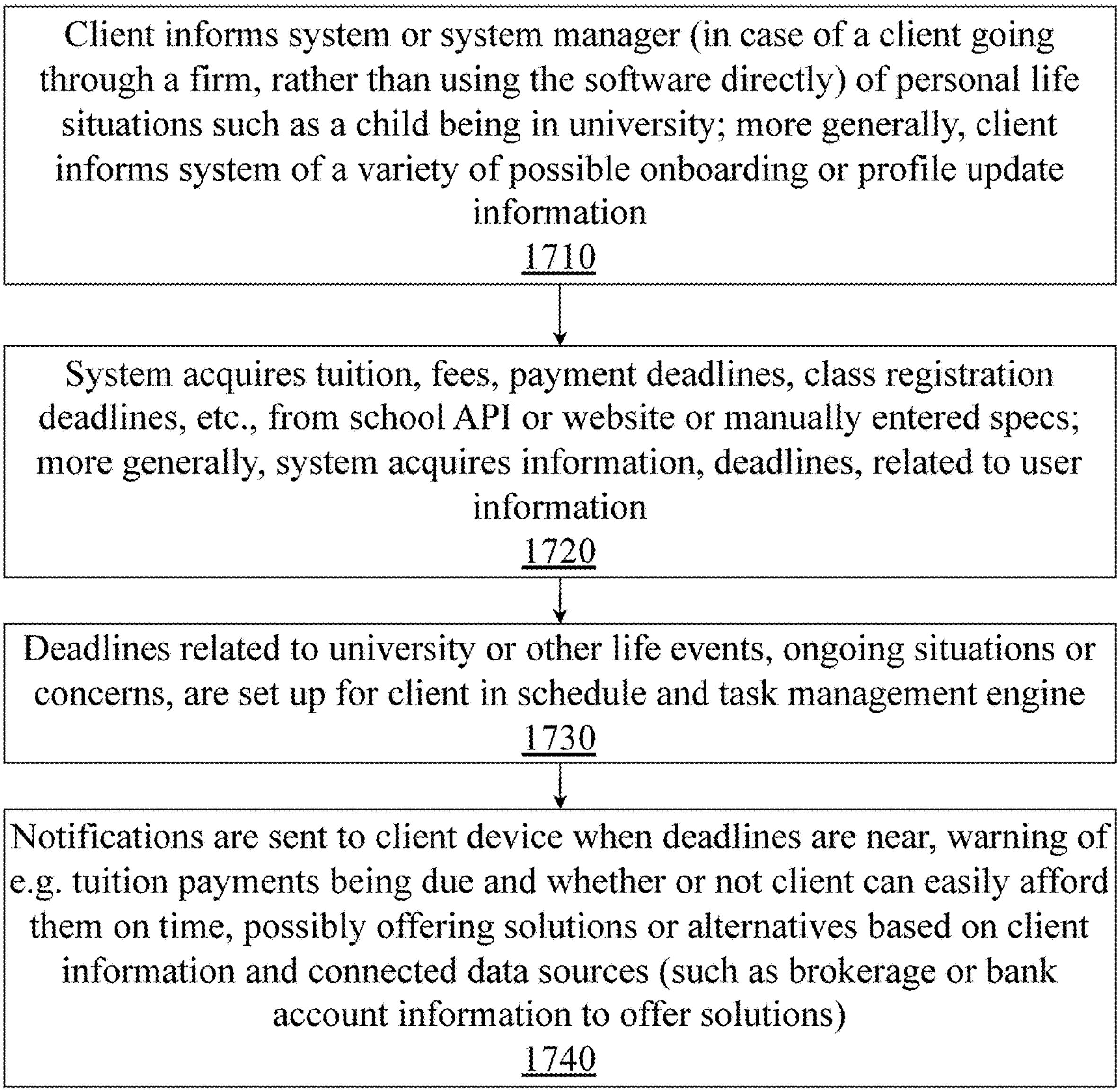
FIG. 17 is a method diagram illustrating the use of scheduling and planning software in more generic use cases aside from merely financial planning and management offices, according to an embodiment.

FIG. 17 is a method diagram illustrating the use of scheduling and planning software in more generic use cases aside from merely financial planning and management offices, according to an embodiment.

A client may inform the system or a system manager (in case of a client going through a firm, rather than using the software directly) of new developments in their personal life, such as a child being accepted to a university; more generally, a client may inform the system of a variety of possible onboarding or profile update information 1710, not necessarily during profile creation or setup but after a profile is already created. New information may be uploaded and configured in the system to refine its predictive capabilities with regards to scheduling and task management for a user In the example case of a user uploading information about their child being enrolled in university, the system may acquire tuition and fee information, payment deadlines, class registration deadlines, and more, from a school API or website, or a user may manually enter this information if it is not available digitally from the institutions. More generally, the system may acquire information related to user information 1720 that is not necessarily related to financial planning specifically. It may remind the user of graduation dates, birthdates, or any other information that the system may be configured to schedule.

Deadlines related to university or other life events, ongoing situations or concerns, are set up for client in schedule and task management engine 1730, in accordance with the information provided by, or about, the user. This data may modify the machine learning model representing the user and their behavior, for increased accuracy and predictive capabilities with regards to the scheduling for that user in the future.

Once the new data has been processed and schedule has been made or modified, notifications may be sent to a user device when deadlines or tasks are near, warning of e.g. tuition payments being due and whether or not client can easily afford them on time, possibly offering solutions or alternatives based on client information and connected data sources (such as brokerage or bank account information to offer solutions) 1740. Other examples of notifications that can be made to users with the system include notifications about possible politically relevant dates, notifications about scheduled weather system testing or rolling blackouts in their area that they may or may not be aware of, or even in more severe or unusual circumstances, warning the user of military or police activity that may be extremely relevant to them.

Exemplary Computing Environment

Figure 18:
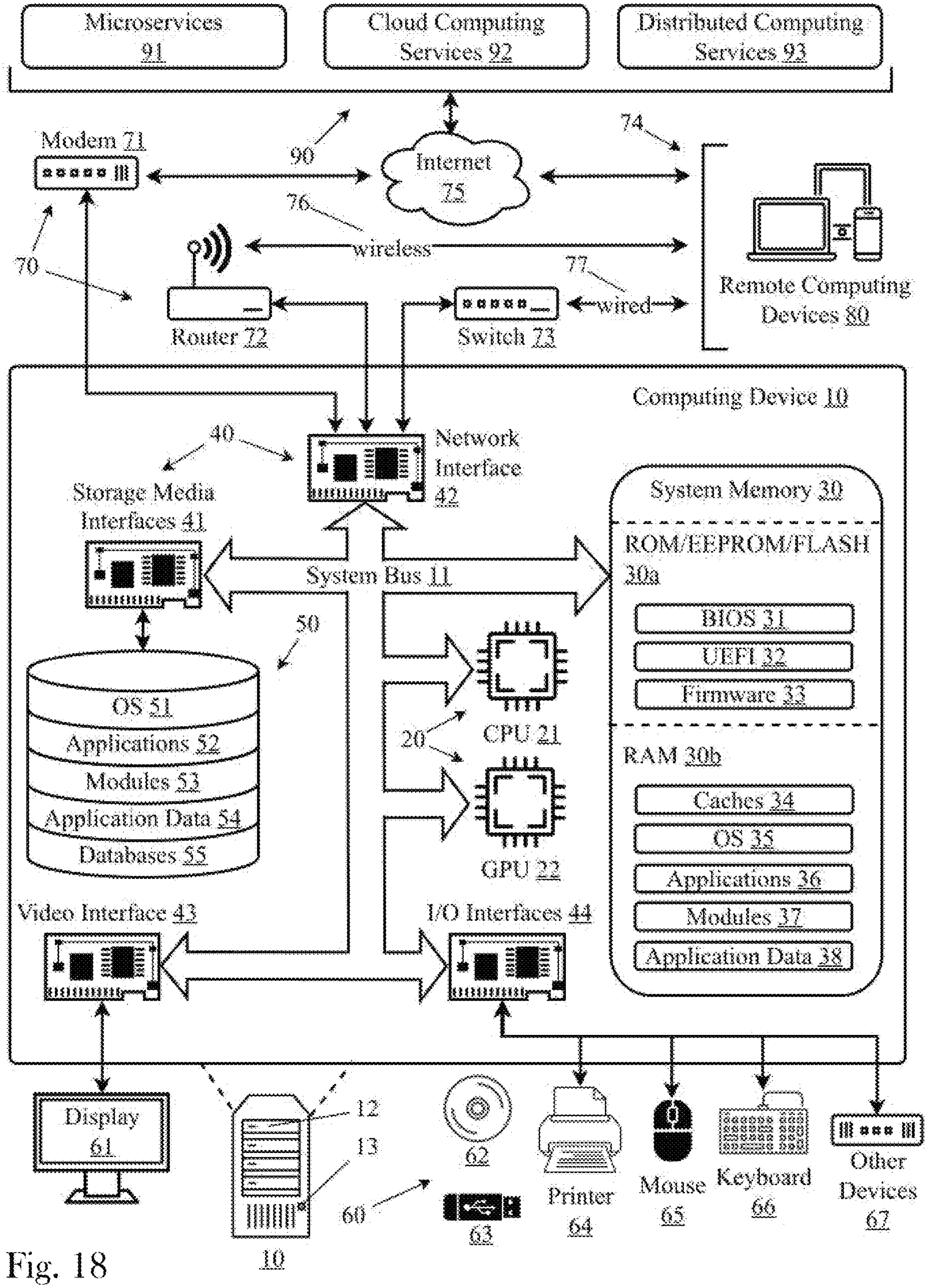
FIG. 18 illustrates an exemplary computing environment on which an embodiment described herein may be implemented, in full or in part.

FIG. 18 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between, those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). However, the term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable or independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory **30*a* such as read only memory (ROM), electronically-erasable programmable memory (EEPROM), or rewritable solid-state memory (commonly known as "flash memory"). Non-volatile memory 30*a* is not erased when power to the memory is removed. Non-volatile memory 30*a* is typically used for long-term storage a basic input/output system (BIOS) 31, containing the basic instructions, typically loaded during computer startup, for transfer of information between components within computing device, unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* such as random-access memory (RAM) is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b*** may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage provide long-term storage of data. Data on non-volatile data storage devices 50 is not erased when power to the non-volatile data storage devices 50 is removed. Non-volatile data storage devices 50 may be implemented using technology for non-volatile storage of content such as CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing 10 as in the case of internal hard drives, removable from computing device 10 as in the case of external USB hard drives, or a combination thereof, but computing device will comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications for providing high-level functionality of computing device 10, program modules 53 such as containerized programs or applications, or other modular content or modular programming, application data 54, and databases 55 such as relational databases, non-relational databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 30 for use) such processes and components may reside or be processed at various times in different components of computing device 10, remote computing devices 80, and/or cloud-based services 90.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services.

Microservices 91 are collections of small, loosely coupled, and independently deployable computing services. Each microservice represents a specific business functionality and runs as a separate process or container. Microservices promote the decomposition of complex applications into smaller, manageable services that can be developed, deployed, and scaled independently. These services communicate with each other through well-defined APIs (Application Programming Interfaces), typically using lightweight protocols like HTTP or message queues. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. For example, cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

Figure 19:
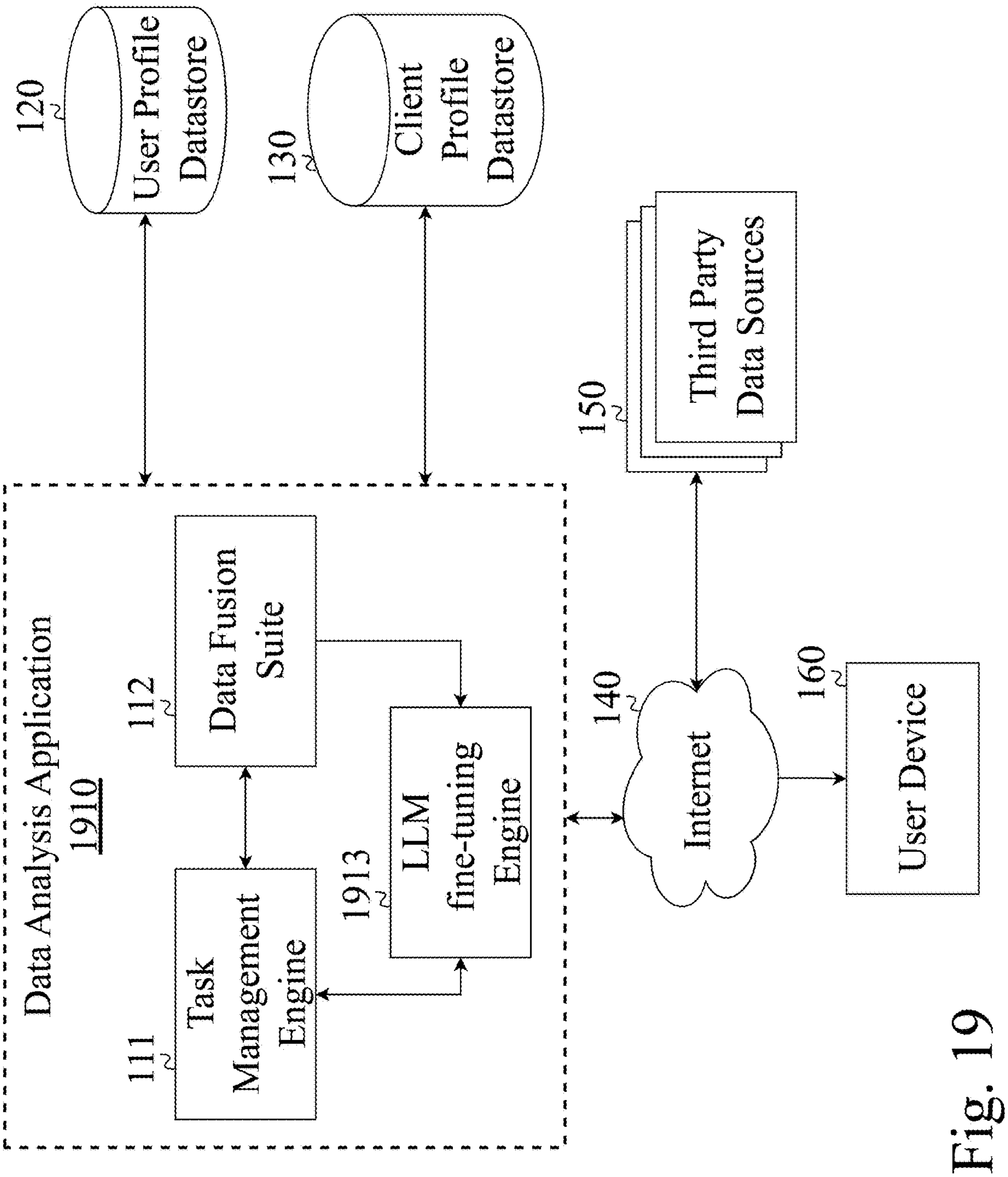
FIG. 19 is a block diagram illustrating an exemplary system architecture for data analysis utilizing an LLM fine-tuning engine, according to an embodiment.

FIG. 19 is a block diagram illustrating an exemplary system architecture for data analysis utilizing a large language model (LLM) fine-tuning engine, according to one or more embodiments. A data analysis application 1910 exists that comprises at least a task management engine 111, data fusion suite 112, and LLM fine-tuning engine 1913, with connections to a user profile datastore 120, client profile datastore 130, and through the internet 140 it also may connect with third-party data sources 150 and at least one user device 160, where the user device may be any common end-user device for computing or task tracking or communications, including fitness trackers, digital assistants, laptops, desktops, mobile phones including smartphones, tablets, or other common computing devices, such as depicted in FIG. 18. Data analysis application 1910 may exist on a server or in a cloud architecture in a serverless or elastic configuration, and may maintain connections to separate or external datastores 120, 130, or may have such datastores as internal parts of the server or cloud configuration, or the application's configuration, depending on the implementation and architectural choices made when implementing an embodiment.

As previously described, third-party data source 150 may be provided by a financial institution such as a bank, stock brokerage, trading platform, credit union or lending service, data subscription service or feed, news service or publication, or some other third-party or external data provider for which any useful scheduling, financial, world-event, or business-related data, may be acquired from. Such a third-party data source 150 may be sent requests for up-to-date data from the data analysis application 1910, or may be configured to send data updates or livestreaming data to the data analysis application 1910, depending on the data source and configuration.

As previously described, a task management engine 111 is a component of data analysis application 1910 that manages the actual placement of individual tasks or events or similar, into a set schedule, that is viewable or readable by a user. These tasks may represent vesting schedules, deadlines for tax implications, earnings dates for businesses, market holidays, tax loss harvesting dates, or any other date relevant to the planning and execution of an investment strategy or financial management strategy for a client or on behalf of a client. A client and user may be the same entity, or separate entities.

A large language model (LLM) is a type of artificial intelligence (AI) model designed to understand and generate human-like text. Large language models are trained on vast amounts of textual data and are capable of performing various natural language processing (NLP) tasks. The LLM can fine-tuned using LLM fine-tuning engine 1913. LLM fine-tuning engine 1913 can include functions and instructions which, when executed by a processor, perform adjustments to an LLM. The fine-tuning can include pre-training the LLM on a large corpus of diverse and general-purpose text. During pre-training, the model learns to predict the next word in a sentence, capturing contextual information and semantic relationships. The pre-training data can include financial data. The financial data can include, but is not limited to, Gross Domestic Product (GDP) for one or more countries, unemployment rates for one or more countries, inflation rates for one or more countries, interest rates for one or more countries, and so on. Moreover, the financial data can include stock market data. The stock market data can include prices, volumes, and/or trends in stock markets. The financial data can include housing market data. The housing market data can include pricing and sales rates. The financial data can include currency data, including exchange rates. The financial data can include commodity price data, such as the prices of raw materials and/or natural resources. In addition to financial data, other data, such as meteorological data, public sentiment data (e.g., from polls, and/or scraped from social media systems and/or other online sources), and public health data (e.g., regarding pandemics, epidemics, and/or other disease outbreaks), may be used as part of the pre-training data set.

LLM fine-tuning engine 1913 may include a task-specific data collection process. The task-specific data collection process can include examples relevant to a target task. The target task can include, but is not limited to, stock price forecasting, net worth forecasting, project scheduling, tax burden minimization, and so on. The LLM fine-tuning engine 1913 may further include architecture modification. In one or more embodiments, slight modifications may be made to the architecture of the pre-trained model. For example, adding task-specific layers or adjusting hyperparameters to better suit the target task. The LLM fine-tuning engine 1913 may then fine-tune the pre-trained model on the task-specific dataset. The weights learned during pre-training are adjusted based on the new task's objective. This process allows the model to adapt its knowledge to the nuances of the specific task. In one or more embodiments, hidden layers can be inserted and/or removed as part of an architectural modifications for an LLM.

The LLM fine-tuning engine 1913 is used in tandem with the task management engine 111 and the data fusion suite 112 to handle training of large language models on a general and per-user and per-client basis, to optimize automated task scheduling, adjusting, and updating, as new data or information is received or released that may be relevant to schedule a new event or task for. The tasks managed by the task management engine 111 may be manually altered, deleted, or added to, and such manual alterations or any user profile preferences for what kinds of tasks or information to emphasize, are sent to the LLM fine-tuning engine 1913 to adjust hyperparameters, make architectural modifications, and/or otherwise update how to handle similar information or tasks that may be received and potentially planned for a user (either for the user as a whole, or for that user when managing a specific client). Such changes may be saved in the user or client profiles, or both, in their respective datastores 120, 130.

Figure 20:
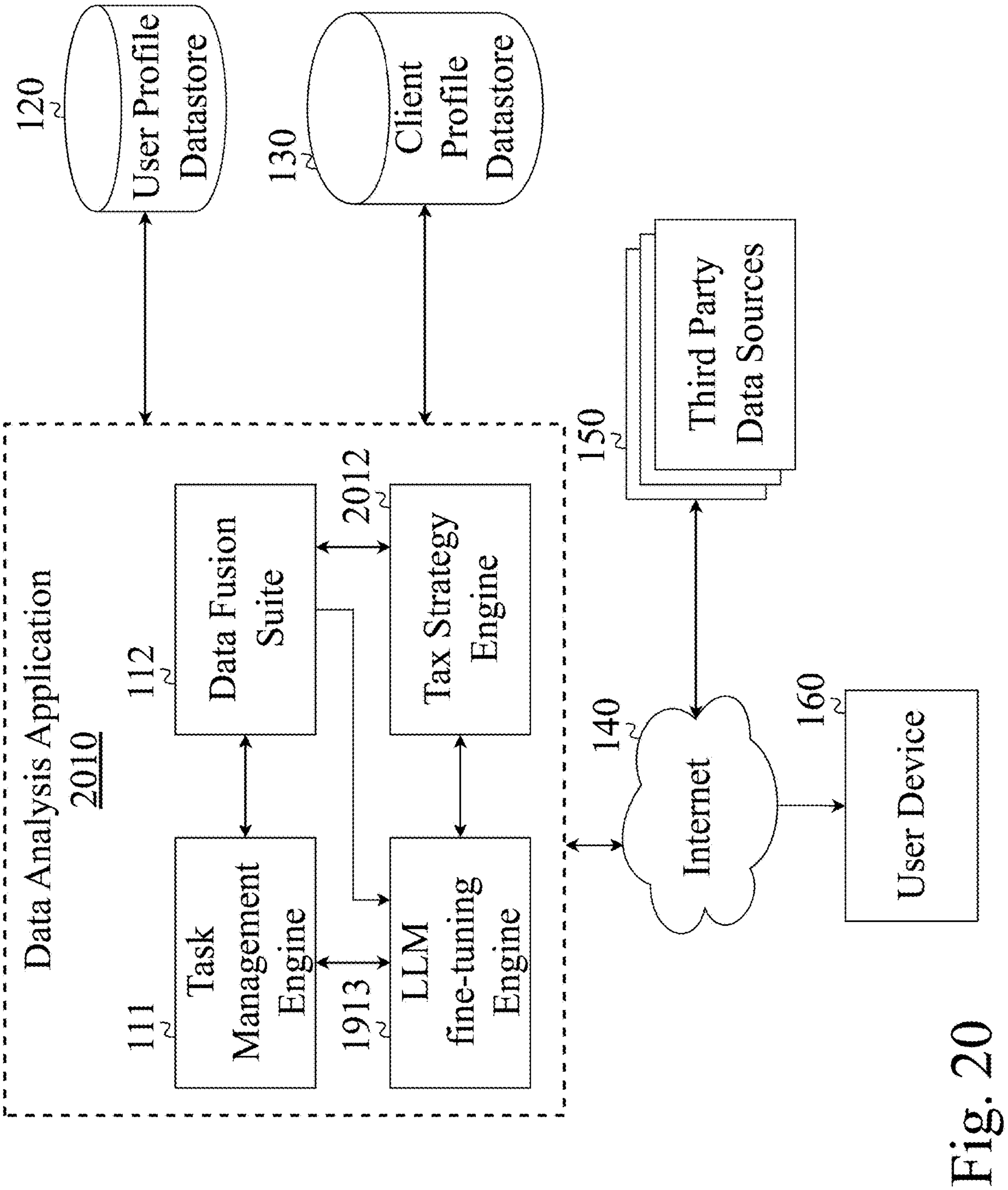
FIG. 20 is a block diagram illustrating an exemplary system architecture for data analysis utilizing a tax strategy engine and an LLM fine-tuning engine, according to an embodiment.

FIG. 20 is a block diagram illustrating an exemplary system architecture for data analysis utilizing a tax strategy engine and an LLM fine-tuning engine, according to an embodiment. In the embodiment shown in FIG. 20, the data analysis application 2010 is similar to the data analysis application 1910 shown in FIG. 19, with the addition of tax strategy engine 2012. The tax strategy engine 2012 can include functions and instructions, which when executed by one or more processors, perform steps to generate a tax strategy for a user, where the user can include an individual, partnership, company, and/or other entity. In embodiments, the tax strategy engine 2012 can perform steps of requesting data from third-party data sources 150 for ingest into the LLM fine-tuning engine 1913. The data from the third-party data sources 150 can include a corpus of laws and rules from one or more jurisdictions, such as local, county, state, provincial, and/or national jurisdictions. One or more conditions may be extracted via natural language processing (NLP), and/or other techniques, including, but not limited to, keyword matching, pattern matching (e.g., via regular expressions), and/or named entity recognition (NER). The data extracted can include financial limits and thresholds, dates, and/or other limits. The tax strategy engine can filter data that is provided to the LLM fine-tuning engine, in order to train a LLM for tax strategy. The training can include supervised, unsupervised, and/or semi-supervised learning. The supervised learning can include providing data sets that include both optimal and suboptimal tax strategy scenarios. The tax strategy scenarios can include sequences of one or more actions. The sequences can include activities such as purchasing and/or selling of assets, such as real estate, and/or stocks and/or other funds. The sequences can include corporate actions such as increasing/reducing and employee count at a company, making capital expenditures, and/or other actions. For businesses, the tax strategy scenarios that are used for training can include scenarios that take advantage of tax credits and deductions, including available tax credits for industry-specific activities, such as green energy development, and the like. The scenarios can include depreciation scenarios, such as utilizing accelerated depreciation methods for capital assets such as buildings, vehicles, and/or other equipment. The scenarios can include using different entity structures, such as corporation type, as part of the supervised learning process. The scenarios can include identifying tax-favored investments, charitable contributions, Section 179 expense scenarios, and so on. By providing this information to the LLM fine-tuning engine 1913, disclosed embodiments can identify patterns and/or actions that may result in an advantageous tax situation for an individual, partnership, and/or other business entity.

Figure 21:
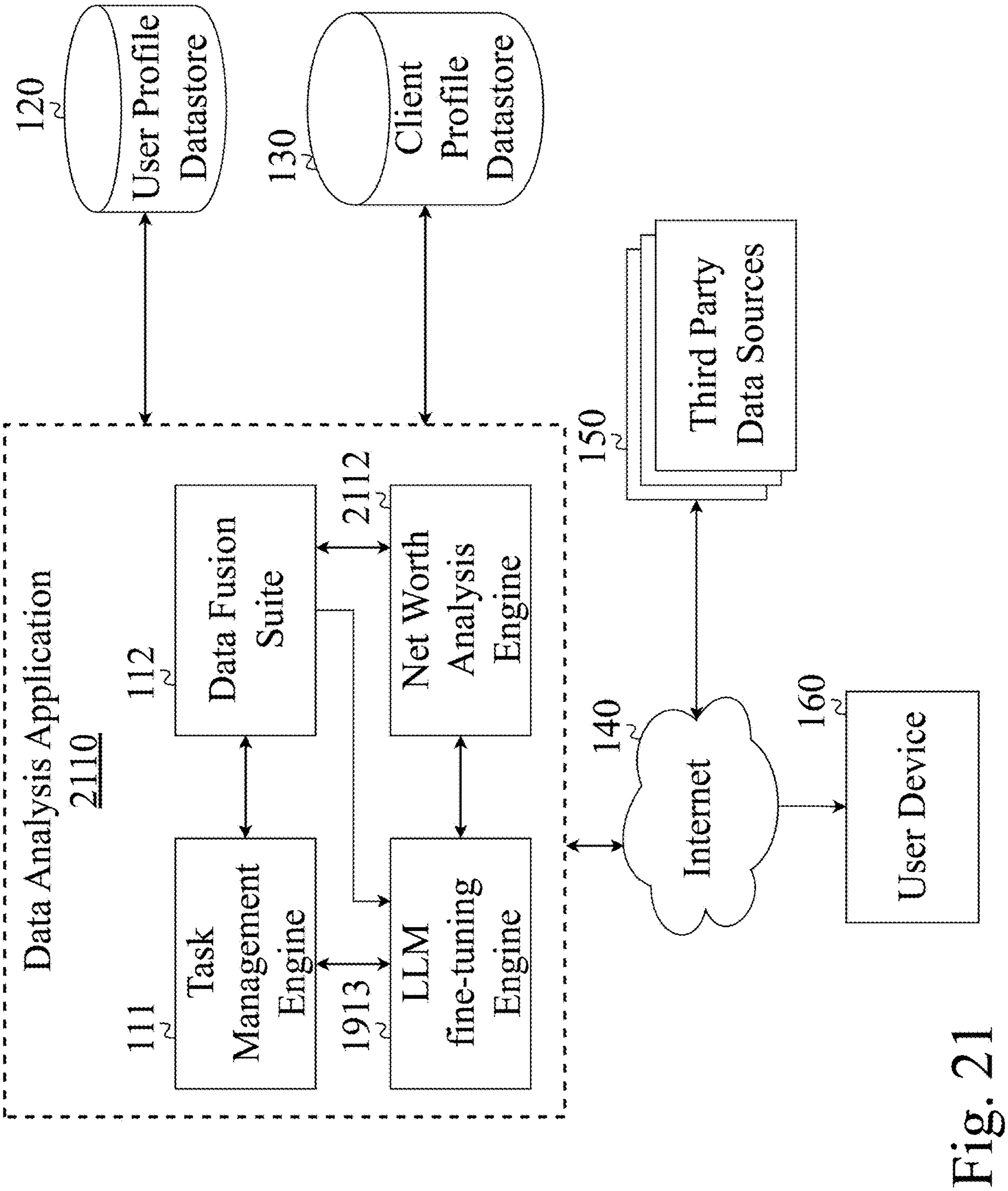
FIG. 21 is a block diagram illustrating an exemplary system architecture for data analysis utilizing a net worth analysis engine and an LLM fine-tuning engine, according to an embodiment.

FIG. 21 is a block diagram illustrating an exemplary system architecture for data analysis utilizing a net worth analysis engine 2112 and an LLM fine-tuning engine, according to an embodiment. In the embodiment shown in FIG. 21, the data analysis application 2110 is similar to the data analysis application 1910 shown in FIG. 19, with the addition of net worth analysis engine 2112. The net worth analysis engine 2112 can include functions and instructions, which when executed by one or more processors, perform steps to generate a net worth analysis for a user.

Determining the net worth of an individual involves calculating the difference between their assets and liabilities. Net worth is a key financial metric that provides an indication of an individual's overall financial health. The net worth determination can include determining a current state of assets and liabilities. The assets can include, but are not limited to, cash on hand, bank account balances, as well as investment portfolios, including stocks, bonds, mutual funds, and other securities. The assets can further include an estimated value of owned real estate, such as homes, land, or commercial properties. The assets can further include retirement accounts, such as 401(k)s, IRAs, and/or other pension plans. The assets can further include business ownership, such as the value of any ownership stake in a business, including shares, partnership interests, or sole proprietorship assets. The assets may further include personal property, such as automobiles, boats, art, jewelry, collectibles, antiques, and other personal possessions. The assets can include intellectual property assets, such as patents, copyrights, and/or royalties resulting from the intellectual property assets. The liabilities that can be evaluated for net worth estimations can include outstanding balances on mortgages and loans, student loan debt, credit card debt, and/or other outstanding debts, such as medical bills and/or home improvement loans.

In addition to deriving a current net worth, disclosed embodiments may utilize an LLM that has been tuned by LLM fine-tuning engine 1913 to estimate a future net worth. In one or more embodiments, the future net worth can be based on AI-generated population of "market values" of non-public securities from public sources. Embodiments can provide information regarding exercise prices of vested and unvested options, exercisable tranches of options, value of unvested and/or forfeited options, and more. Disclosed embodiments can enable a snapshot of vested equity and corresponding cash required to exercise at any given time. Moreover, disclosed embodiments enable a client to input a "target" market value and request disclosed embodiments to "flag" the optimal time and availability of cash to exercise options to take advantage of capital gains tax rates as compared with ordinary income.

The net worth analysis engine 2112 can filter data that is provided to the LLM fine-tuning engine, in order to train a LLM for net worth analysis. The training can include supervised, unsupervised, and/or semi-supervised learning. The supervised learning can include providing data sets that include net worth computations over time for an individual, couple, and/or other entity. The data can include banking data. In one or more embodiments, the LLM is trained via the LLM fine-tuning engine to derive individual saving habits. The saving habits can provide an indication of the propensity of an individual or couple to save. The saving habits can be used as a criterion in estimating a future net worth. The data can further include credit score data. The credit score data can be used as a criterion in estimating a future net worth. The data can further include insurance coverage data. Insurance coverage data can be used as a criterion for deriving a financial setback probability (FSP). The FSP can be a criterion used in estimating a future net worth. By providing this information to the LLM fine-tuning engine 1913, disclosed embodiments can identify patterns and/or actions that may be used to provide estimates for future net worth based on current conditions and additional data patterns that are identified by a fine-tuned LLM.

Figure 22:
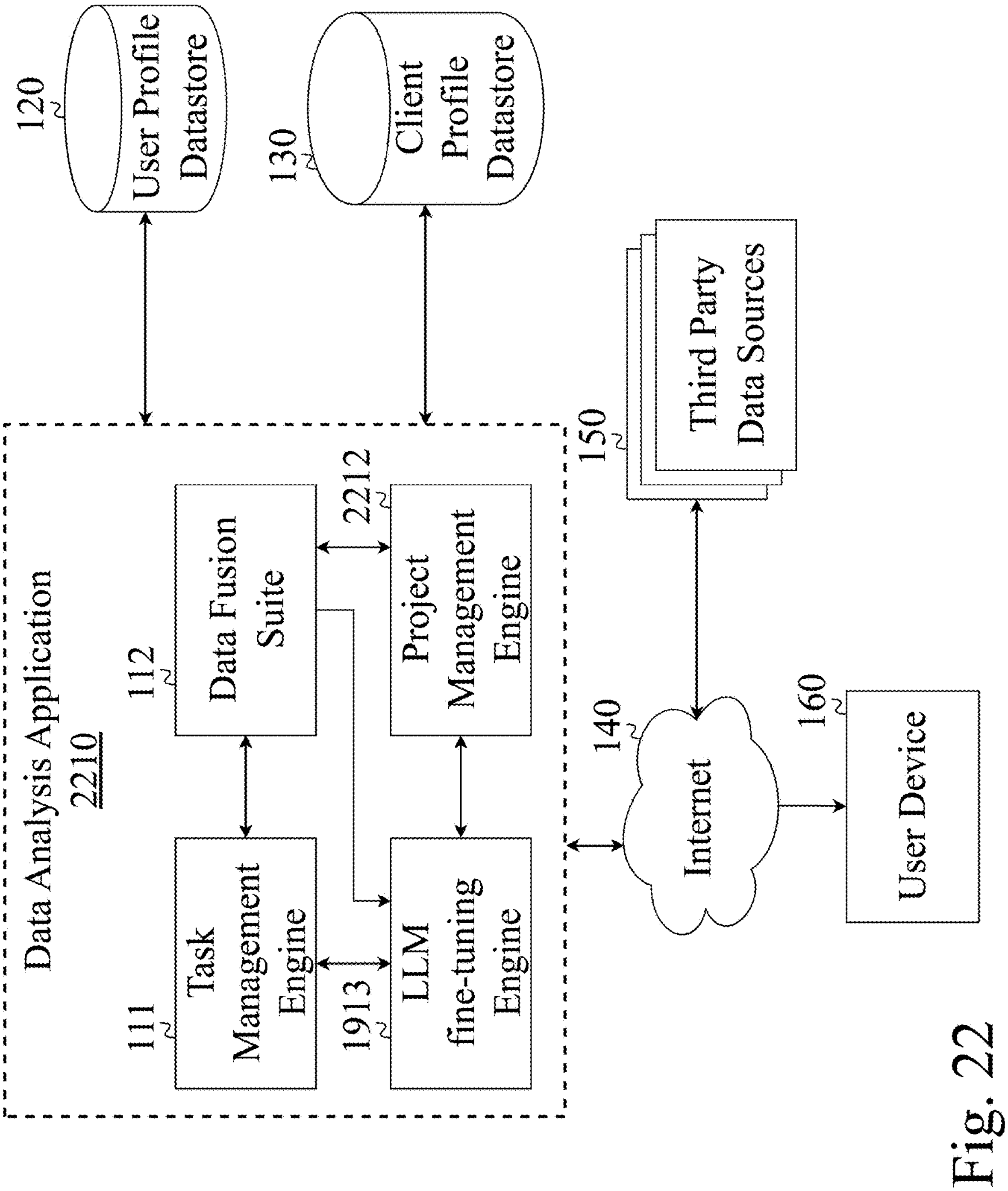
FIG. 22 is a block diagram illustrating an exemplary system architecture for data analysis utilizing a project management engine and an LLM fine-tuning engine, according to an embodiment.

FIG. 22 is a block diagram illustrating an exemplary system architecture for data analysis utilizing a project management engine and an LLM fine-tuning engine, according to an embodiment. In the embodiment shown in FIG. 22, the data analysis application 2210 is similar to the data analysis application 1910 shown in FIG. 19, with the addition of project management engine 2212. The project management engine 2212 can include functions and instructions, which when executed by one or more processors, perform steps to manage project milestones, project dependencies, billable hours, and so on. In one or more embodiments, the project management engine 2212 can filter data that is provided to the LLM fine-tuning engine, in order to train a LLM for project management operations. The training can include supervised, unsupervised, and/or semi-supervised learning. The supervised learning can include providing data sets that include various project management scenarios. Project management software relies on various data sources and considerations to effectively plan, execute, and monitor projects. The inputs to project management software help in creating schedules, allocating resources, tracking progress, and making informed decisions. The data can include schedule information. The schedule information can include a timeline that outlines when project activities will be performed. It can include start and end dates for each task, dependencies, and critical path information, and more. The data can include resource information. The resource information can include information regarding the availability and allocation of resources (human, material, equipment) needed for project tasks. This helps in optimizing resource usage and avoiding overloads. The data can include risk data. The risk data can indicate potential risks to the project. The risk data can include information on the probability, impact, and response plans for each identified risk. The data can include budget data. The budget data can include financial information about the project, including estimates for costs, funding sources, and budget constraints. Disclosed embodiments can help track expenses against the budget.

In one or more embodiments, the LLM is trained via the LLM fine-tuning engine to generate information that can be used and/or rendered on a project management dashboard. The project management dashboard can include visual indications, such as a comprehensive Gantt chart, a list of project milestones, contacts, and more. While some information regarding a project may be deterministic, such as budget, number of staff, and the like, other information may be non-deterministic. In particular, risk associated with future phases of a project may be estimated using an LLM that is trained via the LLM fine-tuning engine to estimate risk for one or more milestones and/or project phases.

In addition to risk predictions, disclosed embodiments can provide a threaded commentary feature, which organizes communication (e.g., instant message communication) into threads, to keep the commentary clear and orderly, allowing project teams to work asynchronously. Disclosed embodiments provide a messaging feature, which enables project stakeholders to communicate with each other via instant message (chat). In embodiments, the chats can be organized into threads for clarity and improved organization. Embodiments enable users to start a thread, and/or respond to a thread that has already been started by another.

In one or more embodiments, a summary of each thread is generated using AI-based text summarization techniques, such as NLP (Natural Language Processing). Disclosed embodiments perform AI-based text summarization using artificial intelligence techniques to automatically generate concise and coherent summaries of longer texts, such as threaded conversations. The AI-based text summarization can include multiple text processing steps. The text processing can include a pre-processing step that can include tokenization, sentence segmentation, removal of stop words, and/or other irrelevant information. The pre-processed text may be subject to techniques such as TF-IDF (Term Frequency-Inverse Document Frequency) to obtain numerical metadata for the text passage. The text processing can include sentence scoring, in which a score is assigned to each sentence based on its relevance or importance to the overall content. The top-ranked sentences are selected to form the summary. In embodiments, the ranking can be performed with a graph-based method, greedy algorithm, and/or other suitable techniques. One or more embodiments may utilize abstractive techniques for generating summarization text. The summarizations can assist new team members in getting up to speed quickly when joining a project that is already in progress. Disclosed embodiments can enable project managers to streamline their efforts, enhance collaboration, and make data-driven decisions throughout the project lifecycle. This integration fosters efficiency and transparency, promoting successful project outcomes.

Figure 23:
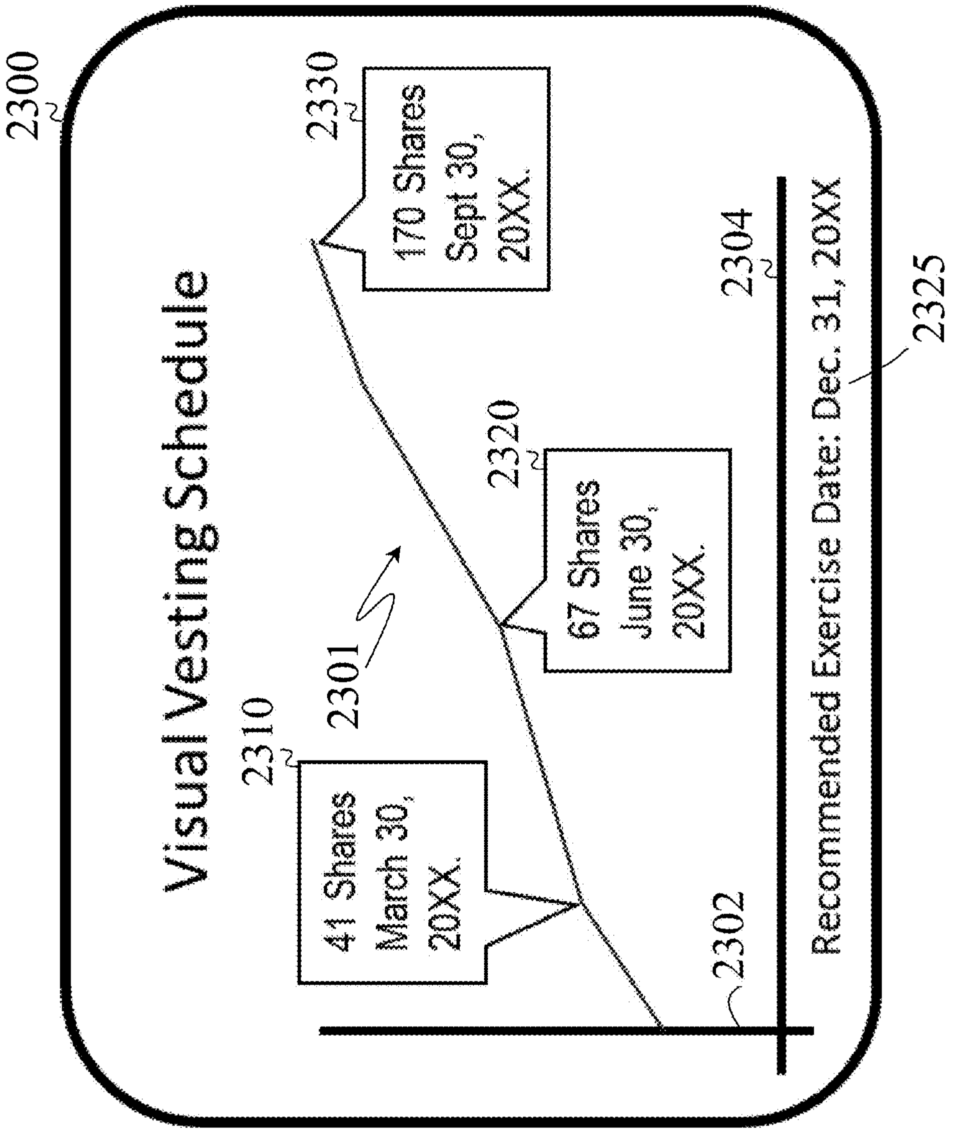
FIG. 23 is a diagram of a user interface showing a visual vesting schedule, according to an embodiment.

FIG. 23 is a diagram of a user interface 2300 showing a visual vesting schedule, according to an embodiment. The visual vesting schedule can include a graph 2301. The graph 2301 can include a vertical axis 2302 and a horizontal axis 2304. The vertical axis 2302 can represent a monetary value (e.g., in USD), a number of shared, and/or other data pertaining to financial instruments that vest over time. The horizontal axis 2304 can represent time in days, weeks, months, years, and/or other suitable time unit. In one or more embodiments, multiple informational tags may be rendered at various points along graph 2301 to indicate vesting information. In the example of FIG. 23, information tag 2310 indicates that 41 shares are vesting on March 30. Similarly, information tag 2320 indicates that 67 shares are vesting on June 30, and information tag 2330 indicates that 170 shares are vesting on September 30. While three information tags are shown in FIG. 23, in practice, embodiments can include more or fewer informational tags. In one or more embodiments, user interface 2300 may be rendered on an electronic display of a computing device such as a laptop computer, desktop computer, tablet computer, smartphone, wearable computer, and/or other suitable computing device.

The user interface 2300 can further include a recommended exercise date 2325. In one or more embodiments, the recommended exercise date can be computed based on data provided by a data analysis application, such as data analysis application 1910, 2010, 2120, and/or 2210. The recommended exercise date 2325 can be derived based on a fine-tuned LLM model, information analyzed by tax strategy engine 2012 (FIG. 20), and/or other criteria, such as the time to expiration, estimated market volatility, dividend payout dates, and/or other data. Disclosed embodiments can perform computations including financial analysis, risk management, and market expectations, in order to use an AI-based strategy in recommending when to exercise options.

In addition to the vesting schedule described in FIG. 23, other embodiments can perform additional analysis, such as a mortgage refinancing analysis. The analysis can include determining if a fixed-rate mortgage is better than an adjustable-rate mortgage. Disclosed embodiments can utilize various data, such as the initial fixed rate period of the adjustable-rate mortgage, risk tolerance (e.g., based on user profile data), anticipated duration of property ownership, financial goals, interest rate projections, and/or other information.

Figure 24:
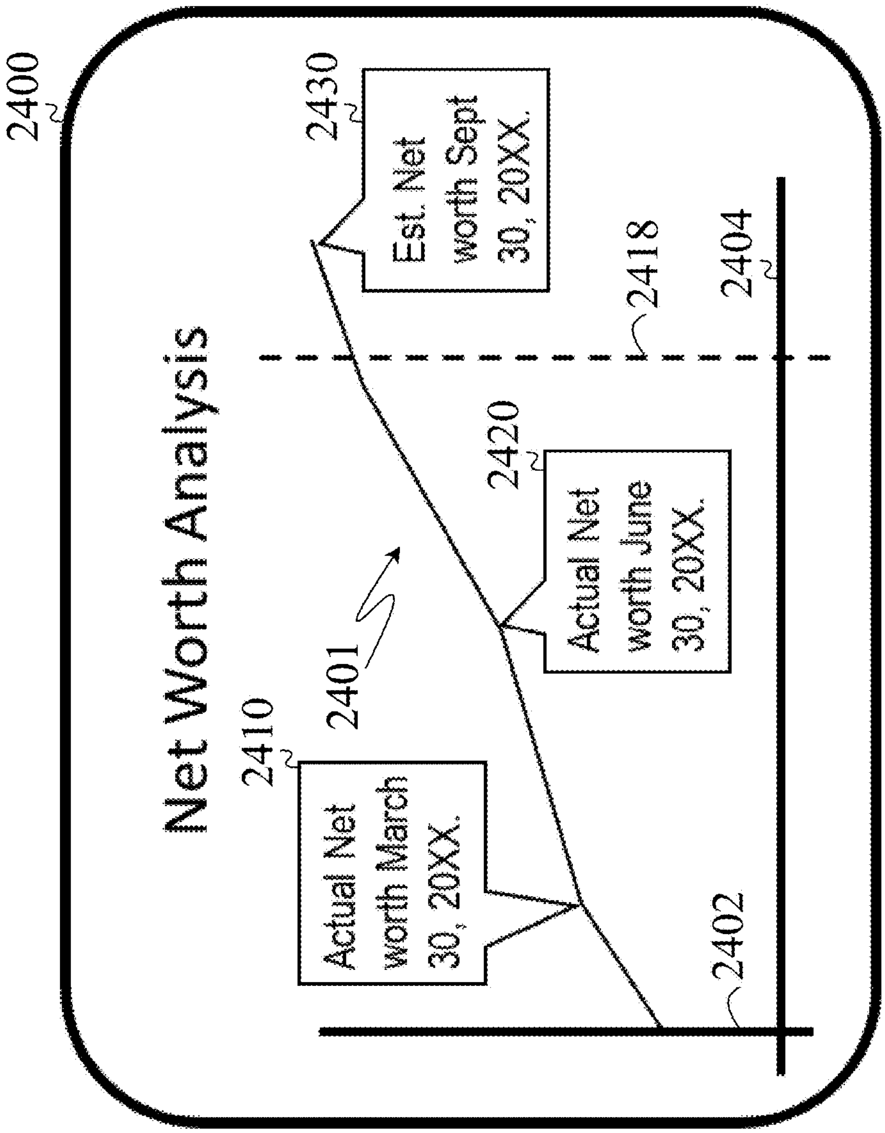
FIG. 24 is a diagram of a user interface showing a net worth analysis, according to an embodiment.

FIG. 24 is a diagram of a user interface 2400 showing a net worth analysis, according to an embodiment. The visual vesting schedule can include a graph 2401. The graph 2401 can include a vertical axis 2402 and a horizontal axis 2404. The vertical axis 2402 can represent a monetary value (e.g., in USD). The horizontal axis 2304 can represent time in days, weeks, months, years, and/or other suitable time unit. In one or more embodiments, multiple informational tags may be rendered at various points along graph 2401 to indicate net worth information. In the example of FIG. 24, information tag 2410 indicates a net worth for an individual as of March 30. Similarly, information tag 2420 indicates a net worth for an individual as of June 30. Information tag 2430 indicates an estimated net worth based on a prediction target date of September 30. While three information tags are shown in FIG. 24, in practice, embodiments can include more or fewer informational tags.

The user interface 2400 can further include current date indication 2418. Accordingly, the net worth analysis indicated in FIG. 24 can include both an actual analysis of corresponding to a present date or past date, as well as an estimated net worth on a future date (prediction target date). In one or more embodiments, the estimated net worth on a predicted target date can be computed based on data provided by a data analysis application, such as data analysis application 1910, 2010, 2120, and/or 2210. The estimated net worth analysis can be derived based on a fine-tuned LLM model, information analyzed by net worth analysis engine 2112 (FIG. 21), tax strategy engine 2012 (FIG. 20), and/or other criteria.

One or more embodiments can include a ‘snapshot’ feature that creates a current assessment of the net worth of an individual, including any investment portfolio, securities, and/or hard assets. Embodiments can generate likely asset values in the future based on Internal Rate of Return (IRR). Disclosed embodiments can further enable portfolio “what-if scenarios” based on changing risk propensity, income and/or availability of cash.

Gaining insight into future net worth can provide several benefits, as it offers valuable insights into overall financial health and helps users make informed decisions. An estimate of future net worth can enable users to make strategic financial decisions based on a clearer understanding of their financial position. It helps in setting realistic goals and creating a roadmap for achieving them. Additionally, future net worth can provide insights into debt management and debt reduction planning. For example, in a scenario where a user’s future net worth projections indicate high levels of debt, it can serve as an indication to prioritize debt reduction strategies. Another benefit of estimating future net worth is to assist with retirement planning. Assessing future net worth can help estimate whether a user’s current savings and investments are sufficient to maintain the desired lifestyle during retirement. In one or more embodiment, data used to pre-train a LLM can include data for predicting one or more factors that can impact net worth, including, but not limited to, tax rates, exchange rates, inflation rates, stock index predictions, and/or other indicators. By providing estimates of future net worth, disclosed embodiments provide a powerful tool for building financial resilience, making informed decisions, and achieving long-term financial success. In one or more embodiments, user interface 2400 may be rendered on an electronic display of a computing device such as a laptop computer, desktop computer, tablet computer, smartphone, wearable computer, and/or other suitable computing device. The user interfaces shown in FIG. 23 and FIG. 24 are exemplary, and other embodiments may have more, fewer, and/or different elements and arrangements than what is depicted in FIG. 23 and FIG. 24.

Figure 25:
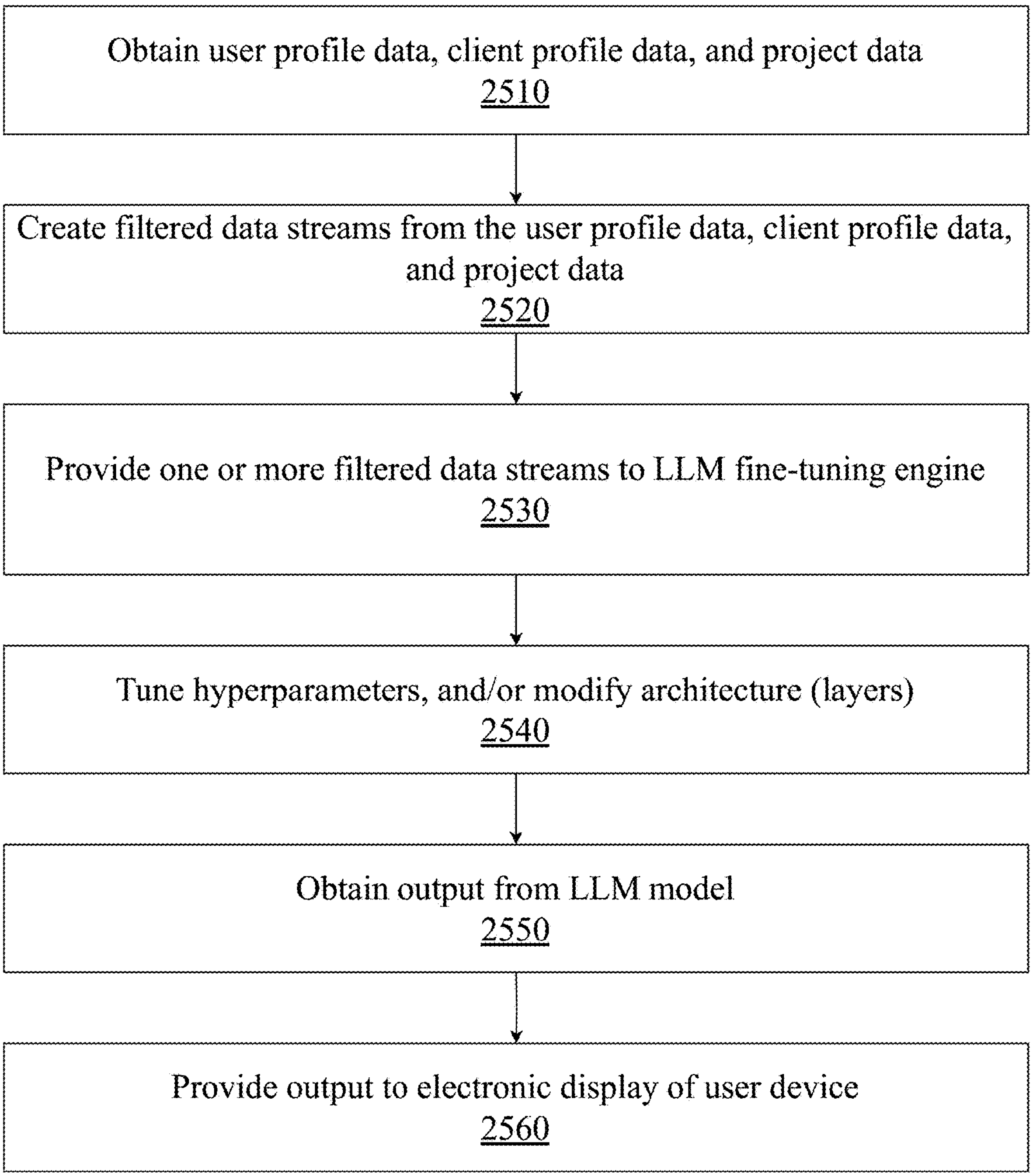
FIG. 25 is a flow diagram illustrating an exemplary method for data analysis using an LLM fine-tuning engine, according to an embodiment.

FIG. 25 is a flow diagram illustrating an exemplary method for data analysis using an LLM fine-tuning engine, according to an embodiment. The flow diagram starts at block 2510 with obtaining user profile data, client profile data, and project data. The user profile data can include personal information, such as name, address, age, occupation, education, and/or other information. Moreover, the user profile data can include preferences, financial information, salary information, and/or other relevant information. In one or more embodiments, a user may ‘opt-in’ to provide user profile data, and/or control how the user profile data is used and/or shared by disclosed embodiments. The client profile data can include general business metadata such as a business name, business type/industry, physical locations, and/or other information. The client profile data can further include ownership metadata, including details about company officers, owners, partners, and/or shareholders. The client profile data can further include employee data, including the number of employees at each location, payroll data for each employee, training/skill level of each employee, and so on. The client profile data can further include product/service metadata, including descriptive information regarding products and/or services offered by the business, pricing information, product/service lifecycle information, and so on. The project data can include billable hours, milestones, team member information, project personnel time tracking information, project-related correspondence, and the like.

The flow continues to block 2520, where filtered data streams from the user profile data, client profile data, and project data are created. In one or more embodiments, the filtered data streams can be created by the data fusion suite 112 (FIG. 19). The filtered data can be filtered based on the application and/or analysis topic. As an example, for tax strategy analysis, the filtered data can include data relevant to tax strategy, and filter out data that is not relevant to tax strategy. The data can be filtered using keywords, regular expressions, machine learning techniques, such as natural language programming (NLP), and/or other suitable techniques. The flow continues with providing the one or more filtered data streams to an LLM fine-tuning engine at block 2530. The flow then continues to block 2540, where hyperparameters are turned and/or architecture modification occurs. The hyperparameters can include, but are not limited to, learning rate, number of layers, hidden size, attention heads, dropout rate, sequence length, batch size, gradient accumulation steps, epochs, vocabulary size, and/or weight decay. Other hyperparameters may be tuned in some embodiments.

The learning rate can indicate the step size or rate at which the model's parameters are updated during training. The number of layers can indicate the depth of the neural network. The hidden size can indicate the number of neurons in the hidden layers of the models. The attention heads can indicate the number of attention mechanisms in the attention layer (layer of neural networks added to deep learning models to focus their attention to specific parts of data, based on different weights assigned to different parts). The dropout rate can correspond to a probability of dropping out a unit or connection during training to prevent overfitting. The sequence length can indicate a length of the input sequence processed by the model. The epochs can indicate the number of times the entire training dataset is processed by the model during training. The vocabulary size can indicate the number of training examples processed in a single iteration or batch. The gradient accumulation steps can indicate the number of steps before updating the model's parameters. The weight decay can represent a regularization term that penalizes large weights in the model.

The architecture modification can include removal of a hidden layer, addition of a hidden layer, and/or modifying one or more connections within a layer, or between layers. Additionally, the architecture modification can include changing the number of neurons in one or more hidden layers. Moreover, the number of attention heads in the multi-head attention mechanism can be adjusted. More heads may allow the model to focus on different aspects of the input sequence simultaneously. The architecture modification can include introducing custom attention layers to capture specific patterns or dependencies in the data. For instance, the architecture modification can include incorporating sparse attention or hierarchical attention mechanisms. The architecture modification can include modifying the activation functions within the layers in order to adjust the model's non-linearity. In one or more embodiments, the activation functions can include ReLU (Rectified Linear Unit), GELU (Gaussian Error Linear Unit), and/or other activation functions. The architectural modifications can include adding skip connections between layers to alter the flow of information and gradients through the network. Other architectural modifications can be performed instead of, or in addition to, the aforementioned architectural modifications, in one or more embodiments. The flow can include obtaining an output from an LLM model at block 2550. The output can include, but is not limited to, generated text, answers to questions, translated text, summarized content, sentiment analysis, named entity recognition, probabilities, confidence scores, and/or other task-specific outputs. The flow continues with providing the output from the LLM model to an electronic display of a user device at block 2560. The user device can include a computer, such as a desktop or laptop computer, tablet computer, smartphone, wearable computer, and/or other suitable computing device. The electronic display can include a touchscreen. The output can include text, images, animation, interactive content, and so on.

Figure 26:
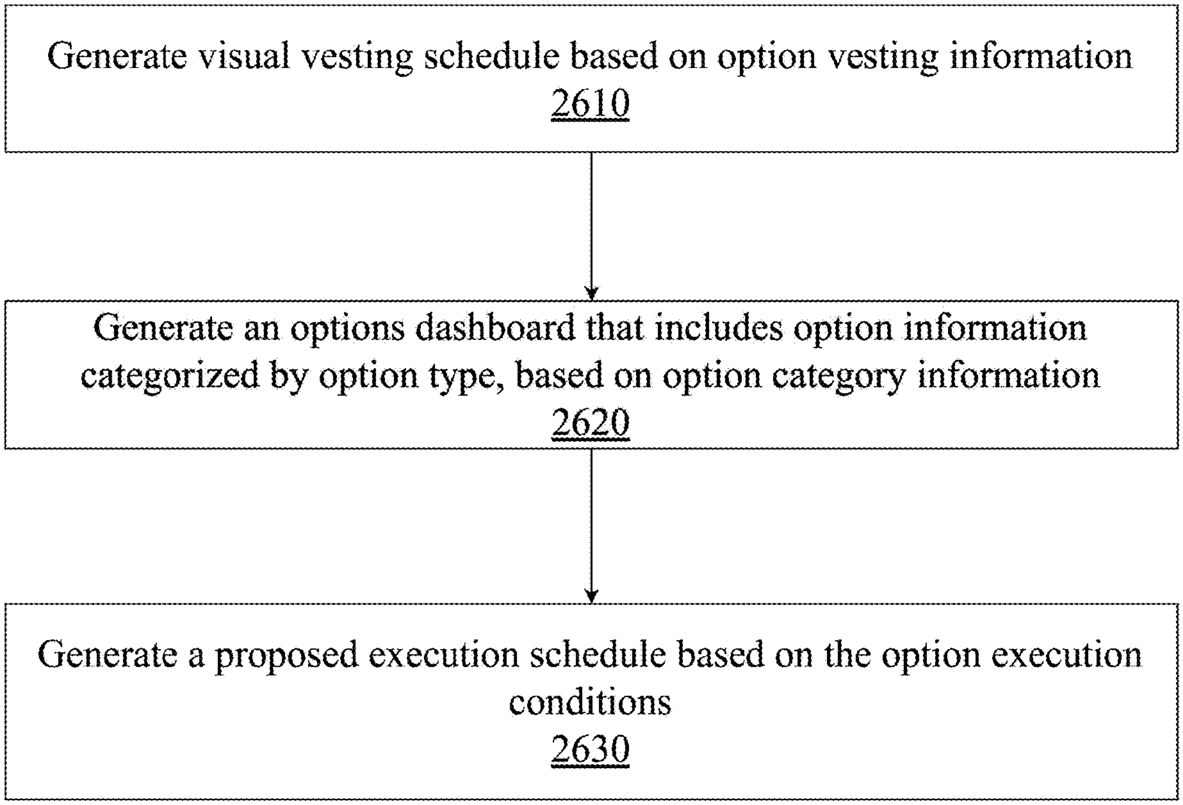
FIG. 26 is a flow diagram illustrating an additional exemplary method for data analysis using an LLM fine-tuning engine, according to an embodiment.

FIG. 26 is a flow diagram illustrating an additional exemplary method for data analysis using an LLM fine-tuning engine, according to an embodiment. The flow diagram starts with generating a visual vesting schedule based on option vesting information at block 2610. The visual vesting schedule can include a graphical representation of vested option values at various points in time, as well as a recommended exercise date. In one or more embodiments, the recommended exercise date for options may be generated by a fine-tuned LLM that is trained on a variety of financial data, including tax rules, market forecasts, currency exchange rate forecasts, and/or other data forecasts. The flow diagram further includes, at block 2620, generating an options dashboard that includes option information categorized by option type, based on option category information. The option category can include incentive stock options (ISOs), non-qualified (NQ) stock options, indexed stock options, reload options, performance stock options, call options, put options, short-term options, long term-options, restricted stock units (RSUs), employee stock options, and/or other option types. The flow diagram further includes, generating a proposed execution schedule based on option execution conditions. The option execution conditions can include, a vesting period, expiration date, exercise price, employee status, company policies, tax implications (e.g., qualifying for long-term capital gains tax rates), and so on. The proposed execution schedule can be tailored to minimize tax burden, based on output from a LLM that is tuned with a fine-tuned LLM engine. Disclosed embodiments enable coordination of the exercise of stock options with other elements of an individual's financial situation, such as deductions, credits, and other income sources, and can help optimize the overall tax liability for a given year. The flow diagram further includes, at block 2630, generating a proposed execution schedule based on the option execution conditions. In one or more embodiments, the execution schedule can be rendered in a graphical, and/or tabular format.

Figure 27:
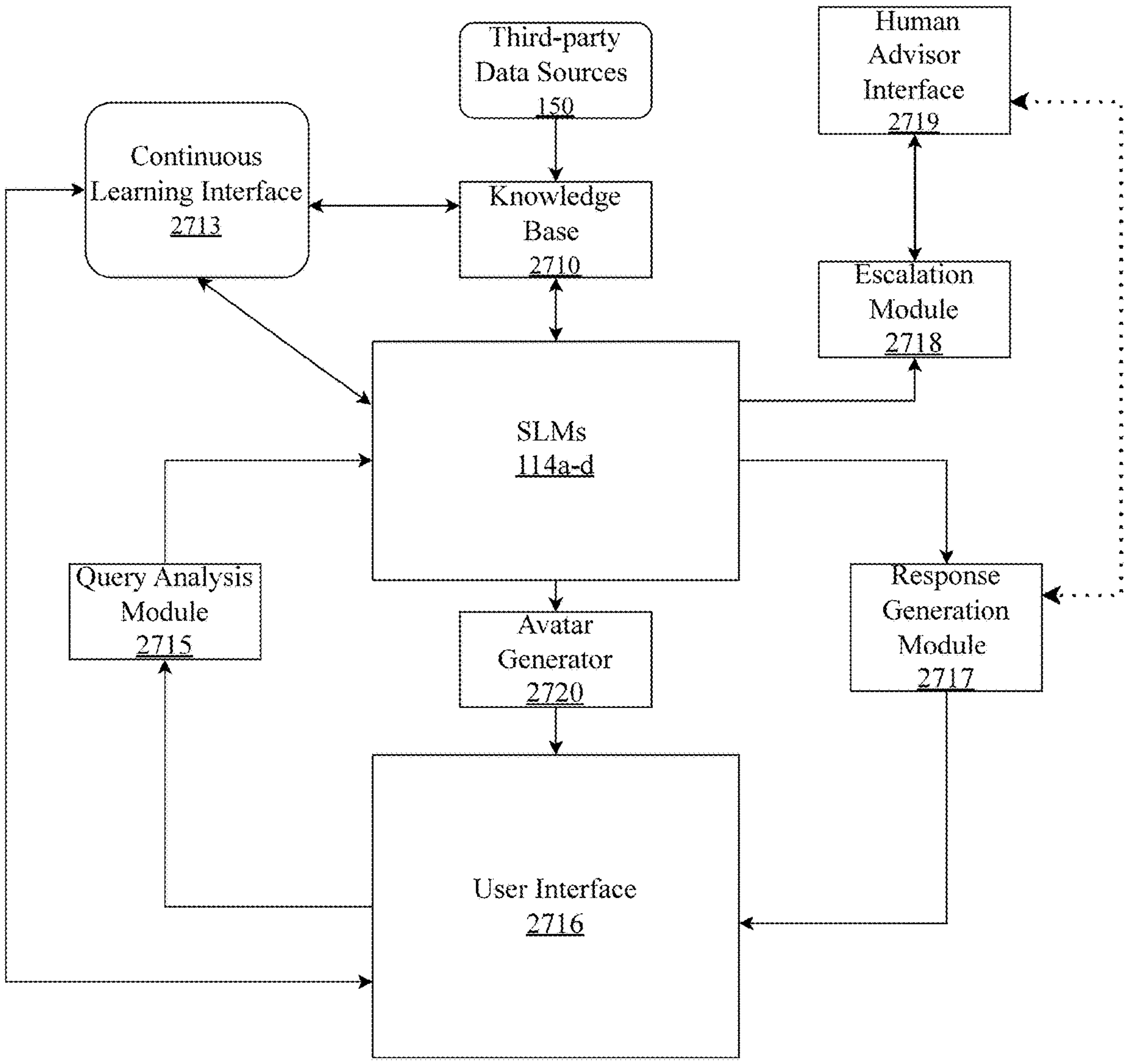
FIG. 27 illustrates the system architecture of the digital advisor, including the SLM and avatar components, according to an embodiment.

FIG. 27 illustrates the system architecture of the digital advisor, including the multiple Specialized Language Models (SLMs) and avatar components, according to an embodiment. At the core of the system are the SLMs 114*a-d*, represented as interconnected central components. These components serve as cognitive engines for different areas of financial expertise: Portfolio Management 114*a*, Financial Planning 114*b*, Tax Strategy 114*c*, and Corporate Advisory 114*d*. Each SLM processes complex financial queries within its domain and generates expert-level responses. The SLMs are connected to a Knowledge Base 2710. This Knowledge Base 2710 is continually updated with data from third-party sources 150, including real-time market data feeds, regulatory updates from financial authorities, historical market trends, and anonymized case studies of successful financial strategies specific to the firm's approach. For instance, it might contain the entire history of S&P 500 performance, up-to-the-minute cryptocurrency valuations, the latest amendments to tax laws, and proprietary investment strategies developed by the firm's experts.

The Avatar Generator 2720 brings a human touch to this digital interface, creating lifelike visual and auditory representations of financial advisors for each area of expertise. This component leverages advanced computer graphics and voice synthesis technologies to generate personalized avatars for each client interaction. It might adjust the avatars' appearances based on client preferences or the nature of the financial advice being given, perhaps presenting a more conservative look for retirement planning and a more dynamic appearance for discussing high-risk investments. The Avatar Generator 2720 is intricately linked to both the SLMs 114*a-d* and the User Interface 2716, ensuring that each avatar's expressions and tone match the nuances of the advice being provided in its specific domain. The digital avatars are generated using a hybrid approach combining 3D scanning and deep learning. There is a structured light 3D scanner to capture high-resolution geometry of the human advisor's face, which is then retopologized to a standard topology of 15,000 polygons. Textures are created using a multi-view stereo setup with nine 4K cameras, processed through a custom photogrammetry pipeline. For facial animations, a FACS-based blend shape system is employed with 52 action units, driven by a deep learning model trained on a dataset of over 1,000 hours of annotated video footage of financial advisors. Voice synthesis utilizes a modified WaveNet architecture, fine-tuned on 20 hours of clean audio recordings from the specific advisor to capture their unique vocal characteristics.

The Query Analysis Module 2715 serves as the system's initial point of contact with client inquiries. This sophisticated natural language processing component dissects incoming questions, identifying key financial concepts, client intent, and query complexity. For example, it can distinguish between a straightforward question about current interest rates and a complex inquiry about optimizing a diversified portfolio for early retirement while minimizing tax implications. The module then feeds this processed information to the SLM for in-depth analysis.

Query analysis employs a two-stage NLP pipeline. The first stage uses a BERT-based model fine-tuned on a corpus of 1 million financial queries to perform intent classification and named entity recognition. This model achieves an F1 score of 0.92. The second stage uses a graph neural network to traverse the financial knowledge graph, identifying relevant concepts and their relationships. Query complexity is determined by a weighted combination of factors including the number of distinct financial entities (weighted at 0.3), the rarity of terms used (0.2), the predicted response length (0.2), and the depth of knowledge graph traversal required (0.3). Queries scoring above 0.75 on this scale are routed to human advisors.

Once the SLM processes the query, the Response Generation Module 2717 takes over. This component transforms the SLM's output into clear, coherent, and client-friendly responses. It might adjust the language complexity based on the client's financial literacy level, incorporate relevant metaphors to explain complex concepts, or break down long-term strategies into actionable steps.

The Escalation Module 2718 plays a crucial role in maintaining the quality and reliability of the advice given. It constantly monitors the complexity and potential impact of each query and the SLM's confidence in its response. If a query surpasses predefined thresholds—for instance, a question about intricate international tax implications of a multinational corporation's restructuring—the module smoothly transitions the interaction to a human advisor via the Human Advisor Interface 2719.

The Continuous Learning Module 2713 embodies the system's commitment to perpetual improvement. This feedback loop meticulously analyzes every client interaction, identifying patterns in successful engagements and areas for enhancement. It might notice, for example, that clients respond particularly well to advice that includes historical market analogies, prompting the system to incorporate more such examples in future interactions. This module continuously updates both the SLMs and the Knowledge Base, ensuring the system evolves with changing financial landscapes and client needs.

The User Interface 2716 serves as the client's window into this complex system. It is designed for intuitive interaction, possibly featuring voice recognition for spoken queries, interactive charts for visualizing financial projections, and seamless transitions between text, voice, and visual communication modes to suit client preferences. The interface can dynamically switch between different expert avatars as the conversation spans multiple areas of financial expertise.

External connections additionally play a vital role in keeping the system current and compliant. Various Data Sources continuously feed into the Knowledge Base, ensuring it remains up-to-date with the latest financial information, from breaking news about market-moving events to subtle shifts in industry trends. The Human Advisor Interface 2719 allows for seamless collaboration between the AI system and human financial experts. This interface might include features for real-time advice auditing, collaborative client session handling, and a feedback mechanism for human advisors to contribute to the system's learning and ensure alignment with the firm's specific approach.

Figure 28:
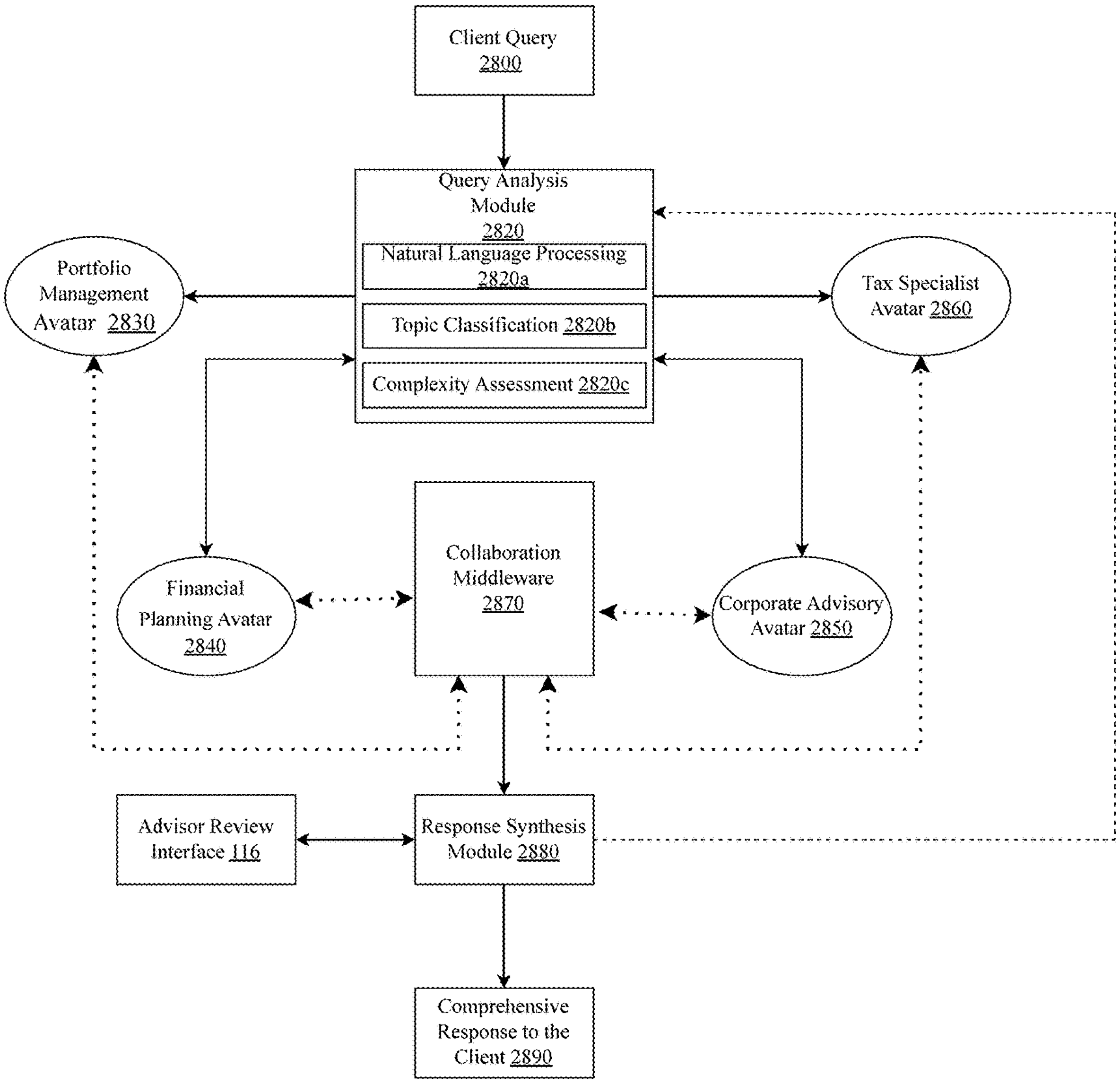
FIG. 28 illustrates the multi-avatar collaboration process for handling complex financial queries within the digital advisor system.

FIG. 28 illustrates the multi-avatar collaboration process for handling complex financial queries within the digital advisor system. The Client Query 2800 initiates the process. For instance, the query might be, "How can I minimize taxes on my inheritance while maximizing my retirement savings and providing for my children's education?" This complex question touches on multiple financial domains, necessitating a collaborative approach that mimics a team of specialized human financial advisors. The query is routed to the Query Analysis Module 2820. The Query Analysis Module 2820 employs natural language processing 2820*a* and topic classification 2820*b* algorithms, and will be assessed based on the Complexity of the Assessment 2820*c* on whether the AI can adequately handle the query, or whether it requires human financial advisor intervention. This module breaks down the query, identifying key financial concepts and intentions. It recognizes the interconnected themes of tax, inheritance management, retirement planning, and educational funding. The module quantifies the relevant of each theme, perhaps assigning weightings: 30% tax implications, 25% retirement planning, 25% business planning, and 20% investment strategy. Based on this analysis, the system activates a team of Specialized Avatars, each with its own identity, appearance, and expertise. These avatars are not mere digital entities but are designed to embody distinct personalities and advisory styles, enhancing the client's experience with a sense of receiving counsel from a diverse team of experts. Jeff, the Tax Specialist Avatar 2860, is visualized as a meticulous, bespectacled figure, exuding an air of precision and a deep knowledge of tax codes. Dave, the Portfolio Management 2830, appears as a dynamic, forward-thinking advisor, his demeanor reflecting confidence in navigating market trends. Jay, the Financial Planning 2840, is portrayed with a reassuring presence, symbolizing long-term security and well-thought-out futures. Tim, the Corporate Advisory Avatar 2850, is represented as a sharp, analytical figure, adept at handling complex business scenarios and strategic financial planning.

Each avatar seamlessly accesses its specialized knowledge base, drawing upon vast repositories of domain-specific information. For instance, the Tax Specialist Avatar 2860 might tap into the latest tax legislation updates and historical data on tax-efficient inheritance strategies. Investment Strategy Avatar 2830 could access real-time market data and long-term investment performance metrics. The Retirement Planning Avatar 2840 might refer to actuarial tables and retirement fund performance histories, while the Corporate Advisor Avatar 2850 consults databases on business valuations, merger and acquisition trends, corporate finance models, and strategic planning frameworks.

The Collaboration Middleware 2870 serves as the neural network of this avatar, facilitating intricate communication and data exchange between the specialized avatars. This middleware enables a dynamic, real-time dialogue among avatars, mimicking a roundtable discussion of human experts. For example, the Tax Specialist Avatar 2860 might initiate the collaboration by suggesting, "Consider splitting the inheritance between a Roth IRA conversion and a 529 college savings plan to optimize tax efficiency. The Portfolio Management Avatar 2830 then could interact with market insights proposing specific investment allocations within these vehicles to balance growth potential and risk. The Financial Planning Avatar 2840 might build upon these ideas, adding "this approach could significantly boost your retirement savings while providing tax-advantaged education funding. Based on your current age and retirement goals, we should aim for a 70/30 split between retirement and education funding. The Corporate Advisory Avatar 2850 might then weigh in on potential business opportunities, suggesting, "Given your financial goals and risk profile, we should explore allocating a portion of your inheritance to strategic business investments or startup opportunities that align with your expertise, potentially yielding higher returns while diversifying your portfolio." facilitates communication between these specialized avatars.

All these expert inputs converge in the Response Synthesis Module 2880, an AI engine that compiles and harmonizes the specialized advice in a comprehensive answer. The final response 2890, exemplifies the power of this collaborative AI system: "We recommend diversifying your inheritance to optimize tax efficiency and meet multiple goals. Consider converting approximately 35% to a Roth IRA to boost retirement savings tax-free, allocating 25% to 529 plans for education expenses, investing 20% in a balanced portfolio for long-term growth, and exploring strategic business investment options for the remaining 20% to potentially accelerate wealth accumulation, while also opening avenues for potential high-growth investments. This strategy balances immediate tax minimization with long-term financial security for you and your children. Specifically, the Roth conversion will provide tax-free growth for retirement, the 529 plans offer tax advantages for education funding, and the business investments can provide both diversification and opportunities for substantial returns, albeit with higher risk."

Following the generation of this comprehensive response, the system routes the interaction through the Advisor Review Interface 116. This allows a human advisor to review the AI-generated advice, ensuring it aligns with the firm's standards and practices. The human advisor can provide feedback, make adjustments if necessary, and approve the response before it is delivered to the client. This human-in-the-loop approach maintains the high quality of advice while leveraging the efficiency and scalability of the AI system.

Figure 29:
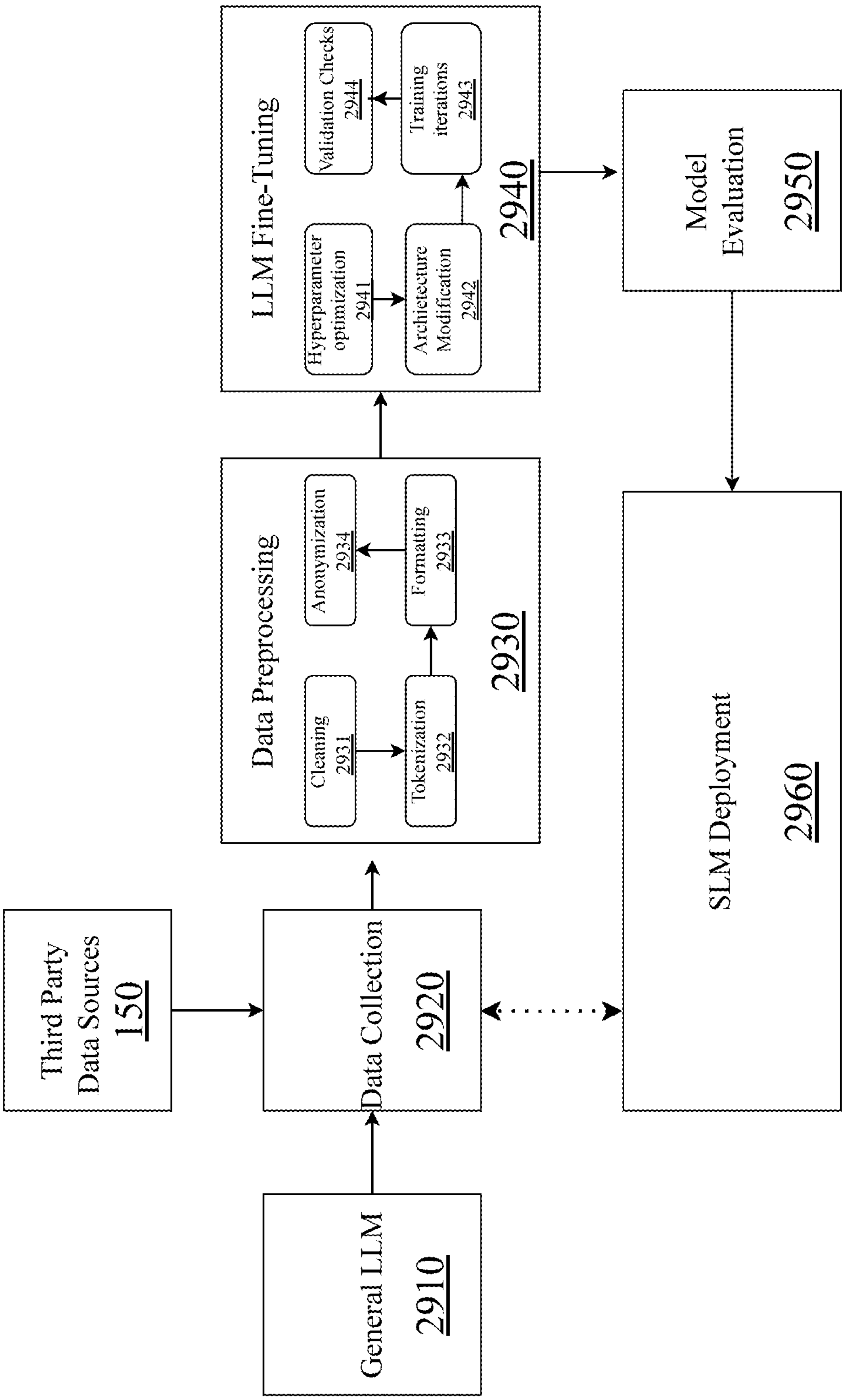
FIG. 29 is a block diagram illustrating an overview of the Specialized Language Model (SLM) training process for a digital advisor, according to an embodiment.

FIG. 29 is a block diagram illustrating an overview of the Specialized Language Model (SLM) training process for a digital advisor, according to an embodiment. The diagram is structured as a linear flow from left to right, showing the progression from a General LLM 2910, which serves as the foundation for multiple SLMs 114*a-d*. This LLM is typically pre-trained on a vast corpus of text data, allowing it to understand and generate human-like text across a wide range of topics. It has broad knowledge but lacks specific expertise in financial advising. The Data Collection phase 2920 involves gathering diverse, relevant data from multiple third party sources 150 such as the advisor's writings, social media posts, recorded presentations, historical client interactions, and domain-specific financial data. Following the data collection, the process then proceeds to Data Preprocessing 2930.

The data preprocessing stage 2930 involves several crucial steps 2931-2934: data cleaning 2931, tokenization 2932, formatting 2933, and anonymization 2934 of client data. Data cleaning 2931 is where irrelevant information is removed, errors are corrected, and missing data is handled. This is followed by Tokenization 2932, which breaks the cleaned text into smaller units as words or subwords. The tokenized data is then Formatted 2933 into a structure suitable for machine learning models, which may include numerical encoding and sequence padding. For sensitive information, an Anonymization 2934 step is performed to protect privacy and ensure compliance with data protection regulations. The result is a refined, standardized dataset optimized for subsequent fine-tuning of each SLM.

The next significant phase is LLM Fine-Tuning 2940. The LLM fine-tuning process transforms the general-purpose LLM 2910 into the multiple SLMs, each tailored for a specific area of financial advising. This stage encompasses hyperparameter optimization 2941 which adjusts model parameters like learning rate and batch size for each SLM. The architecture modifications 2942 may potentially add or alter layers to suit financial tasks, such as portfolio optimization or tax planning. The iterative training 2943 on a domain-specific, and regular validation checks to prevent overfitting. The system also comprises adaptive learning techniques, training on specific financial advising tasks, and the injection of domain-specific knowledge from the Knowledge base. This process involves multiple training iterations, with the model's weights continually updated to minimize loss and improve performance on specific financial advising tasks. Throughout fine-tuning, the model's performance is regularly evaluated on a validation checks 2944, ensuring it generalizes well to unseen data. The ultimate goal is to create multiple SLMs that not only comprehends financial language nuances but can also provide accurate, relevant, and personalized financial advice in their respective domains.

The Model Evaluation 2950 stage determines if each fine-tuned SLM meets predefined performance standards. These standards might include accuracy metrics, response relevance, and alignment with financial regulations specific to each domain of expertise. If the model meets these criteria, then it will move to the SLM deployment 2960 stage. Here, the models are integrated into the digital advisor system's infrastructure, making it operational for real-world use. This may involve packaging the model for efficient inference, setting up API endpoints, and implementing necessary security measures.

The continuous learning loop is a key feature of this system. As the deployed SLMs interacts with users, it generates new data-questions asked, advice given, and user feedback. This new data is continuously fed back into the Data Collection phase 2920. This feedback loop 2971 allows the system to adapt to changing financial landscapes, learn from new interactions, and improve its performance over time across all areas of expertise. The collected data may be used to retrain the model periodically, fine-tune specific aspects, or identify areas where human oversight is needed. This ensures that the digital advisor remains up-to-date, continually enhancing its ability to provide accurate and relevant financial advice across all domains. Additionally, the feedback loop includes input from the Advisor Review Interface, allowing human advisors' insights and corrections to be incorporated into the ongoing training process, ensuring the SLMs align with the firm's standards and practices.

Figure 30:
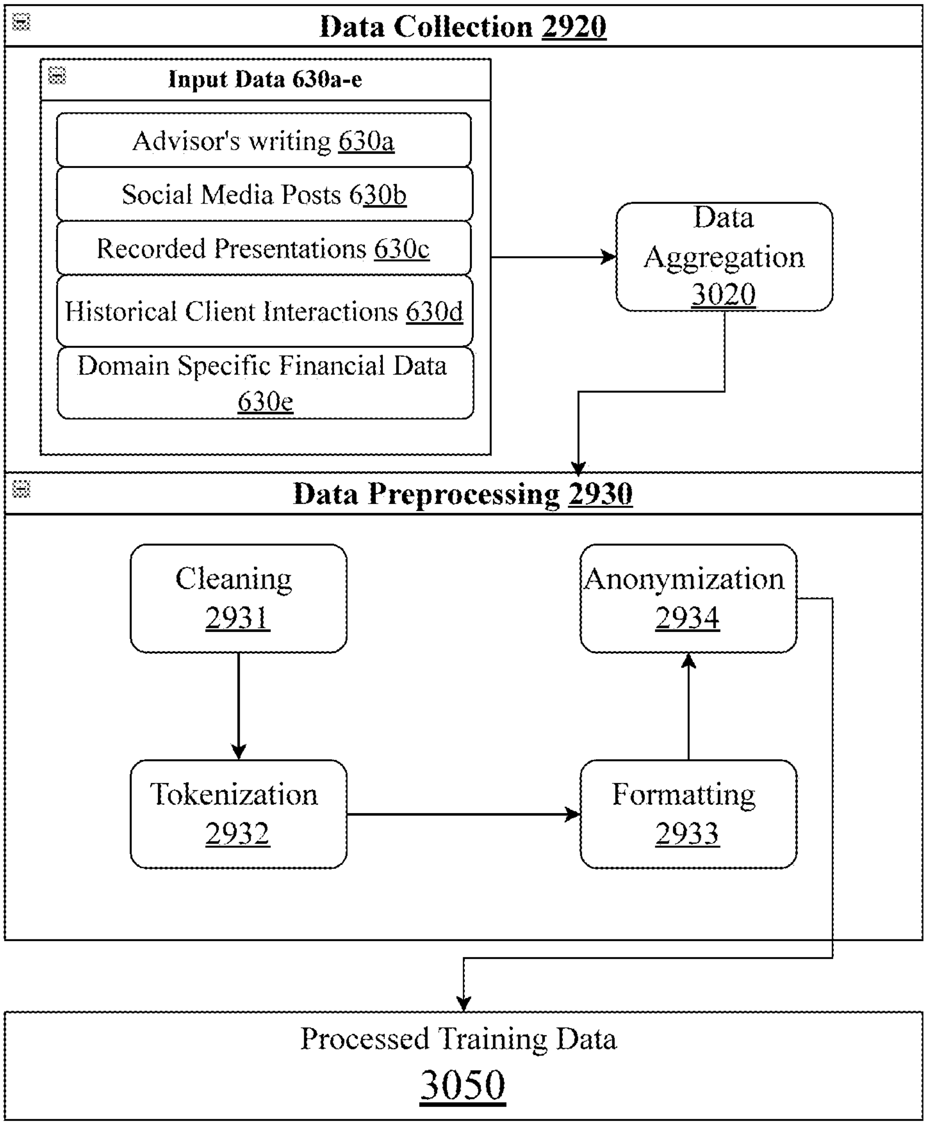
FIG. 30 illustrates the data collection and preprocessing state for SLM training, according to an embodiment.

FIG. 30 illustrates the data collection and preprocessing state for SLM training, according to an embodiment. The Diagram is divided into two main sections: Data Collection and Data Preprocessing. The Data Collection 2920 section showcases various sources of input data 3030*a-e*: Advisor's writings 3030*a*, which includes published articles, reports, and other written content produced by the human financial advisor; Social Media Posts 3030*b* encompassing the advisor's professional social media activity, providing insights into their communication style and topical interests; Recorded presentations 3030*c* which are video or audio recordings of the advisor's speeches, webinars, or client presentations; Historical interactions 3030*d* which are anonymized records of past client consultations, emails, and meeting notes; and domain-specific financial 3030*e* data, which includes market data, economic indicators, and financial regulations. The data is aggregated 3020 in the data collection step ensuring that all data types (textual, numerical, and multimedia) are currently integrated for preprocessing.

The Data Preprocessing 2940 encompasses the data cleaning step 2931 which is the initial step for removing irrelevant information, correcting errors, and handling missing data. The cleaning step includes eliminating duplicate entries, correcting spelling mistakes, and standardizing formats. Then the tokenization step 2932 allows for the cleaned text to be broken down into smaller units called tokens, typically individual words or subwords. The tokenized data is then Formatted 2933 into a structure suitable for machine learning models, which may include numerical encoding and sequence padding. For sensitive information, an Anonymization 2934 step is performed to protect privacy and ensure compliance with data protection regulations. At the end of the preprocessing stage, the output Processed Training Data 3050 is ready for use in subsequent fine-tuning of each SLM.

Figure 31:
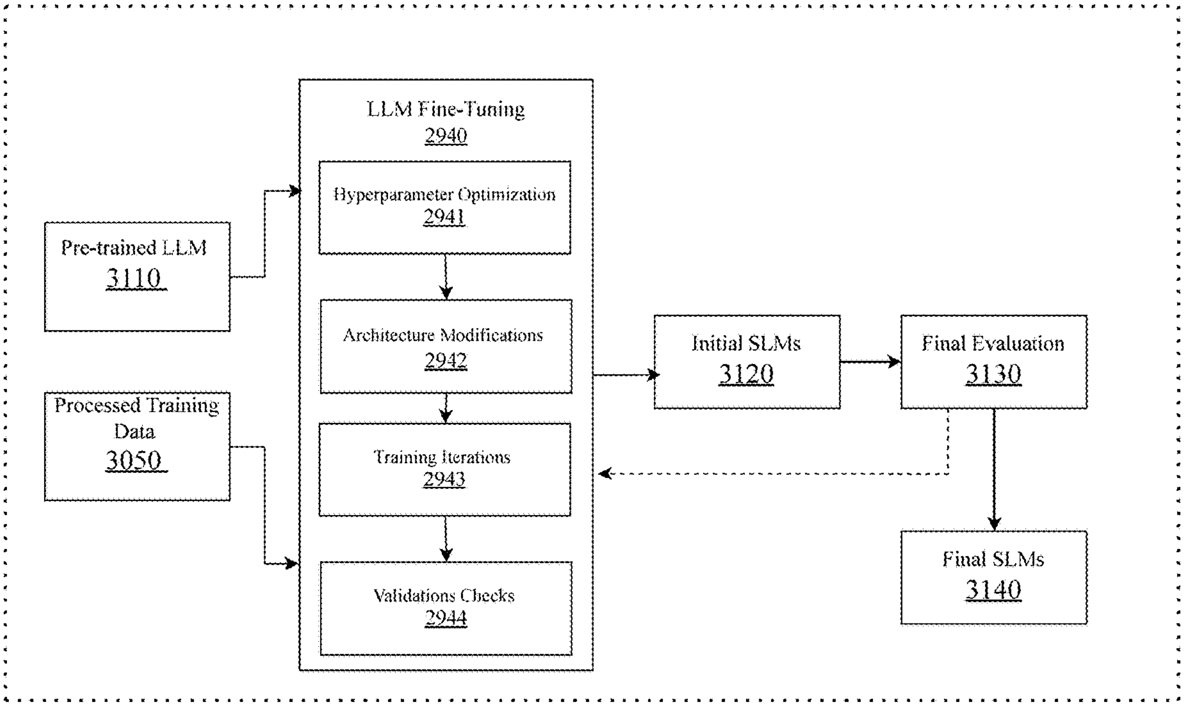
FIG. 31 illustrates the LLM fine-tuning process for creating a digital advisor SLM, according to an embodiment.

FIG. 31 illustrates the LLM fine-tuning process for creating a digital advisor SLM, according to an embodiment. The diagram depicts the transformation of a general-purpose LLM into four distinct SLM, each precisely tailored for a specific area of financial advising. The process begins with two primary inputs: the Pre-trained LLM 3110, represented as a large neural network structure symbolizing its complex architecture and broad knowledge base (e.g., a GPT-3 model or BERT) that has been trained on a vast corpus of general text data, and the Processed Training Data 3050, which is a diverse set of financial documents, including market reports, regulatory filings, academic papers on finance, and transcripts of expert financial advice. These inputs feed into the central Domain Specific Fine-Tuning process 2940. The fine-tuning process employs a two-stage approach for each SLM. In the first stage, adaptive learning rate methods, specifically the Adam optimizer with a learning rate ranging from 1e−5 to 5e−5, and a batch size of 64 are used. The gradient accumulation is implemented to simulate larger batch sizes on limited hardware. The second stage involves further fine-tuning a Ranger optimizer (a combination of Rectified Adam and LookAhead) with a cyclical learning rate between 1e−6 and 1e−4. We add domain-specific attention layers with 768 hidden units after the final layer of the base model for each SLM. These layers use a multi-head attention mechanism with 12 heads, each attending to different aspects of domain-specific financial knowledge. The specific architecture and hyperparameters may be fine-tuned differently for each SLM to best suit its particular area of expertise. The Domain Specific Fine-Tuning process 2940 is represented as a large central component with several subprocesses which include: hyperparameter optimization 2941, architecture modifications 2942, training iterations 2943, and validation checks 2944. The Hyperparameter Optimization 2941 subprocess represents crucial hyperparameters such as learning rate (e.g., adjusting from 1e−4 to 5e−5), batch size (increasing from 32 to 64 for more stable gradients), number of epochs (iterating through 10 to 15 full passes of the data), and dropout rate (fine-tuning from 0.1 to 0.2 for improved generalization). These hyperparameters are optimized separately for each SLM to best suit its specific domain.

The Architecture Modification 2942 process involves the addition of finance-specific layers. For example, the Portfolio Management SLM might include a custom layer focusing on numerical data in financial statements and market trends, while the Tax Strategy SLM could have layers dedicated to processing tax code information. This process also includes modification of existing layers (like expanding the vocabulary to include domain-specific financial jargon), and potential pruning of irrelevant connections (removing nodes that activate for unrelated topics).

Training iterations 2943 shows multiple rounds of training on the domain-specific data. For instance, the Portfolio Management SLM might be fed batches of historical market data and investment strategies, while the Financial Planning SLM could train on retirement planning scenarios and estate management cases. Each iteration updates the model's weights to improve performance on its specific financial advising tasks.

The validation checks 2944 evaluates the model's performance on a held-out validation set to monitor for overfitting and ensure generalization within its specific domain. The fine-tuning process is iterative, with feedback loops showing how the results of validation checks inform further hyperparameter optimization and training iterations.

The initial SLMs 3120, emerge as a more focused, finance-tinted version of the original LLM, each capable of discussing complex financial instruments and scenarios within their specific domains. They undergo a final evaluation 3130 represented by a decision point which may test their ability to generate comprehensive advice in their respective areas. Two paths lead from this evaluation: a success path proceeding to the Final SLMs 3140 if it meets standards like consistently outperforming human advisors on domain-specific financial knowledge tests, and a Refinement Path looping back for further improvements if it struggles with nuanced tasks within their domains. The entire process is enclosed in a "Continuous Learning Environment" frame, emphasizing ongoing adaptation based on new financial data (like daily market reports), user interactions (learning from client feedback on advice clarity), and feedback from the Advisor Review Interface. This ensures that each SLM remains current with the latest developments in its specific area of financial expertise and aligned with the firm's advisory practices.

Figure 32:
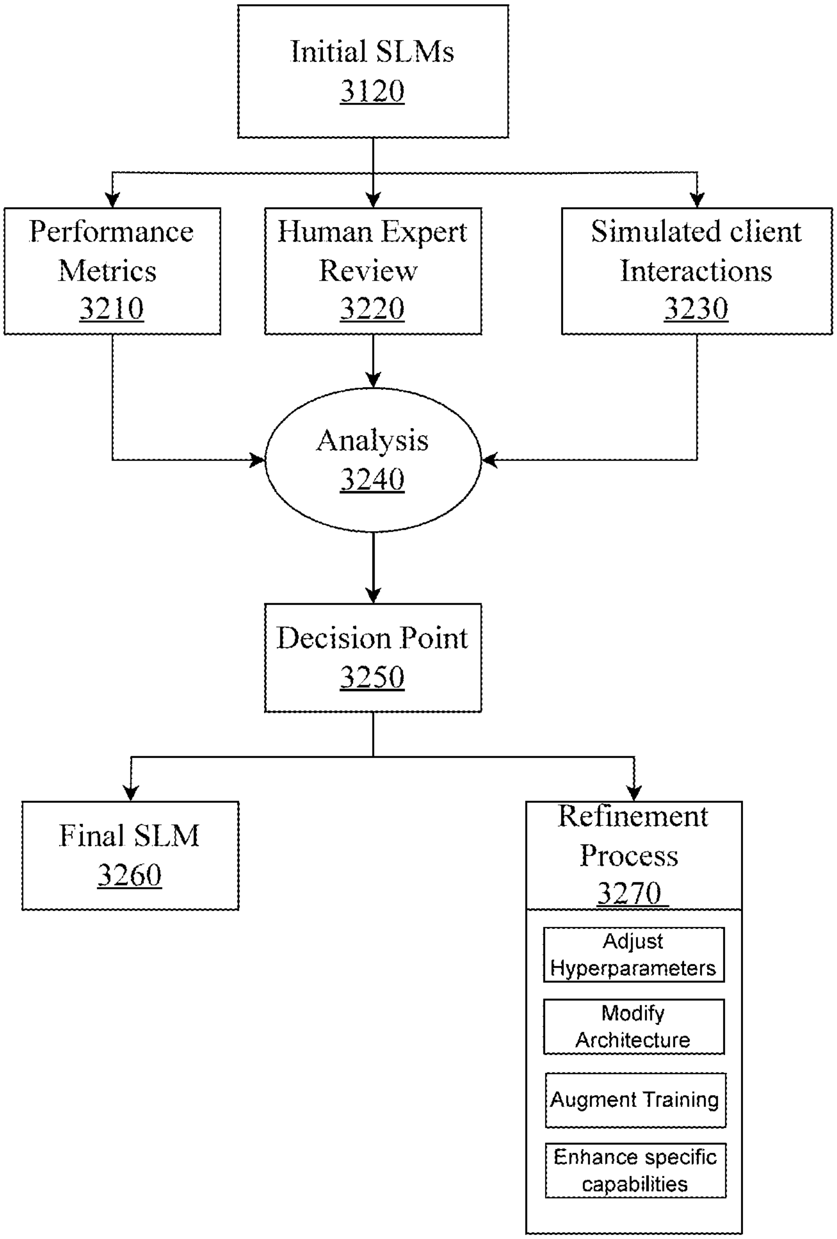
FIG. 32 illustrates the comprehensive evaluation and iteration process for refining the digital advisor SLM, according to an embodiment.

FIG. 32 illustrates the comprehensive evaluation and iteration process for refining the multiple specialized digital advisor SLMs, according to an embodiment. This intricate process delineates the crucial steps taken to ensure that each SLM's performance meets the exacting standards required for deployment in real-world financial advising scenarios. The process begins with the Initial SLMs 3120, fresh from the fine-tuning process as described in FIG. 31. Each Initial SLM branches into three main evaluation paths, each designed to scrutinize the model's capabilities from different perspectives within its specific domain. The Performance Metrics 3210 illustrates quantitative assessments of the model's performance, it presents a series of charts and numerical displays. For instance, the Portfolio Management SLM might show an accuracy score of 97% for investment recommendations, while the Tax Strategy SLM could display a precision of 95% in identifying tax-saving opportunities. The Financial Planning SLM might demonstrate a recall of 98% for retirement planning strategies, and the Corporate Advisory SLM could show an F1 score of 96% for merger and acquisition advice quality. These metrics are visualized through interactive graphs, allowing evaluators to drill down into specific areas of performance, such as how the model fares with different client risk profiles or various market conditions within its domain.

The Human Expert Review path 3220 shows panels of seasoned financial advisors, each corresponding to the specific expertise of an SLM. This section depicts these experts engaging with their respective SLM through a specialized interface, posing complex scenarios relevant for each domain. For example, tax experts might ask the Tax Strategy SLM, "How should a multinational corporation optimize its tax structure given recent changes in international tax laws?" The experts then rate each SLM's responses on factors like accuracy clarity and practical applicability, providing detailed feedback and suggestions for improvement. This process ensures that each SLM aligns with the firm's specific approach and expertise in its respective domain.

The Simulation Client Interactions 3230 branch represents a virtual environment where the SLM engages with diverse, AI-generated client profiles relevant to its domain. For instance, the Portfolio Management SLM might interact with profiles ranging from risk-averse retirees to aggressive young investors, while the Corporate Advisory SLM could engage with scenarios involving startups, mature corporations, and companies considering mergers or acquisitions. The simulation runs thousands of interactions, assessing each SLM's ability to provide personalized, context-appropriate advice across a spectrum of financial situations within its specific area of expertise.

The results from these three rigorous evaluation methods converge at the central Analysis point 3240, which is a data processing hub. The Analysis point aggregates and synthesizes the diverse inputs for each SLM, employing advanced analytics to generate a holistic assessment of each model's performance. It might use machine learning algorithms to identify patterns in the model's strengths and weaknesses, correlating expert feedback with quantitative metrics and simulation outcomes.

Following this comprehensive analysis, the process reaches a critical decision point 3250, for each SLM, branching into two possible outcomes: "Meets Standards" or "Needs Improvement". If an SLM's performance is deemed satisfactory, perhaps exceeding human expert performance in 80% of test cases within its domain and achieving a high client satisfaction score in simulations, it proceeds along the "Meets Standards" path to the Final SLMs 3260 stage. This indicates the model is ready for real-world deployment within its specific area of expertise. However, if the evaluation identifies areas for enhancement in any SLM, such as a weakness in explaining complex financial strategies or inconsistency in adapting to rapid market changes within its domain, the process follows the "Needs Improvement" path. This triggers a detailed feedback loop leading back to the LLM Fine-Tuning Refinement 3270 process for that specific SLM. This feedback loop is a targeted refinement journey, which might involve adjusting hyperparameters, modifying the model architecture, augmenting the training data, or enhancing specific capabilities relevant to the SLM's domain.

The entire process is enveloped in a framework of continuous learning, where even after deployment, each SLM continues to evolve. Real-world interactions and outcomes feed back into the evaluation process, ensuring each model remains at the cutting edge of financial advising capabilities, adaptive to new financial products, changing regulations, and evolving client needs. This exhaustive evaluation and refinement cycle ensures that the final set of SLMs forms a dynamic, ever-improving system capable of providing expert-level financial guidance across all areas of expertise, tailored to individual client needs in an ever-changing financial landscape.

Figure 33:
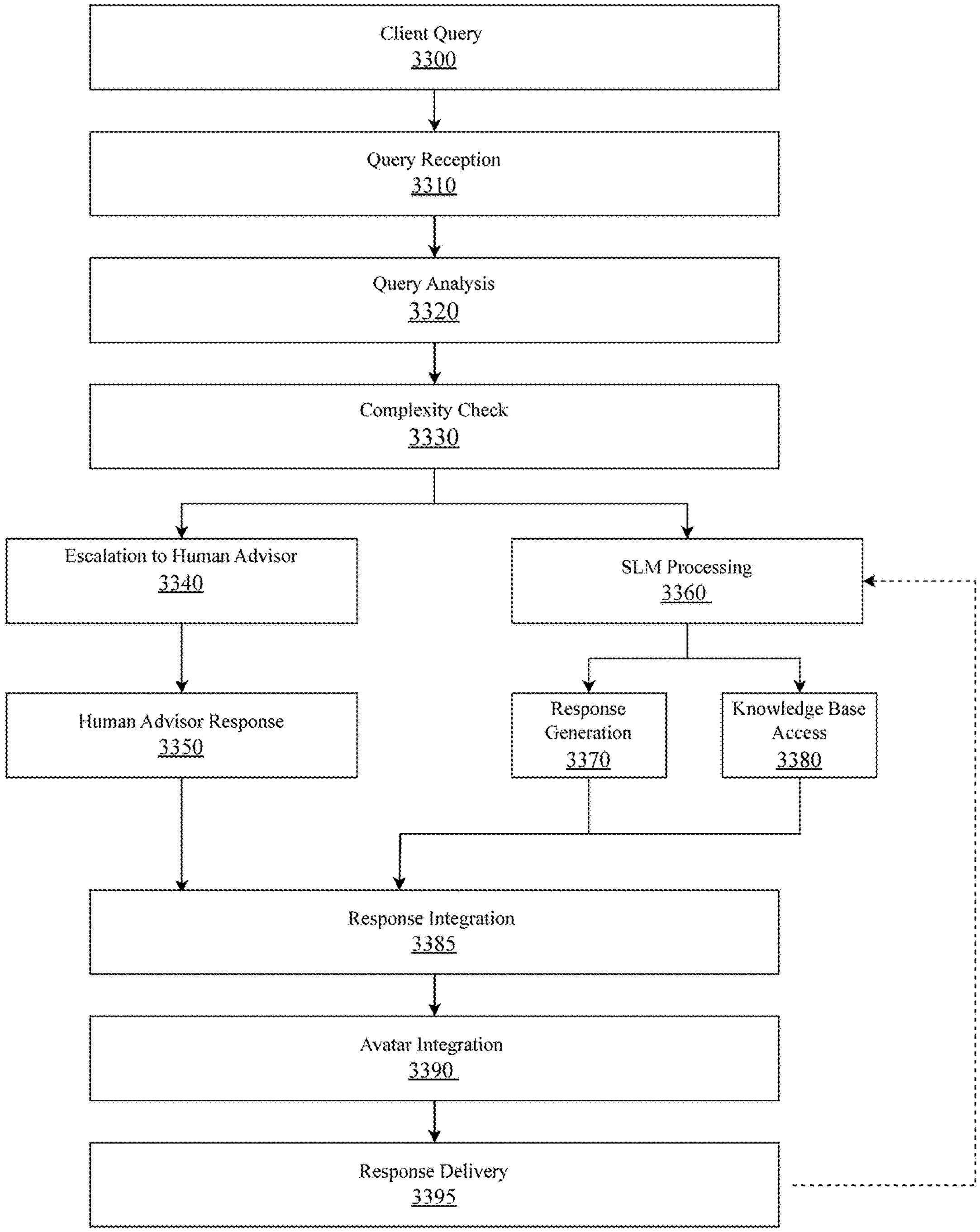
FIG. 33 illustrates the process of handling a client query using the digital advisor system.

FIG. 33 illustrates the process of handling a client query using the digital advisor system. The process begins with the client query 3300. For example, a client might ask, "How should I allocate my 401(k) contributions?" A Query Reception 3310 shows the system receiving the query through the user interface. This could be via text input or voice recognition. The Query Analysis 3320 represents the system determining the nature and complexity of the query. For the 401(k) question, the system would identify this as a multi-faceted query involving retirement planning, tax strategy, and potentially portfolio management. A Complexity check 3330 shows this system evaluating if the query is within its AI capability and which specialized SLMs are required to address it. In this case, the system determines that the query can be handled by a collaboration of the Financial Planning SLM, Tax Strategy SLM, and Portfolio Management SLM. If it is within AI Capability: the system activates the relevant SLMs for query processing 3360. In this case, the Financial Planning SLM takes the lead, with input from the Tax Strategy and Portfolio Management SLMs. The knowledge base access 3380 represents the system retrieving relevant information about 401(k) plans, contribution limits, tax implications, and investment options from its knowledge base. Response Generation 3370 shows the collaboration of the activated SLMs in formulating a response. The Financial Planning SLM might suggest overall allocation strategies, the Tax Strategy SLM could advise on tax-efficient contribution methods, and the Portfolio Management SLM might recommend specific fund allocations based on the client's age and risk tolerance. If the query exceeds AI capability, such as a complex estate planning question involving multiple international jurisdictions, it will be escalated to a Human Advisor 3340. The human advisor will then formulate a response 3350 which will then be fed back into the system. The Response Integration 3385 shows where responses from both AI and human sources are formatted consistently, ensuring a seamless experience for the client regardless of the source of advice. The system will then prepare the response for delivery via the digital avatar 3390. In this case, it might use the Financial Planning avatar as the primary responder, with supporting information presented by the Tax Strategy SLM avatar and Portfolio Management SLM avatar. This includes generating appropriate facial expressions and tone of voice for each avatar. Finally, the system delivers the response to the client 3395. For example, "Based on your age and risk tolerance. I recommend allocating 70% to stock funds and 30% to bond funds in your 401(k). Additionally, considering your tax bracket, I suggest maximizing your contributions to the annual limit of $19, 500. This strategy balances growth potential with tax efficiency, aligning with your retirement goals." The system then records this interaction for continuous learning and improvement of all involved SLMs.

Figure 34:
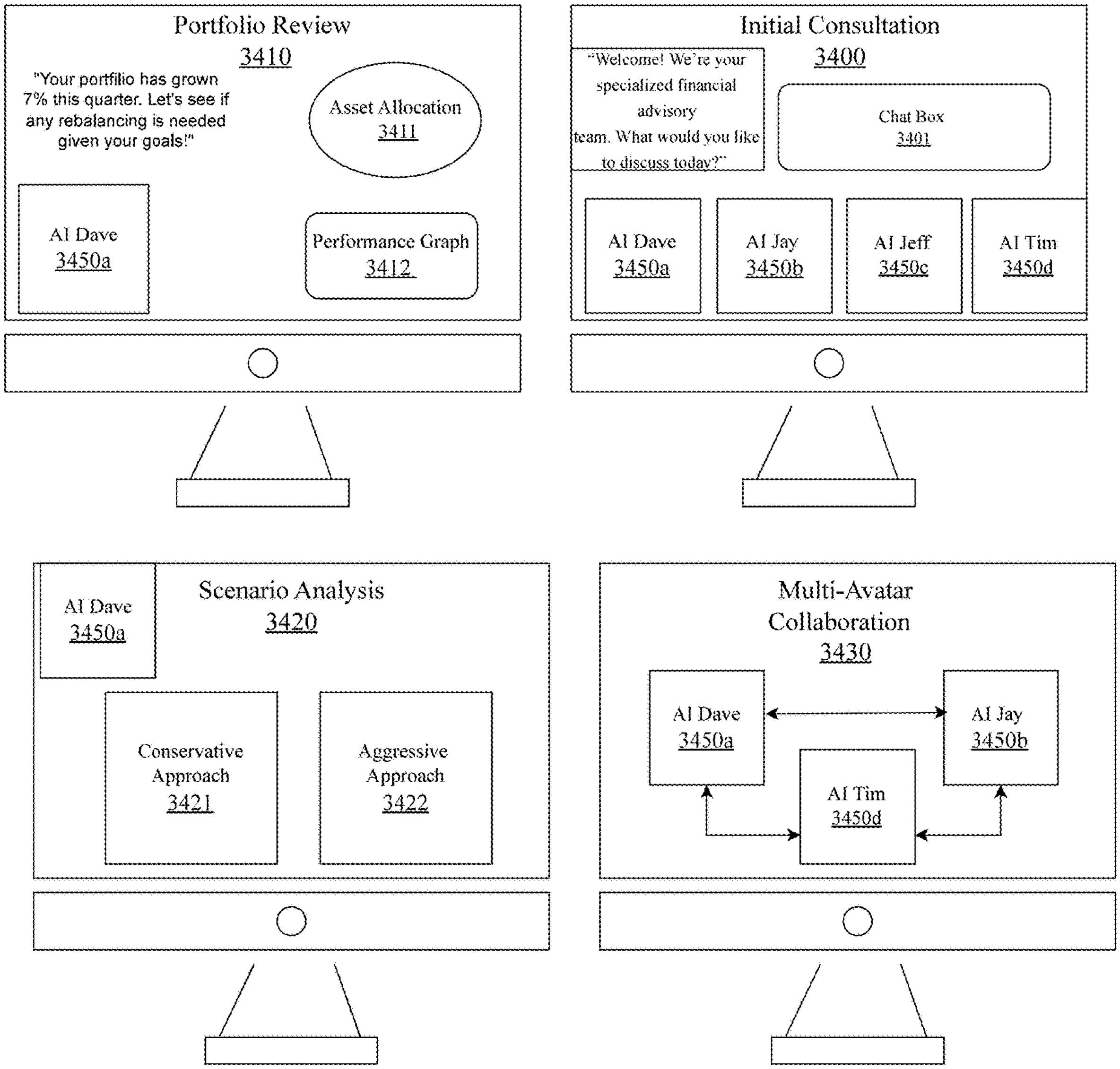
FIG. 34 illustrates the user interface of the digital advisor system, how clients interact with the AI-powered financial advisor.

FIG. 34 illustrates the user interface of the digital advisor system, showcasing how clients interact with the AI-powered financial advisory team. The interface is divided into multiple panels, each demonstrating a different aspect of the digital advisor's capabilities. First the user will obtain an Initial Consultation 3400. This panel showcases a first point of contact between the client and the digital advisory team. Multiple digital avatars 3450*a-d* are displayed, each representing a specialized area of financial expertise: AI Dave 3450*a* (Portfolio Management), AI Jay 3450*b* (Financial Planning), AI Jeff 3450*c* (Tax Strategy), and AI Tim 3450*d* (Corporate Advisory). These avatars resemble professionals in business attire, maintaining eye contact with the user to create a sense of personal connection. A large chat box 3401 dominates the center, displaying the greeting: "Welcome! We're your specialized financial advisory team. What would you like to discuss today?" This layout allows for an intuitive start to the advisory process, guiding the client towards specific areas of financial planning. Based on the client's selection, the relevant specialized avatar(s) will take the lead in the conversation.

The Portfolio Review Panel 3410 illustrates the client's financial data. An asset allocation 1011 can comprise of a pie chart showing the client's current asset allocation, for example, it could show the client has 40% in stock, 30% in bonds, 20% in real estate, and 10% cash. Below this, there could be a performance graph 3412 tracking the portfolio's performance over the past 12 months. A speech bubble from AI Dave, the Portfolio Management avatar states "Your portfolio has grown 7% this quarter. Let's see if any rebalancing is needed given your goals."

The Scenario Analysis panel 3420 provides a split-screen view for comparing investment strategies. A conservative approach 3421 can show a steady, modest growth. On the right, a more aggressive strategy 3422 with higher potential returns but increased volatility. AI Dave 3450*a* explains: "Here's how your portfolio might perform under different strategies. Let's explore which aligns best with your risk tolerance."

The Multi-Avatar Collaboration 3430 allows for the specialized avatars to work together on complex queries. For example, if a client asks about tax-efficient retirement planning strategies for small business owners, the panel shows Jay 3450*b*, Dave 3450*a*, and Tim 3450*d* collaborating. Speech bubbles from each avatar provide insights from their respective areas of expertise, creating a comprehensive response.

The Dashboard feature which is accessible via a tab in the navigation bar, serves as the client's financial command center, providing a holistic view of their financial situation. The Connect with Human Advisor feature allows seamless escalation to human expertise when needed, offering options for immediate chat, video call scheduling, or in person meetings. It may provide a brief form to describe the reason for connecting, helping the human advisor prepare and show available time slots for scheduling a consultation. The support feature is typically accessible via the quick-access menu to provide FAQs and troubleshooting guidelines, chat support for technical issues, system status updates, and privacy and security information.

The interface dynamically adjusts based on the client's queries, and needs, seamlessly transitioning between different expert avatars as the conversation spans multiple areas of financial expertise. When a query touches on multiple domains, the relevant avatars appear together, providing a collaborative response. This multi-avatar approach provides clients with a sense of receiving comprehensive, expert advice tailored to their specific financial situations and goals, directly from specialized advisors in each relevant field.

The digital advisor system boasts a highly adaptive user interface (UI) that seamlessly adjusts to various devices and user preferences, ensuring an optimal experience across different platforms. At its core, the UI employs a responsive design architecture that dynamically reconfigures layout elements based on the device's screen size and orientation. For desktop users, the interface leverages the expanded screen real estate to present comprehensive financial dashboards, intricate data visualizations, and side-by-side comparisons of investment strategies. When accessed on tablets, the UI intelligently reorganizes these elements, prioritizing the most critical information while maintaining easy access to detailed views through intuitive gestures like pinch-to-zoom or swipe navigation. On smartphones, the interface further condenses its presentation, focusing on key financial metrics and actionable insights, with an emphasis on vertical scrolling and collapsible sections to manage complex information hierarchies.

Beyond mere responsiveness, the system incorporates adaptive rendering techniques that optimize the UI components based on the device's processing capabilities and network conditions. For instance, on high-performance desktops, the system may render complex, interactive 3D visualizations of portfolio performance. In contrast, on mobile devices or in low-bandwidth scenarios, it automatically switches to simplified 2D charts that convey the same information without compromising load times or performance. The UI also adapts to different input modalities, seamlessly transitioning between mouse-based interactions on desktops, touch-based gestures on mobile devices, and even voice commands for hands-free operation, enhancing accessibility across various use cases.

User preferences play a crucial role in shaping the interface's adaptability. The system employs machine learning algorithms to analyze user behavior patterns and automatically adjust the UI to individual preferences over time. For example, if a user frequently accesses retirement planning tools, the system will gradually prioritize these features in the navigation hierarchy. The UI also offers extensive customization options, allowing users to manually configure dashboard layouts, color schemes, and information density according to their personal preferences or specific financial goals. Furthermore, the system supports multiple accessibility modes, including high-contrast themes for visually impaired users, screen reader compatibility, and adjustable font sizes, ensuring that the digital advisor remains accessible to users with diverse needs. The adaptive UI extends to the system's avatar-based interaction model as well. On larger screens, multiple digital advisor avatars can be displayed simultaneously, facilitating visual representation of collaborative discussions between different financial expertise domains. On smaller devices, the system smoothly transitions to a single-avatar view with easy switching between different expert personas. The avatars themselves adapt their visual fidelity based on the device's graphical capabilities, ranging from high-definition, photo-realistic renderings on powerful devices to more stylized, efficient representations on less capable hardware. This avatar adaptability ensures that the personal, human-like interaction aspect of the digital advisor is preserved across all platforms without compromising performance.

Importantly, the UI's adaptability also encompasses data synchronization across devices. Users can seamlessly transition between devices mid-session, with the interface intelligently resuming from their last point of interaction. This is achieved through a robust cloud-based state management system that securely stores user preferences, session data, and interaction history. The adaptive UI also considers contextual factors such as time of day, user location, and ongoing financial events to proactively adjust its presentation and functionality. For instance, during market hours, it might prominently display real-time trading information, while after hours, it could shift focus to long-term planning tools. By implementing this comprehensive approach to UI adaptability, the digital advisor system ensures a consistent, optimized, and personalized user experience across the entire spectrum of devices and user preferences, thereby maximizing engagement and effectiveness in delivering financial advice.

Figure 35:
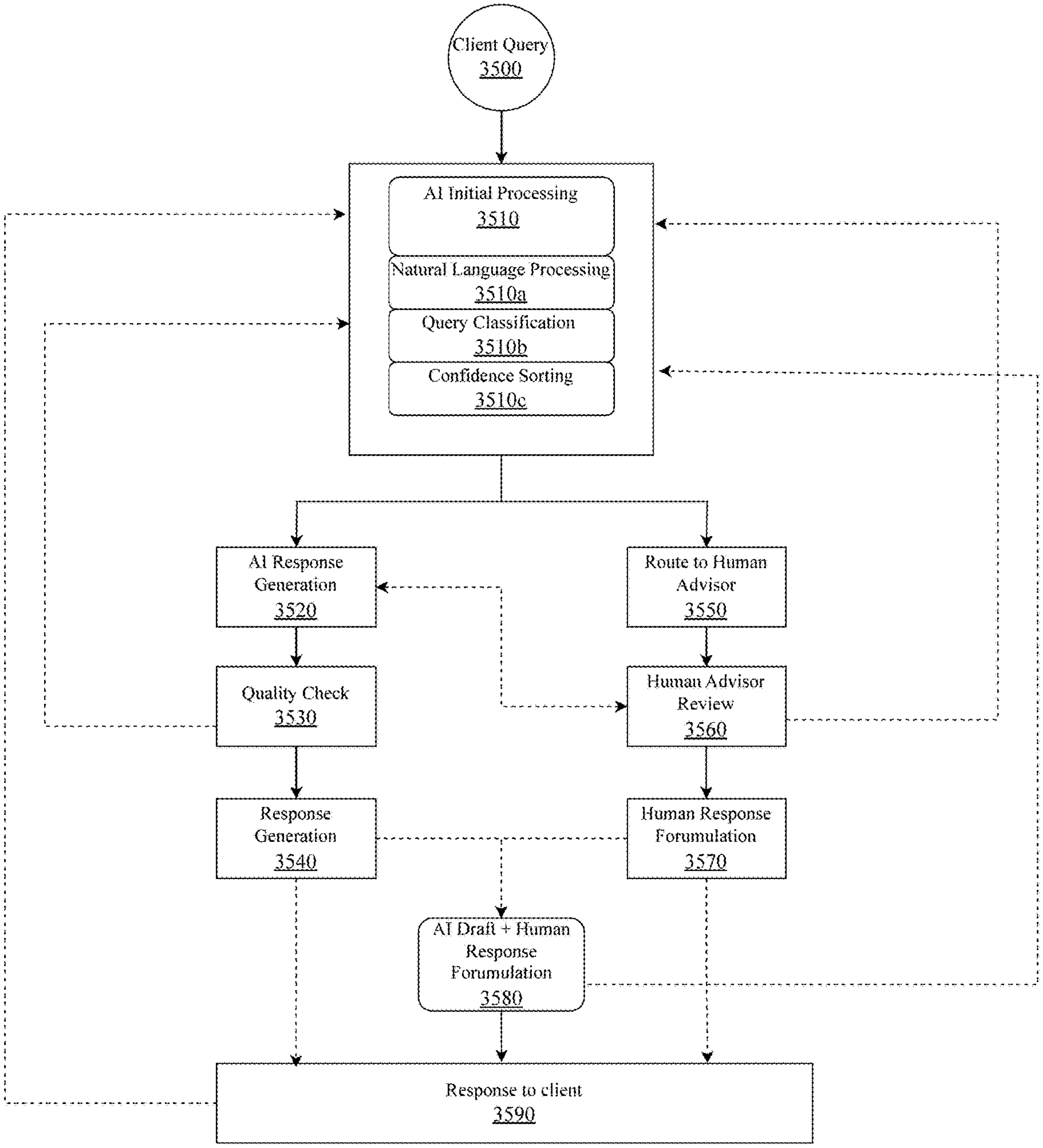
FIG. 35 illustrates the human-in-the-loop advisory process of the digital advisor system, demonstrating how it seamlessly integrates AI capabilities with human expertise.

FIG. 35 illustrates the human-in-the-loop advisory process of the digital advisor system, demonstrating how it seamlessly integrates AI capabilities with human expertise. The process begins with a client query 3500, such as "How should I restructure my portfolio given my recent divorce, considering tax implications and retirement goals?" This query then enters the AI initial processing stage 3510, where natural language processing 3510*a* classifies the query 3510*b* and assigns a confidence score 3510*c*. The system also determines which specialized SLMs (Portfolio Management, Financial Planning, Tax Strategy, and/or Corporate Advisory) are required to address the query. A decision is made whether AI can handle the query independently or if human intervention is needed. For simple queries, like "What is the current interest rate on a 30 year mortgage?", the system follows the "Yes" path to AI Response Generation 3520. Here, the relevant SLM (in this case, likely the Financial Planning SLM) formulates a response. For more complex queries that span multiple areas of expertise, like our example about portfolio restructuring post-divorce, the system activates multiple SLMs. The Portfolio Management, Financial Planning, and Tax Strategy SLMs collaborate to generate a response. This multi-SLM response then undergoes a Quality Check 3530 before response generation 3540. For more highly complex queries or sensitive queries, the system takes the No path to Route to Human Advisor 3550. An example of such a query might be, "How will the new tax legislation affect my international business holdings and my personal estate planning?" In this case, a human advisor reviews 3560 the query, formulates a response 3570, and may collaborate 3580 with the AI system for data analysis or calculations. A third path represents a hybrid approach, where the AI drafts an initial response 3520 which is then reviewed and refined by a human advisor 3560. This occurs for a queries that the AI can handle but that benefit from human oversight. The human advisor can add nuanced advice considering the client's specific situation and ensure the response aligns with the firm's standards and practices. Throughout the process, feedback loops show how each interaction, regardless of the path taken, feeds back into the AI system for continuous learning and improvement. For instance, if a human advisor frequently adds specific considerations to AI-generated advice about post-divorce financial planning, the system learns to include these points in future responses. A Regulatory Compliance Verification is connected to all response paths, ensuring that all advice, whether AI-generated, human-created, or a hybrid, adheres to financial regulations. This might involve checking that investment advice is suitable for the client's risk profile or that tax advice is up-to-date with the latest legislation. Finally, the Deliver Response to Client step 3590 represents the point where the client receives their tailored advice. The system also collects client feedback at this stage, which is then used to further refine and improver the capabilities of each specialized SLM. The human-in-the-loop process ensures that while the AI system handles a wide range of queries efficiently, human expertise is seamlessly integrated when needed, maintaining the high quality of advice and the personal touch that clients expect from their financial advisors.

Figure 36:
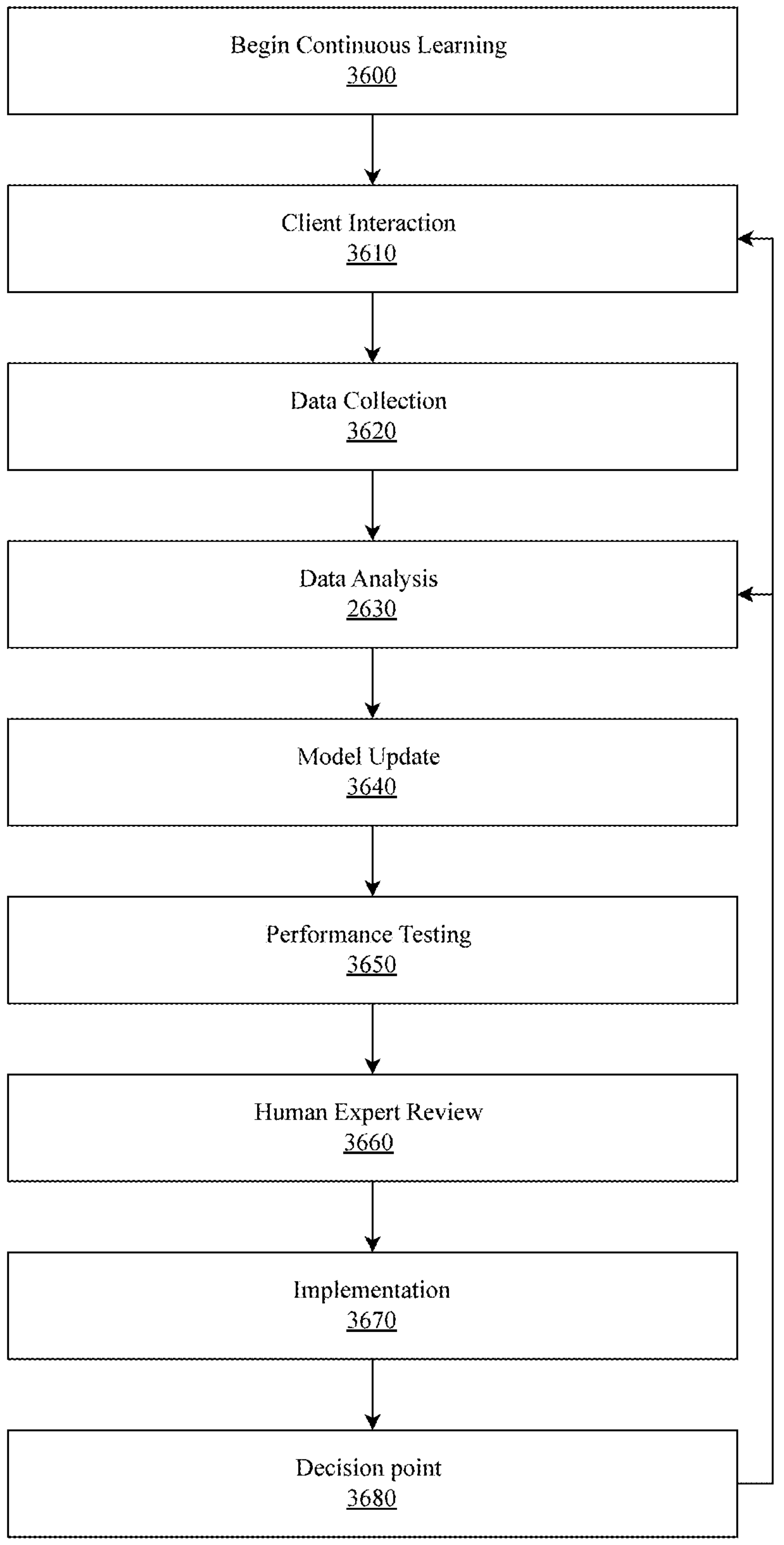
FIG. 36 is a method diagram illustrating the continuous learning method for the digital advisor system.

FIG. 36 is a method diagram illustrating the continuous learning method for the digital advisor system, encompassing multiple SLMs. The process begins with Start Continuous Learning Cycle 3600, emphasizing the ongoing nature of this process across all areas of financial expertise. The first step is Client interaction 3610 where the system engages with the users across various financial domains. For example, a client might ask, "How can I save for retirement given my current salary of $75,000?, while also considering tax implications and potential business investments?" This complex query would involve multiple SLMs: Financial Planning, Tax Strategy, and potentially Corporate Advisory. Following this, the Data Collection 3620 step, logs crucial information from each interaction. It categorizes query types, records the effectiveness of responses from each involved SLM, and gathers direct client feedback. It also notes which SLMs collaborated on complex queries and how effective their joint responses were. The Data Analysis 3630 step analyzes the collected data for each SLM and their collaborations. It might identify trends such as increasing number of queries about early retirement options, or assess that collaborative responses involving both the Financial Planning and Tax Strategy SLMs have been particularly effective for retirement savings queries. Based on this analysis, the Model Update step 3640 fine-tunes each SLM individually and improves their collaborative capabilities. For instance, the Financial Planning SLM might adjust its algorithms to provide more detailed information about catch-up contributions for clients over 50, while the Tax Strategy SLM might enhance its ability to suggest tax-efficient retirement saving strategies. The updated model then undergoes Performance Testing 3650, which is rigorous testing, both individually, and in collaboration. This could involve running simulations with a hypothetical scenarios that span multiple areas of expertise, comparing the new responses against benchmarks or previous performance. A critical Human Expert Review 3660 step follows. Here, financial advisors specializing in different areas evaluate the model changes. They might note that while the system's knowledge of retirement accounts has improved, it needs to further emphasize the importance of diversification in the context of the firm's specific investment philosophy. They could also assess how well the SLMs are collaborating on complex queries. The implementation 3670 step, involves deploying the updated models. For example, the system might now respond to retirement queries with more nuanced advice, seamlessly integrating insights from multiple SLMs. It could balance 401(k) contributions with Roth IRA investments for tax diversification while also considering how this fits into the client's overall business strategy. The process then reaches the decision point 3680 asking, "Improvements Satisfactory?" This assessment considers both individual SLM performance and their collaborative capabilities. If yes, the cycle continues to the next round of client interactions. If no, it loops back to the Data Analysis 3630 step for further refinement. After the decision, the process loops back to Client Interaction 3610, ensuring ongoing learning and improvement. This continuous cycle allows the system to adapt to changing financial landscapes, evolving client needs, and updates to the firm's proprietary strategies and approaches. Throughout this process, the system maintains alignment with the firm's specific approach and expertise by incorporating feedback from human advisors and continuously referencing the knowledge base. This ensures that as the AI system learns and evolves, it remains true to the firm's unique value proposition and advisory style.

Figure 37:
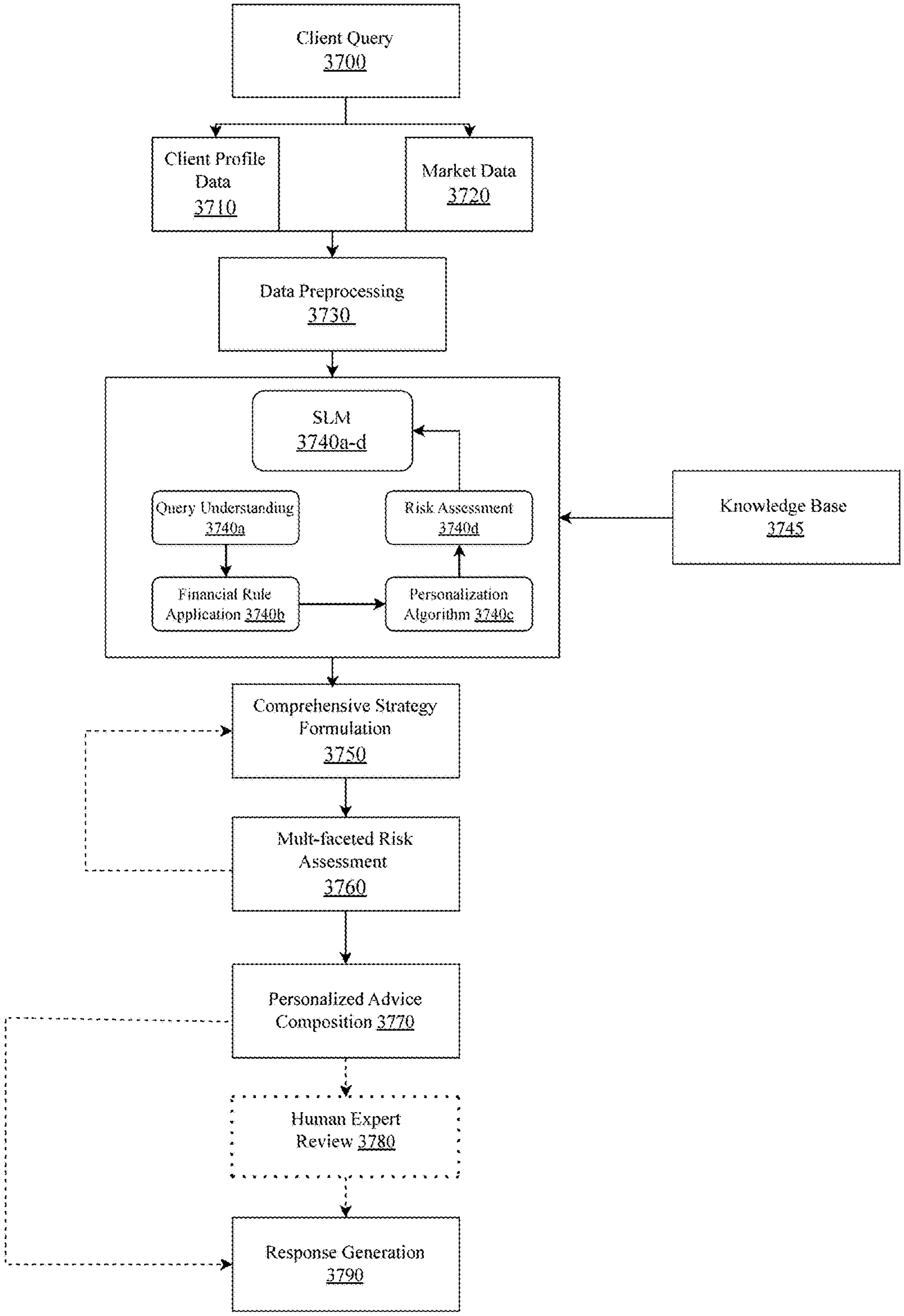
FIG. 37 illustrates the financial advice generation processing using the Specialized Language Model (SLM) and client data.

FIG. 37 illustrates the financial advice generation processing using the Specialized Language Models (SLMs) and client data. It begins with the Client Query 3700 stage. This query initiates two parallel data streams, the Client Profile Data 3710 which includes age, income, risk tolerance, and current savings, and the Market Data 3720 such as current interest rates and stock market trends. These inputs flow into Data Preprocessing 3730, where the system normalizes client data, formats market information, and prioritizes relevant factors. For instance, it might standardize income data and recent market performance metrics for consistent analysis. The preprocessed data then enters the SLM Collaboration Hub 3740*a-d*, which coordinates the efforts of multiple specialized SLMs: Portfolio Management SLM 3740*a*, Financial Planning SLM 3740*b*, Tax Strategy SLM 3750*c*, and Corporate Advisory SLM 3750*d*. Each SLM contains sub-processors for Query Understanding (using natural language processing to interpret the client's intent), Domain-Specific Rule Application (ensuring compliance with regulations in their area of expertise), Personalization Algorithm (tailoring the analysis to the client's specific situation), and Risk Assessment (evaluating potential risks within their domain). Adjacent to the SLM Collaboration Hub, the Knowledge base update 3745 feeds in relevant financial theories, historical data, best practices, and the firm's unique strategies and approaches. For example, it might provide information on the firms' preferred asset allocation strategies for different client profiles. The outputs from the SLM Collaboration Hub flow into the Comprehensive Strategy Formulation 3750, where the system integrates insights from each SLM to calculate specific recommendations. For a complex query involving retirement planning, tax considerations, and investment strategy, this step would synthesize advice from multiple SLMs. For instance, it might suggest a retirement savings strategy that optimizes tax efficiency while aligning with the client's investment risk tolerance. This strategy then undergoes a Multi-Faceted Risk Assessment 3760, considering various risk factors identified by each relevant SLM. If the proposed strategy aligns with the client's risk tolerance and goals across all domains, it proceeds to Personalized Advice Composition 3770. If it exceeds tolerance in any area, the process loops back to reformulate the strategy, with each relevant SLM adjusting its recommendations. The Personalized Advice Composition state crafts the advice into client-friendly language, ensuring that insights from all relevant domains are presented coherently. A Human Advisor Review 3780 step allows for expert oversight before the Final Response Generation 3790. This review ensures that the AI-generated advice aligns with the firm's standards and practices across all areas of expertise. The entire process is overseen by a Continuous Learning Loop, which feeds outcomes and feedback into each SLM and the Collaboration Hub for ongoing improvement. This loop ensures that each SLM enhances its individual capabilities while also improving collaborative performance on complex, multi-faceted queries.

Figure 38:
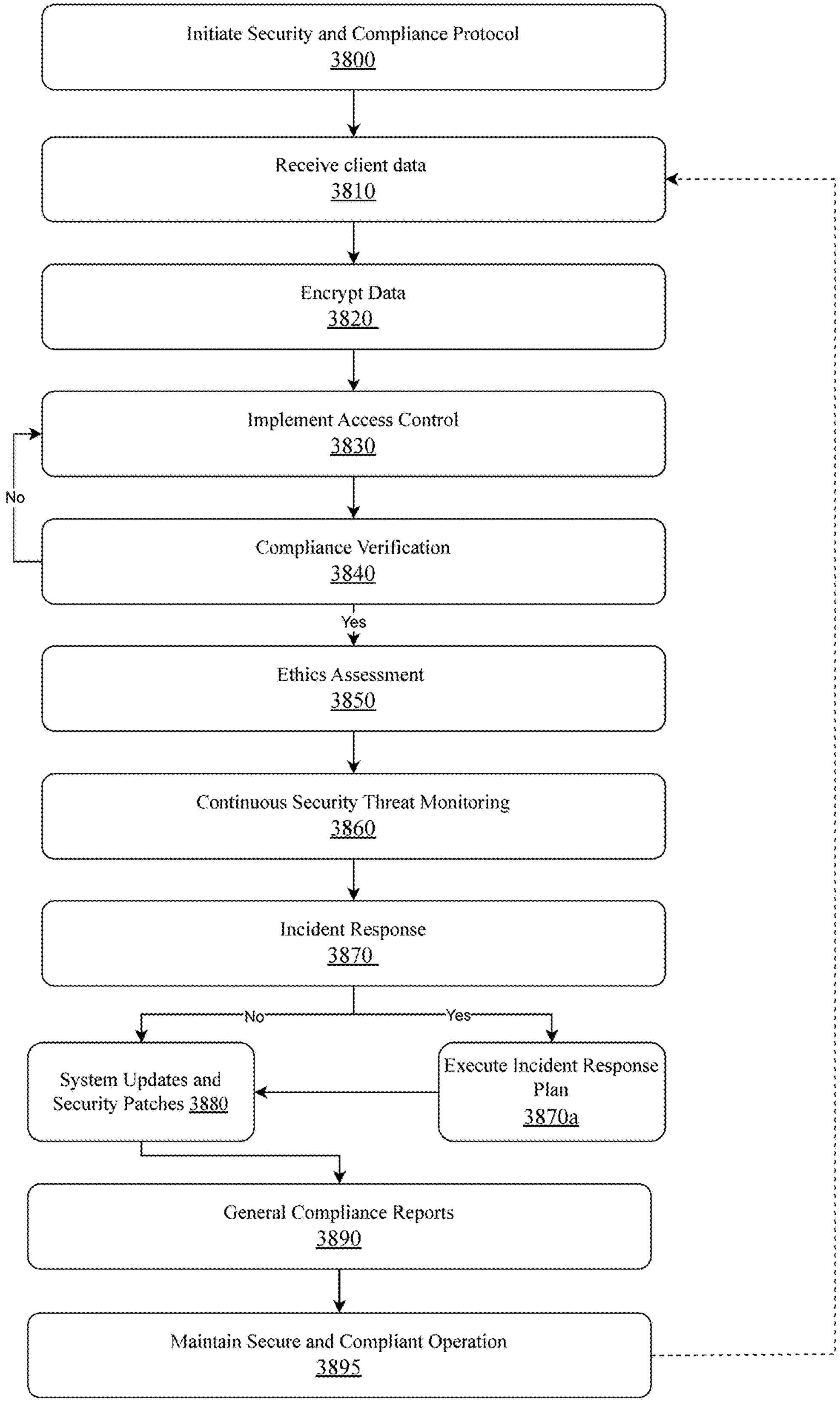
FIG. 38 illustrates the compliance and security framework of the digital advisor system as a method diagram.

FIG. 38 illustrates the compliance and security framework of the digital advisor system as a method diagram. The process begins by Initiating the Security and Compliance Protocol 3800 by receiving the client data 3810. For example, this could be a client uploading their latest bank statement showing a balance of $15,000 or entering details about a new stock purchase of 100 shares of XYZ Corp. The next step is to encrypt 3820 this data by applying an encryption method such as AES-256 encryption in Galois/Counter Mode (GCM) for all incoming data, ensuring that the client's financial information is secured against unauthorized access. This encryption is applied at rest and in transit, utilizing SSL/TLS protocols for data in motion. Additionally, the system implements a robust key management system using Hardware Security Modules (HSMs) for secure key storage and rotation. The process then flows to implement access control stage 3830 where multi-factor authentication (MFA) is applied. The system utilizes a risk-based authentication approach, combining multiple factors, such as something a user knows (e.g., a complex password with at least 12 characters, including uppercase, lowercase, numbers, and special characters), something a user has (e.g., a registered mobile device for receiving one-time passwords via SMS or an authenticator app), something the user is (e.g., biometric verification such as fingerprint or facial recognition, depending on the user's device capabilities). The system also implements adaptive authentication, adjusting the required authentication factors based on the user's behavior, location, and device characteristics. Next, the Compliance Verification 3840 checks if the requested action complies with current financial regulations. This step involves a real-time rules engine that checks against multiple regulatory frameworks, such as: Know Your Customer and Anti-Money Laundering (AML) regulations, The General Data Protection Regulation (GDPR), California Consumer Privacy Act recently amended California Privacy Rights Act, SEC regulations for investment advisors, FINRA rules for broker-dealers. If compliant, the process moves forward. If non-compliant (e.g., recommending an investment that exceeds the client's risk profile), it will go back to Implementing Access Control and preventing the action. Assuming compliance has been met, the flow moves to Conduct Ethics and Fairness Check 3850. This step utilizes an AI-driven ethical analysis module that evaluates the proposed advice against a set of predefined ethical guidelines. The module employs natural language processing (NLP) techniques to analyze the content of the advice, and a decision tree algorithm to assess its ethical implications. It checks for potential conflicts of interest, ensures the advice aligns with the client's best interests, and verifies that it doesn't discriminate based on protected characteristics. The process then moves to Continuous Security Monitoring 3860, which involves real-time threat detection and analysis. The system employs behavioral analytics to establish a baseline of normal user activities, anomaly detection algorithms to identify deviations from this baseline, machine learning models trained on historical attack patterns to recognize potential threats. These components work together to detect unusual account activities, such as multiple failed login attempts, unexpected large transactions, or access from unfamiliar locations. If a threat is detected, the process enters the stage of incident response 3870. The system categorizes the threat based on its severity and type, then triggers the appropriate response from a predefined Incident Response Plan 3870*a*. This might involve: immediately locking the affected account, notifying the client through multiple channels (e.g., email, SMS, in-app notification), alerting the security team for manual investigation, initiating additional monitoring on related accounts, triggering automatic countermeasures, if no immediate threat is detected, the process proceeds to System updates and Security patches 3880. This stage involves automated vulnerability scans using tools like Nessus or OpenVAS, regular penetration testing by both automated tools and ethical hackers, a structured patch management process that prioritizes critical security updates, continuous integration and deployment (CI/CD) pipelines that include security testing. The Generate Compliance Reports 3890 stage involves creating comprehensive documentation of all security and compliance measures. This process includes implementing detailed logs of all system access attempts, encrypted and stored in a separate, security logging server; records of all encryption protocols used, including key rotation schedules; summarizes of detected and resolved threates, with full incident reports for significant events; regular compliance audit reports, mapping system conrols to specific regulatory requirements; and data privacy impact assessments, particularly for any new features or data processing activities. shows the system creating documentation of its security and compliance measures. The process culminates in Maintaining a Secure and Compliant Operation 3895, which is a continuous, ongoing process. This process involves: ensuring periodic review and updating of security policies and procedures, continuous monitoring of regulatory changes and updating compliance measures accordingly, annual third-party security audits and certifications (e.g., SOC 2, ISO 27001), and participation in bug bounty programs to leverage the broader security community. This approach ensures that the digital advisor system maintains the highest standards of security and compliance, protecting client data and maintaining trust in the platform.

As can now be appreciated, disclosed embodiments provide AI-based guidance for personalized financial advice through digital avatars, offering guidance on retirement planning, investment strategies, net worth analysis, and other essential financial operations. Disclosed embodiments can quickly process vast amounts of financial data to extract valuable insights, mimicking the expertise of human financial advisors. This helps clients make informed financial decisions and identify investment opportunities, market trends, and potential risks. Furthermore, disclosed embodiments can analyze historical financial data to predict future trends and investment outcomes, assisting clients in making proactive financial decisions. Moreover, disclosed embodiments can provide valuable insights and recommendations to support complex financial decision-making processes, reducing uncertainty and improving the quality of financial planning. Thus, disclosed embodiments can leverage AI for accomplishing financial advisory tasks resulting in increased accessibility to expert-level advice, improved decision-making, cost reduction for advisory services, and enhanced personalization of financial guidance, ultimately contributing to overall financial well-being and success for individual clients and financial institutions alike.

In the above-described methods, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

Where utilized herein, the terms "tangible" and "non-transitory" are intended to describe a computer-readable storage medium (or "memory") excluding propagating electromagnetic signals, but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A computer system for providing a digital advisor, comprising:

an electronic computation device, wherein the electronic computation device comprises a processor, a memory coupled to the processor, and a communication interface coupled to the processor;

a user profile datastore;

a client profile datastore;

a user device;

a digital advisor application comprising at least a first plurality of programming instructions stored in the memory of, and operating on the processor of, the electronic computation device, wherein the first plurality of programming instructions;

a data fusion suite comprising at least a second plurality of programming instructions stored in the memory of, and operating on at least one processor of, the computer system;

a large language model (LLM) fine-tuning engine comprising at least a third plurality of programming instructions stored in the memory of, and operating on at least one processor of, the electronic computation device;

a knowledge base comprising historical advice, strategies, and expertise specific to a financial advisory firm;

multiple specialized language models (SLMs) each trained for a specific area of financial expertise, including at least portfolio management, financial planning, tax strategy, and corporate advisory, comprising at least a fourth plurality of programming instructions stored in the memory of, and operating on the processor of, the electronic computation device;

a collaboration middleware for facilitating communication between the SLMs, wherein the collaboration middleware detects inconsistencies in responses generated by different SLMs using semantic analysis and numerical discrepancy detection, and resolves conflicts between SLM outputs using a weighted voting mechanism that assigns importance to each SLM's response based on the SLM's relevance to the query domain, historical performance in similar scenarios, and confidence score of the current recommendation;

an advisor review interface for human advisors to review and provide feedback on AI-generated responses;

wherein the first plurality of programming instructions, when operating on the processor, cause the electronic computation device to:

obtain user profile data from the user profile datastore;

obtain client profile data from the client profile datastore;

provide user profile data, client profile data, and financial advisor data to the data fusion suite;

wherein the second plurality of programming instructions, when operating on the processor, cause the electronic computation device to:

ingest the user profile data, client profile data, and financial advisor data;

provide processed training data to the LLM fine-tuning engine;

wherein the third plurality of programming instructions, when operating on the processor, cause the electronic computation device to:

perform a hyperparameter optimization;

perform an architecture modification analysis;

perform iterative training on domain-specific data;

perform validation checks;

create a fine-tuned SLM model based on the iterative training and validation checks;

wherein the fourth plurality of programming instructions, when operating on the processor, cause the electronic computation device to:

receive a client query through a user interface on the user device;

analyze the query to identify financial concepts and client intent, and determine query complexity based on a weighted combination of factors to produce a complexity score;

determine whether the complexity score exceeds a predetermined threshold, and if so, escalate the query to a human financial advisor;

determine which SLMs are required to address the query based on the query analysis;

activate and coordinate responses from relevant SLMs from complex queries spanning multiple areas of expertise;

generate a response to the query using the relevant SLMs;

generate multiple specialized digital avatars, each mimicking a specific human advisor's appearance and communication style for a particular area of financial expertise;

present the response to the client through one or more digital avatars on the user device, representing the relevant areas of expertise;

record the interaction for continuous learning and improvement of the SLMs.

2. The computer system of claim 1, wherein the digital advisor application, SLM, large language model (LLM) fine-tuning engine, and data fusion suite are operated by some combination of computer devices that communicate over a network, wherein the combination of computer devices may each operate any combination of the digital advisor engine, or data fusion suite, either individually or together.

3. The computer system of claim 1, wherein the digital advisor application, SLM, LLM fine-tuning engine, and data fusion suite are all operated by a singular computer device.

4. The computer system of claim 1, wherein the LLM fine-tuning engine adds or alters layers to suit financial advising tasks.

5. The computer system of claim 1, wherein the processed training data includes at least one of:

financial advisor writings;

social media posts;

recorded presentations; and historical client interactions.

6. The computer system of claim 1, wherein the financial advisor data includes at least one of:

the financial advisor's area of expertise;

communication style; and historical client recommendations.

7. The computer system of claim 6, further comprising:

a task management engine comprising at least a plurality of programming instructions that, when operating on at least one processor, cause the computer system to:

manage placement of tasks or events into a schedule;

handle training of models on a general and per-user and per-client basis;

optimize automated task scheduling, adjusting, and updating as new information is received.

8. The computer system of claim 5, wherein the SLM processes queries to generate financial advice based on the latest available information from the knowledge base.

9. The computer system of claim 8, further comprising:

a continuous learning module comprising at least a plurality of programming instructions that, when operating on at least one processor, cause the computer system to:

analyze every client interaction;

identify patterns in successful engagements and areas for enhancement;

continuously update the SLM and a knowledge base;

provide performance metrics to the human advisor;

incorporate feedback from human advisors into the SLM training process; and adjust the digital avatar's communication style based on successful human advisor interactions.

10. The computer system of claim 1, further comprising a compliance and security framework comprising at least a plurality of programming instructions stored in the memory of, and operating on at least one processor of, the computer system, wherein the plurality of programming instructions, when operating on the at least one processor, cause the computer system to:

ensure every operation adheres to regulatory requirements;

implement robust data protection standards;

perform real-time compliance checking;

generate audit trails for advice given.

11. The computer system of claim 1, wherein the digital advisor engine further comprises a multi-avatar collaboration process that:

analyzes complex queries to identify interconnected financial themes across multiple domains;

activates relevant specialized SLMs based on the query analysis;

facilitates communication and data sharing between specialized SLMs; and synthesizes expert inputs from multiple SLMs into a comprehensive answer.

12. The computer system of claim 1, wherein the SLMs generate financial advice by:

processing the analyzed query within their respective domains of expertise;

accessing a knowledge base for domain-specific information and the firm's unique strategies;

collaborating through the collaboration middleware for complex, multi-faceted queries;

formulating integrated investment and financial planning strategies;

performing risk assessments within their respective domains;

composing personalized advice that mimics the communication style of human advisors in each relevant domain.

13. A method for providing a digital financial advisor, comprising steps of:

obtaining user profile data from a user profile datastore;

obtaining client profile data from a client profile datastore;

obtaining financial advisor data;

processing the user profile data, client profile data, and financial advisor data to create processed training data;

providing the processed training data to a Large Language Model (LLM) fine-tuning engine;

performing hyperparameter optimization;

performing an architecture modification analysis;

performing validation checks;

creating multiple fine-tuned Specialized Language Models (SLMs), each specialized in a specific area of financial expertise;

generating a digital avatar that mimics a specific human financial advisor's expertise and communication style;

receiving a client query through a user interface on a user device;

analyzing the query to identify financial concepts and client intent, and determine query complexity based on a weighted combination of factors to produce a complexity score;

determining if the complexity score exceeds a predetermined threshold;

if the threshold is exceeded, escalating the query to the human financial advisor;

coordinating responses from relevant SLMs through a collaboration middleware that detects inconsistencies in responses generated by different SLMs using semantic analysis and numerical discrepancy detection, and resolves conflicts between SLM outputs using a weighted voting mechanism that assigns importance to each SLM's response based on the SLM's relevance to the query domain, historical performance in similar scenarios, and confidence score of the current recommendation;

generating responses using the relevant specialized SLMs;

presenting the response through one or more digital avatars representing the relevant areas of expertise;

recording the interaction for continuous learning and improvement of the SLM.

14. The method of claim 13, wherein the hyperparameter optimization comprises adjusting learning rate, batch size, number of epochs, and dropout rate.

15. The method of claim 13, wherein based on the architecture modification comprises adding finance-specific layers and expanding vocabulary to include financial jargon.

16. The method of claim 13, wherein the financial advisor data comprises at least one of:

the financial advisor's historical client interactions;

written consent;

verbal presentations; and social media posts.

17. The method of claim 16, further comprising:

generating personalized financial advice based on the client query and client profile data;

generating a visual representation of the financial advice; and presenting the visual representation through the digital avatar.

18. The method of claim 13, wherein the financial advisor data comprises:

the financial advisor's area of expertise;

communication style;

typical advice patterns; and historical client recommendations.

19. The method of claim 13, further comprising:

routing AI-generated responses through an advisor review interface;

allowing human advisors to review, provide feedback on, and approve AI-generated responses before delivery to the client;

incorporating human advisor feedback to improve SLM performance and ensure alignment with the firm's operational standards and advisory principles.

* * * * *